US010259901B2

(12) United States Patent
Huang et al.

(10) Patent No.: US 10,259,901 B2
(45) Date of Patent: *Apr. 16, 2019

(54) SALT-TOLERANT STAR MACROMOLECULES

(71) Applicant: Pilot Polymer Technologies, Inc., Pittsburgh, PA (US)

(72) Inventors: Liang Huang, Pittsburgh, PA (US); Yuanxi Liao, Pittsburgh, PA (US); Patrick McCarthy, Pittsburgh, PA (US)

(73) Assignee: Pilot Polymer Technologies, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/415,371

(22) Filed: Jan. 25, 2017

(65) Prior Publication Data

US 2017/0355803 A1 Dec. 14, 2017

Related U.S. Application Data

(63) Continuation of application No. 14/765,452, filed as application No. PCT/US2014/014416 on Feb. 3, 2014, now Pat. No. 9,587,064.

(60) Provisional application No. 61/760,210, filed on Feb. 4, 2013.

(51) Int. Cl.
    *C08F 8/12* (2006.01)
    *C08F 293/00* (2006.01)
    *C08F 220/18* (2006.01)
    *C09K 8/035* (2006.01)

(52) U.S. Cl.
    CPC ............ *C08F 293/005* (2013.01); *C08F 8/12* (2013.01); *C09K 8/035* (2013.01); *C08F 2220/1825* (2013.01); *C08F 2438/01* (2013.01); *C08J 2300/206* (2013.01)

(58) Field of Classification Search
    CPC .......... C08F 2220/1825; C08F 293/005; C08F 212/08; C08F 285/00; C08J 2300/206
    See application file for complete search history.

(56) References Cited

U.S. PATENT DOCUMENTS

| 4,386,135 A | 5/1983 | Campbell et al. |
| 4,409,120 A | 10/1983 | Martin |
| 4,847,328 A | 7/1989 | Hutchins et al. |
| 5,100,953 A | 3/1992 | Valint et al. |

(Continued)

FOREIGN PATENT DOCUMENTS

| CA | 2399690 A1 | 8/2001 |
| CN | 101575402 A | 11/2009 |

(Continued)

OTHER PUBLICATIONS

Li, Wenwen et al. "Uniform PEO Star Polymers Synthesized in Water via Free Radical Polymerization or Atom Transfer Radical Polymerization," Macromol. Rapid Commun. 31 (2010) 74-81.

(Continued)

*Primary Examiner* — Satya B Sastri
(74) *Attorney, Agent, or Firm* — Ulmer & Berne LLP

(57) ABSTRACT

The present invention relates to multi-arm salt-tolerant star macromolecules, and methods of preparing and using the same. In one aspect of the invention, a salt-tolerant star macromolecule is capable of providing salt-tolerance to an aqueous composition.

17 Claims, 11 Drawing Sheets

(56) References Cited

U.S. PATENT DOCUMENTS

| | | | |
|---|---|---|---|
| 5,240,963 A | 8/1993 | Domb et al. | |
| 5,310,807 A | 5/1994 | Antonelli et al. | |
| 5,362,813 A | 11/1994 | Antonelli et al. | |
| 5,486,563 A | 1/1996 | Sutherland | |
| 5,545,342 A | 8/1996 | Beagle et al. | |
| 5,545,504 A | 8/1996 | Keoshkerian et al. | |
| 5,594,072 A | 1/1997 | Handlin, Jr. et al. | |
| 5,612,107 A | 3/1997 | Sangani et al. | |
| 5,631,015 A | 5/1997 | Bezwada et al. | |
| 5,639,831 A | 6/1997 | Himes et al. | |
| 5,653,992 A | 8/1997 | Bezwada et al. | |
| 5,728,469 A | 3/1998 | Mann et al. | |
| 5,756,585 A | 5/1998 | Teyssie et al. | |
| 5,763,548 A | 6/1998 | Matyjaszewski et al. | |
| 5,789,487 A | 8/1998 | Matyjaszewski et al. | |
| 5,807,937 A | 9/1998 | Matyjaszewski et al. | |
| 5,933,695 A | 8/1999 | Henry et al. | |
| 5,945,491 A | 8/1999 | Matyjaszewski et al. | |
| 5,994,457 A | 11/1999 | Stanger et al. | |
| 6,103,361 A | 8/2000 | Batzar et al. | |
| 6,111,022 A | 8/2000 | Matyjaszewski et al. | |
| 6,111,055 A | 8/2000 | Berger et al. | |
| 6,121,371 A | 9/2000 | Matyjaszewski et al. | |
| 6,124,411 A | 9/2000 | Matyjaszewski et al. | |
| 6,127,445 A | 10/2000 | Kutal et al. | |
| 6,162,882 A | 12/2000 | Matyjaszewski et al. | |
| 6,210,524 B1 | 4/2001 | Josephy | |
| 6,221,399 B1 | 4/2001 | Rolfes et al. | |
| 6,252,014 B1 | 6/2001 | Knauss | |
| 6,336,966 B1 | 1/2002 | Coca et al. | |
| 6,407,187 B1 | 6/2002 | Matyjaszewski et al. | |
| 6,410,666 B1 | 6/2002 | Grubbs et al. | |
| 6,455,623 B1 | 9/2002 | Howard | |
| 6,461,631 B1 | 10/2002 | Dunn et al. | |
| 6,465,091 B1 | 10/2002 | Ou-Yang | |
| 6,476,079 B1 | 11/2002 | Jukarainen et al. | |
| 6,512,060 B1 | 1/2003 | Matyjaszewski et al. | |
| 6,528,080 B2 | 3/2003 | Dunn et al. | |
| 6,538,091 B1 | 3/2003 | Matyjaszewski et al. | |
| 6,541,580 B1 | 4/2003 | Matyjaszewski et al. | |
| 6,555,237 B1 | 4/2003 | Chen et al. | |
| 6,558,805 B2 | 5/2003 | Khadir et al. | |
| 6,624,262 B2 | 9/2003 | Matyjaszewski et al. | |
| 6,624,263 B2 | 9/2003 | Matyjaszewski et al. | |
| 6,626,950 B2 | 9/2003 | Brown et al. | |
| 6,627,314 B2 | 9/2003 | Matyjaszewski et al. | |
| 6,685,957 B1 | 2/2004 | Bezemer et al. | |
| 6,692,770 B2 | 2/2004 | Gustavsson et al. | |
| 6,706,288 B2 | 3/2004 | Gustavsson et al. | |
| 6,759,491 B2 | 7/2004 | Matyjaszewski et al. | |
| 6,764,731 B2 | 7/2004 | Savoca et al. | |
| 6,784,397 B2 | 8/2004 | Li et al. | |
| 6,790,919 B2 | 9/2004 | Matyjaszewski et al. | |
| 6,887,962 B2 | 5/2005 | Matyjaszewski et al. | |
| 6,919,405 B2 | 7/2005 | Kinning et al. | |
| 6,939,505 B2 | 9/2005 | Musso et al. | |
| 7,019,082 B2 | 3/2006 | Matyjaszewski et al. | |
| 7,049,373 B2 | 5/2006 | Matyjaszewski et al. | |
| 7,056,455 B2 | 6/2006 | Matyjaszewski et al. | |
| 7,064,166 B2 | 6/2006 | Matyjaszewski et al. | |
| 7,081,486 B2 | 7/2006 | Imai et al. | |
| 7,105,175 B2 | 9/2006 | Schwarz | |
| 7,105,181 B2 | 9/2006 | Gustavsson et al. | |
| 7,125,938 B2 | 10/2006 | Matyjaszewski et al. | |
| 7,153,821 B2 | 12/2006 | Blokzijl et al. | |
| 7,157,530 B2 | 1/2007 | Matyjaszewski et al. | |
| 7,163,697 B2 | 1/2007 | Hanes et al. | |
| 7,186,759 B2 | 3/2007 | Seppl et al. | |
| 7,229,687 B2 | 6/2007 | Kinning et al. | |
| 7,235,261 B2 | 6/2007 | Smith et al. | |
| 7,241,455 B2 | 7/2007 | Richard | |
| 7,316,811 B2 | 1/2008 | Zhao et al. | |
| 7,341,720 B2 | 3/2008 | Stefano | |
| 7,381,418 B2 | 6/2008 | Richard | |
| 7,517,914 B2 | 4/2009 | Richard | |
| 7,537,781 B2 | 5/2009 | Richard | |
| 7,592,021 B2 | 9/2009 | Shankar et al. | |
| 7,612,029 B2 | 11/2009 | Foland et al. | |
| 7,713,539 B2 | 5/2010 | Strickler et al. | |
| 8,173,750 B2 | 5/2012 | Jakubowski et al. | |
| 8,445,577 B2 | 5/2013 | Lin et al. | |
| 8,604,132 B2 * | 12/2013 | Jakubowski | A61K 8/72 |
| | | | 525/244 |
| 9,587,064 B2 | 3/2017 | Huang et al. | |
| 2002/0039596 A1 | 4/2002 | Hartounian et al. | |
| 2002/0044976 A1 | 4/2002 | Gustavsson et al. | |
| 2002/0082543 A1 | 6/2002 | Park et al. | |
| 2002/0090398 A1 | 7/2002 | Dunn et al. | |
| 2002/0155309 A1 | 10/2002 | Li et al. | |
| 2002/0155310 A1 | 10/2002 | Li et al. | |
| 2003/0003127 A1 | 1/2003 | Brown et al. | |
| 2003/0004578 A1 | 1/2003 | Brown et al. | |
| 2003/0018154 A1 | 1/2003 | Khadir et al. | |
| 2003/0054185 A1 | 3/2003 | Ottersbach et al. | |
| 2003/0086895 A1 | 5/2003 | Hanes et al. | |
| 2003/0091630 A1 | 5/2003 | Louie-Helm et al. | |
| 2003/0104052 A1 | 6/2003 | Berner et al. | |
| 2003/0133985 A1 | 7/2003 | Louie-Helm et al. | |
| 2003/0138579 A1 | 7/2003 | Savoca et al. | |
| 2003/0152622 A1 | 8/2003 | Louie-Helm et al. | |
| 2003/0153457 A1 | 8/2003 | Nemoto et al. | |
| 2003/0158076 A1 | 8/2003 | Rodrigues | |
| 2003/0158344 A1 | 8/2003 | Rodriques et al. | |
| 2003/0173720 A1 | 9/2003 | Musso et al. | |
| 2003/0203000 A1 | 10/2003 | Schwarz et al. | |
| 2003/0211167 A1 | 11/2003 | Gustavsson et al. | |
| 2003/0220254 A1 | 11/2003 | Khan et al. | |
| 2003/0235602 A1 | 12/2003 | Schwarz | |
| 2003/0235603 A1 | 12/2003 | Schwarz et al. | |
| 2003/0236513 A1 | 12/2003 | Schwarz et al. | |
| 2003/0236514 A1 | 12/2003 | Schwarz | |
| 2004/0001891 A1 | 1/2004 | Smith et al. | |
| 2004/0006153 A1 | 1/2004 | Seppala et al. | |
| 2004/0023987 A1 | 2/2004 | Hata et al. | |
| 2004/0068078 A1 | 4/2004 | Milbocker | |
| 2004/0086544 A1 | 5/2004 | Bezemer et al. | |
| 2004/0115281 A1 | 6/2004 | Gustavsson et al. | |
| 2004/0126576 A1 | 7/2004 | Kinning et al. | |
| 2004/0156899 A1 | 8/2004 | Louie-Helm et al. | |
| 2004/0161403 A1 | 8/2004 | Zhao et al. | |
| 2004/0171513 A1 | 9/2004 | Blokzijl et al. | |
| 2004/0175406 A1 | 9/2004 | Schwarz | |
| 2004/0185105 A1 | 9/2004 | Berner et al. | |
| 2004/0202691 A1 | 10/2004 | Richard | |
| 2004/0234571 A1 | 11/2004 | Jang | |
| 2005/0025800 A1 | 2/2005 | Tan | |
| 2005/0025801 A1 | 2/2005 | Richard et al. | |
| 2005/0064011 A1 | 3/2005 | Song et al. | |
| 2005/0113515 A1 | 5/2005 | Sutton et al. | |
| 2005/0181014 A1 | 8/2005 | Richard | |
| 2005/0181015 A1 | 8/2005 | Zhong | |
| 2005/0214531 A1 | 9/2005 | Kinning et al. | |
| 2005/0233062 A1 | 10/2005 | Hossainy et al. | |
| 2005/0238594 A1 | 10/2005 | Mougin | |
| 2005/0244640 A1 | 11/2005 | Riswick et al. | |
| 2006/0013849 A1 | 1/2006 | Strickler et al. | |
| 2006/0014902 A1 | 1/2006 | Mays et al. | |
| 2006/0018951 A1 | 1/2006 | Maniar et al. | |
| 2006/0024357 A1 | 2/2006 | Carpenter et al. | |
| 2006/0051390 A1 | 3/2006 | Schwarz | |
| 2006/0068378 A1 | 3/2006 | Mirkin et al. | |
| 2006/0089474 A1 | 4/2006 | Yamazaki et al. | |
| 2006/0121076 A1 | 6/2006 | Ranade et al. | |
| 2006/0121085 A1 | 6/2006 | Warren et al. | |
| 2006/0122339 A1 | 6/2006 | Meulenbrugge et al. | |
| 2006/0147490 A1 | 7/2006 | Bowden et al. | |
| 2006/0159619 A1 | 7/2006 | Becker et al. | |
| 2006/0165753 A1 | 7/2006 | Richard | |
| 2006/0188486 A1 | 8/2006 | Carpenter et al. | |
| 2006/0210604 A1 | 9/2006 | Dadey et al. | |
| 2006/0222681 A1 | 10/2006 | Richard | |
| 2006/0228348 A1 | 10/2006 | Stefano | |
| 2007/0003599 A1 | 1/2007 | Schwarz | |
| 2007/0020307 A1 | 1/2007 | Zhong et al. | |

(56) References Cited

U.S. PATENT DOCUMENTS

| | | |
|---|---|---|
| 2007/0135532 A1 | 6/2007 | Seppala et al. |
| 2007/0160561 A1 | 7/2007 | Ouali et al. |
| 2007/0212418 A1 | 9/2007 | Ahlheim |
| 2007/0219330 A1 | 9/2007 | Haddleton et al. |
| 2007/0238634 A1 | 10/2007 | Foland et al. |
| 2007/0244018 A1 | 10/2007 | Visger et al. |
| 2007/0254010 A1 | 11/2007 | Richard |
| 2007/0260015 A1 | 11/2007 | Stork et al. |
| 2007/0275027 A1 | 11/2007 | Wen et al. |
| 2007/0275080 A1 | 11/2007 | Laulicht et al. |
| 2007/0275082 A1 | 11/2007 | Lee et al. |
| 2007/0276101 A1 | 11/2007 | Matyjaszewski et al. |
| 2007/0280992 A1 | 12/2007 | Margaron et al. |
| 2007/0281031 A1 | 12/2007 | Yang |
| 2007/0299227 A1 | 12/2007 | Gopferich et al. |
| 2007/0299238 A1 | 12/2007 | Gopferich et al. |
| 2007/0299240 A1 | 12/2007 | Gopferich et al. |
| 2008/0112898 A1 | 5/2008 | Schiemann et al. |
| 2008/0114128 A1 | 5/2008 | Destarac et al. |
| 2008/0131395 A1 | 6/2008 | Wellinghoff et al. |
| 2008/0132580 A1 | 6/2008 | Mandavilli et al. |
| 2008/0149348 A1 | 6/2008 | DiFoggio et al. |
| 2008/0226658 A1 | 9/2008 | Stefano |
| 2008/0269093 A1 | 10/2008 | Price |
| 2008/0280037 A1 | 11/2008 | Sheridan et al. |
| 2008/0280086 A1 | 11/2008 | Sheridan et al. |
| 2008/0286333 A1 | 11/2008 | Kangas et al. |
| 2008/0299168 A1 | 12/2008 | Dadey et al. |
| 2008/0311173 A1 | 12/2008 | Schwarz et al. |
| 2009/0087493 A1 | 4/2009 | Dai et al. |
| 2009/0092650 A1 | 4/2009 | Warren et al. |
| 2009/0098079 A1 | 4/2009 | Schiemann et al. |
| 2009/0098183 A1 | 4/2009 | Detamore et al. |
| 2009/0099151 A1 | 4/2009 | Jain et al. |
| 2009/0130172 A1 | 5/2009 | Dankers et al. |
| 2009/0142313 A1 | 6/2009 | Talling et al. |
| 2009/0171024 A1 | 7/2009 | Jakubowski et al. |
| 2009/0176951 A1 | 7/2009 | Matyjaszewski et al. |
| 2009/0181094 A1 | 7/2009 | Sheu |
| 2009/0291106 A1 | 11/2009 | Gpferich et al. |
| 2009/0298729 A1 | 12/2009 | Schober et al. |
| 2009/0306295 A1 | 12/2009 | Mays et al. |
| 2009/0312505 A1 | 12/2009 | Matyjaszewski et al. |
| 2009/0326645 A1 | 12/2009 | Pacetti et al. |
| 2010/0004152 A1 | 1/2010 | Karagianni et al. |
| 2010/0086597 A1 | 4/2010 | Woo et al. |
| 2010/0092535 A1 | 4/2010 | Cook et al. |
| 2010/0120637 A1 | 5/2010 | Bendejacq et al. |
| 2010/0120970 A1 | 5/2010 | Biggs et al. |
| 2010/0204418 A1 | 8/2010 | Marc et al. |
| 2010/0273949 A1 | 10/2010 | Jakubowski et al. |
| 2011/0082230 A1 | 4/2011 | Jakubowski et al. |
| 2011/0213105 A1 | 9/2011 | Jakubowski et al. |
| 2012/0172531 A1 | 7/2012 | Jakubowski et al. |
| 2013/0197175 A1 | 8/2013 | Kato et al. |
| 2013/0296495 A1 | 11/2013 | Jakubowski et al. |
| 2013/0324443 A1 | 12/2013 | Wang et al. |
| 2015/0183915 A1* | 7/2015 | Johnson ............ C08F 293/005 508/469 |

FOREIGN PATENT DOCUMENTS

| | | |
|---|---|---|
| CN | 102604011 A | 7/2012 |
| CN | 102702453 A | 10/2012 |
| DE | 102005041528 A1 | 3/2007 |
| EP | 408420 A1 | 1/1991 |
| EP | 422805 A2 | 4/1991 |
| EP | 1197498 A1 | 4/2002 |
| GB | 1043748 A | 9/1966 |
| JP | 2005113086 A | 4/2005 |
| JP | 2006002032 A | 1/2006 |
| WO | 2005087819 A1 | 9/2005 |
| WO | 2005113031 A2 | 12/2005 |
| WO | 2009155303 A2 | 12/2009 |
| WO | 2010111708 A1 | 9/2010 |
| WO | 2012020545 A1 | 2/2012 |
| WO | 2012061147 A1 | 5/2012 |
| WO | 2014036498 A2 | 3/2014 |

OTHER PUBLICATIONS

Terashima, Takaya et al. "In Situ and Time-Resolved Small-Angle Neutron Scattering Observation of Star Polymer Formation via Arm-Linking Reaction in Ruthenium-Catalyzed Living Radical Polymerization," Macromolecules 43 (2010) 8218-8232.

Van Camp, Wim et al. "Effect of Crosslinker Multiplicity on the Gel Point in ATRP," J. Polym. Sci., Part A: Polymer Chemistry 48 (2010) 2016-2023.

Goh, Tor Kit et al. "Highly Efficient Synthesis of Low Polydispersity Corss Cross-Linked Star Polymers by Ru-Catalyzed Living Radical Polymerization," Macromol. Rapid Commun. 32 (2011) 456-461.

Koda, Yuta et al. "Fluorinated Microgel-Core Star Polymers as Fluorous Compartments for Molecular Recognition," Macromolecules 44 (2011) 4574-4578.

Latridi, Zacharoula et al. "Phase Behavior and Self-Assembly of PSn(P2VP-b-PAA)n Multiarmed Multisegmented Star Terpolymers with Ampholytic Arms," Polym. Chem. (2011) D01:10.1039/c1py00090 8 pages.

Liu, Pingwei et al. "'Arm-First' Synthesis of Core-Cross-Linked Multiarm Star Polyethylenes by Coupling Palladium-Catalyzed Ethylene 'Living' Polymerization with Atom-Transfer Radical Polymerization," Macromolecules 44 (2011) A-O.

Pang, Xinchang et al. "Novel Amphiphilic Multi-Arm, Star-Like Block Copolymers as Unimolecular Micelles," Macromolecules 44 (2011) 3746-3752.

Zheng, Yu et al. "Biodegradable Core Shell Materials via RAFT and ROP: Characterization and Comparison of Hyperbranched and Microgel Particles," Macromolecules 44 (2011) 1347-1354.

Written Opinion and International Search Report dated May 21, 2014 for International Application No. PCT/US14/14416.

Bi, Le-Khac et al. "Synthesis and Properties of Block Copolymers. 3. Polystyrene-Polydiene Star Block Copolymers," Macromolecules 9:5 (Sep.-Oct. 1976) 732-742.

Ishizu, Koji et al. "Synthesis of Star Polymers by Organized Polymerization of Macromonomers," Polymer 36:21 (1995) 4155-4157.

Wang, Jin-Shan et al. "Controlled/'Living' Radical Polymerization. Atom Transfer Radical Polymerization in the Presence of Transition-Metal Complexes" J. Am. Chem. Soc. 117 (1995) 5614-5615.

Matyjaszewski, Krzysztof et al. "Synthesis of Well-Defined Azido and Amino End-Functionalized Polystyrene by Atom Transfer Radical Polymerization" Macromol. Rapid Commun. 18 (1997) 1057-1066.

Beers, Kathryn L. et al. "The Synthesis of Densely Grafted Copolymers by Atom Transfer Radical Polymerization" Macromolecules 31:26 (1998) 9413-9415.

Matyjaszewski, Krzysztof et al. "Atom transfer Radical Polymerization of Styrene Catalyzed by Copper Carboxylate Complexes", Macromol. Chem. Phys., 199 (1998), pp. 2289-2292.

Beers, Kathryn L. et al. "Atom Transfer Radical Polymerization of 2-Hydroxyethyl Methacrylate" Macromolecules 32:18 (1999) 5772-5776.

Xia, Jianhui et al. "Synthesis of Star-Shaped Polystyrene by Atom Transfer Radical Polymerization Using an 'Arm First' Approach," Macromolecules 32 (1999) 4482-4484.

Held, Daniela et al. "Synthesis and Solution Properties of Star-Shaped Poly(tert-butyl acrylate)," Macromol. Symp. 157 (2000) 225-237.

Zhang, Xuan et al. "End-Functional Poly(tert-butyl acrylate) Star Polymers by Controlled Radical Polymerization," Macromolecules 33 (2000) 2340-2345.

Baek, Kyung-Youl et al. "Core-Functionalized Star Polymers by Transition Metal-Catalyzed Living Radical Polymerization. 1. Synthesis and Characterization of Star Polymers with PMMA Arms and Amide Cores," Macromolecules 34 (2001) 7629-7635.

(56) References Cited

OTHER PUBLICATIONS

Baek, Kyung-Youl et al. "Star-Shaped Polymers by Metal-Catalyzed Living Radical Polymerization. 1. Design of Ru(II)-Based Systems and Divinyl Linking Agents," Macromolecules 34 (2001) 215-221.
Bosman, Anton W. et al. "High-Throughput Synthesis of Nanoscale Materials: Structural Optimization of Functionalized One-Step Star Polymers," J. Am. Chem. Soc. 123 (2001) 6461-6462.
Gromada et al. "Simultaneous Reverse and Normal Initiation in Atom Transfer Radical Polymerization", Macromolecules 34 (2001) 7664-7671.
Matyjaszewski, Krzysztof et al. "Atom Transfer Radical Polymerization" Chem. Rev. 101:9 (2001) 29212990.
Pasquale, Anthony J. et al. "Synthesis of Star-Shaped Polystyrenes via Nitroxide-Mediated Stable Free-Radical Polymerization," J. Polm. Sci. Part A: Polym. Chem. 39 (2001) 216-223.
Tsoukatos, Thodoris et al. "Star-Branched Polystyrenes by Nitroxide Living Free-Radical Polymerization," J. Polm. Sci. Part A: Polym. Chem. 39 (2001) 320-325.
Voulgaris et al., "Aggregation Behavior of Polystyrene/Poly(acrylic acid) Heteroarm Star Copolymers in 1,4-Dioxane and Aqueous Media," Macromol. Chem. Phys., 202 (2001) 3284-3292.
Zhang et al. "Effect of Cu(II) on the Kinetics of the Homogeneous Atom Transfer Radical Polymerization of Methyl Methacrylate," Macromolecules, 34 (2001) 6169-6173.
Baek, Kyung-Youl et al. "Synthesis of Star-Shaped Copolymers with Methyl Methacrylate and n-Butyl Methacrylate by Metal-Catalyzed Living Radical Polymerization: Block and Random Copolymer Arms and Microgel Cores," J. Polm. Sci. Part A: Polym. Chem. 40 (2002) 633-641.
Baek, Kyung-Youl et al. "Star-Shaped Polymers by Ru(II)-Catalyzed Living Radical Polymerization. II. Effective Reaction Conditions and Characterization by Multi-Angle Laser Light Scattering/Size Exclusion Chromatography and Small-Angle X-Ray Scattering," J. Polm. Sci. Part A: Polym. Chem. 40 (2002) 22452255.
Furukawa, Taiichi et al. "Synthesis and Characterization of Poly(ethylene oxide) Star Polymers Possessing a Tertiary Amino Group at Each Arm End by Organized Polymerization Using Macromonomers," Journal of Colloid and Interface Science 253 (2002) 465-469.
Narumi, Atsushi et al. "Glycoconjugated Polymer. 3. Synthesis and Amphiphilic Property of Core-Glycoconjugated Star-Shaped Polystyrene," Macromolecules 35 (2002) 699-705.
Ruthenium-Catalyzed Living Radical Polymerization, J. Polm. Sci. Part A: Polym. Chem. 40 (2002) 19721982.
Tsarevsky, Nicolay V. et al. "Reversible Redox Cleavage/Coupling of Polystyrene with Disulfide or Thiol Groups Prepared by Atom Transfer Radical Polymerization" Macromolecules 35 (2002) 9009-9014.
Moad, Graeme et al. "Synthesis of Novel Architectures by Radical Polymerization with Reversible Addition Fragmentation Chain Transfer (RAFT Polymerization)," Macromol. Symp. 192 (2003) 1-12.
Macromolecules: From Synthetic Concepts to Practical Applications, J. Am. Chem. Soc. 125 (2003) 715728.
Terashima, Takaya et al. "Polymer Catalysts from Polymerization Catalysts: Direct Encapsulation of Metal Catalyst into Star Polymer Core During Metal-Catalyzed Living Radical Polymerization," J. Am. Chem. Soc. 125 (2003) 5288-5289.
Yoo, Mikyong et al. "Photophysical Characterization of Conformational Rearrangements for Amphiphilic 6-Arm Star Block Copolymers in Selective Solvent Mixtures," Macromolecules 36:1 (2003) 268-271.
Bontempo, Debora et al. "Cysteine-Reactive Polymers Synthesized by Atom Transfer Radical Polymerization for Conjugation to Proteins" J. Am. Chem. Soc. 126 :47 (2004) 15372-15373.
Du, Jianzhong et al. "PCL Star Polymer, PCL-PS Heteroarm Star Polymer by ATRP, and Core-Carboxylated PS Star Polymer Thereof," Macromolecules 37 (2004) 3588-3594.
Du, Jianzhong et al. "Preparation of Poly(ethylene oxide) Star Polymers and Poly(ethylene oxide)-Polystyrene Heteroarm Star Polymers by Atom Transfer Radical Polymerization," J. Polm. Sci. Part A: Polym. Chem. 42 (2004) 2263-2271.
Jankova, K. et al. "Novel Fluorinated Block Copolymer Architectures Fuelled by Atom Transfer Radical Polymerization," Journal of Fluorine Chemistry 126:2 (Dec. 10, 2004) 241-250.
Pan, Dipanjan et al. "Shell Cross-Linked Nanoparticles Designed to Target Angiogenic Blood Vessels via av133 Receptor-Ligand Interactions" Macromolecules 37:19 (2004) 7109-7115.
Themistou, Efrosyni et al. "Synthesis and Characterization of Star Polymers and Cross-Linked Star Polymer Model Networks Containing a Novel, Silicon-Based, Hydrolyzable Cross-Linker," Macromolecules 37 (2004) 6734-6743.
Tsarevsky, Nicolay V. et al. "Deactivation Efficiency and Degree of Control Over Polymerization in ATRP in Protic Solvents" Macromolecules 37 (2004) 9768-9778.
Bouilhac, Cecile et al "Functionalized Star-Like Polystyrenes as Organic Supports of a Tridentate Bis(imino) pyridinyliron/Aluminic Derivative Catalytic System for Ethylene Polymerization," Macromol. Rapid Commun. 26 (2005) 1619-1625.
Furukawa, Taiichi et al. "Synthesis and Viscoelastic Behavior of Multiarm Star Polyelectrolytes," Macromolecules 38 (2005) 2911-2917.
Gao, Haifeng et al. "Synthesis of Degradable Miktoarm Star Copolymers via Atom Transfer Radical Polymerization," Macromolecules 38:14 (2005) 5995-6004.
Huang, Jinyu et al. "Synthesis and Characterization of Copolymers of 5,6-benzo-2-methylene-1,3-dioxepane and n-butyl acrylate" Polymer 46 (2005) 11698-11706.
Kowalczuk-Bleja, A. et al. "Core-Shell Polyacrylate and Polystyrene-Block-Polyacrylate Stars," Polymer 46:19 (2005) 8555-8564.
Lee, Cameron C. et al. "Designing Dendrimers for Biological Applications" Nature Biotech. 23 :12 (2005) 1517-1526.
Lee, Hyung-Jae et al. "Controlled Anionic Synthesis of Star-Shaped Polystyrene by the Incremental Additional of Divinylbenzene," J. Polm. Sci. Part A: Polym. Chem. 43 (2005) 870-878.
Liu, Jun et al. "Reversible Self-Association Increases the Viscosity of a Concentrated Monoclonal Antibody in Aqueous Solution" J Pharm Sci. 94:9 (2005) 1928-1940.
Narumi, Atsushi et al. "Star-Shaped Polystyrenes with Glycoconjugated Periphery and Interior: Synthesis and Entrapment of Hydrophilic Molecule," J. Polm. Sci. Part A: Polym. Chem. 43 (2005) 4373-4381.
Rosi, Nathaniel L. et al. "Nanostructures in Biodiagnostics" Chem Rev. 105 (2005) 1547-1562.
Wang, Fei et al. "Synthesis and Evaluation of a Star Amphiphilic Block Copolymer from Poly(C-caprolactone) and Poly(ethylene glycol) as a Potential Drug Delivery Carrier," Bioconjugate Chem. 16 (2005) 397-405.
Zheng, Genhua et al. "Preparation of Star Polymers Based on Polystyrene or Poly(styrene-b-N-isopropyl acrylamide) and Divinylbenzene via Reversible Addition-Fragmentation Chain Transfer Polymerization," Polymer 46 (2005) 2802-2810.
Ali, Monzur et al. "Synthetic Approaches to Uniform Polymers" Advanced Drug Delivery Reviews 58 (2006) 1671-1687.
Bouilhac, Cecile et al. "Benzophenone-Functionalized, Starlike Polystyrenes as Organic Supports for a Tridentate Bis(imino)pyridinyliron/Trimethylaluminum Catalytic System for Ethylene Polymerization," J. Polm. Sci. Part A: Polym. Chem. 44 (2006) 6997-7007.
Gao, Haifeng et al. "Characterization of Linear and 3-Arm Star Block Copolymers by Liquid Chromatography at Critical Conditions," Macromol. Chem. Phys. 207 (2006) 1709-1717.
Gao, Haifeng et al. "Low Polydispersity Star Polymers via Cross-Linking Macromonomers by ATRP," J. Am. Chem. Soc. 128 (2006) 15111-15113.
Gao, Haifeng et al. "Structural Control in ATRP Synthesis of Star Polymers Using the Arm-First Method," Macromolecules 39:9 (2006) 3154-3160.
Hadjichristidis, Nikos et al. "Macromolecular Architectures by Living and Controlled/Living Polymerizations," Prog. Polym. Sci. 31 (2006) 1068-1132.
Ishizu, Koji et al. "Synthesis of Amphiphilic Star Block Copolymers via Diethyldithiocarbamate-Mediated Living Radical Polymerization," J. Polm. Sci. Part A: Polym. Chem. 44 (2006) 3321-3327.

(56) References Cited

OTHER PUBLICATIONS

Jones, M.C. et al. "Self-Assembled Nanocages for Hydrophilic Guest Molecules," J. Am. Chem. Soc. 128:45 (Oct. 21, 2006) 14599-14605.
Kafouris, Demetris et al. "Synthesis and Characterization of Star Polymers and Cross-Linked Star Polymer Model Networks with Cores Based on an Asymmetric, Hydrolyzable Dimethacrylate Cross-Linker," Chem. Mater. 18 (2006) 85-93.
Kawakami, Kyoko, et al., "Salt Tolerance of an Aqueous Solution of a Novel Amphiphilic Polysaccharide Derivative," Langmuir, 22 (2006) 3337-3343.
Kreutzer, Georg et al. "Water-Soluble, Unimolecular Containers Based on Amphiphilic Multiarm Star Block Copolymers," Macromolecules 39 (2006) 4507-4516.
Lee, Cameron C. et al. "A Single Dose of Doxorubicin-Functionalized Bow-Tie Dendrimer Cures Mice Bearing C-26 Colon Carcinomas" PNAS 103 :45 (2006) 16649-16654.
Matyjaszewski, K. et al. "Diminishing Catalyst Concentration in Atom Transfer Radical Polymerization with Reducing Agents" Proc. Nat. Acad. Sci., 103:42 (2006) 15309-15314.
McCarthy, Patrick et al. "Grafting Chromatographic Stationary Phase Substrates by Atom Transfer Radical Polymerization" Controlled/Living Radical Polymerization, Chapter 18, ACS Symposium Series 944 (2006) 252-268.
McCormick, Charles L. et al. "Synthetic Routes to Stimuli-Responsive Micelles, Vesicles, and Surfaces via Controlled/Living Radical Polymerization" Polymer Reviews 46 (2006) 421-443.
Oh, Jung K. et al. "Inversive Miniemulsion ATRP: A New Method for Synthesis and Functionalization of Well-Defined Water-Soluble/Cross-Linked Polymeric Particles" J. Am. Chem. Soc. 128 (2006) 5578-5584.
Rosenberg, Amy S. "Effects of Protein Aggregates: An Immunologic Perspective" AAPS J. 8:3 (2006) E501-E507.
Taton, Daniel et al. "Controlled Polymerizations as Tools for the Design of Star-Like and Dendrimer-Like Polymers," Polym. Int. 55 (2006) 1138-1145.
Themistou, Efrosyni et al. "Synthesis and Characterization of Polymer Networks and Star Polymers Containing a Novel, Hydrolyzable Acetal-Based Dimethacrylate Cross-Linker," Macromolecules 39 (2006) 73-80.
Tsarevsky, Nicolay V. et al. "Controlled Synthesis of Polymers with Ionic or Ionizable Groups Using Atom Transfer Radical Polymerization" Polyelectrolytes and Polyzwitterions, Chapter 5, ACS Symposium Series 937 (2006) 79-94.
Wiltshire, James T. et al. "Selectively Degradable Core Cross-Linked Star Polymers," Macromolecules 39 (2006) 9018-9027.
Braunecker, W. A. et al., "Erratum to: 'Controlled/living radical polymerization: features, developments and perspectives' [Prog. Polym. Sci. 32 (2007) 93-146]", Progress in Polymer Science 33 (2008) 165.
Chong, Y. K et al. "Thiocarbonylthio End Group Removal from RAFT-Synthesized Polymers by Radical-Induced Reduction," Macromolecules 40:13 (May 22, 2007) 4446-4455.
Connal, Luke A. et al. "Synthesis of Dendron Functionalized Core Cross-Linked Star Polymers," Macromolecules 40 (2007) 7855-7863.
Gao, Haifeng et al. "Arm-First Method as a Simple and General Method for Synthesis of Miktoarm Star Copolymers," J. Am. Chem. Soc. 129:38 (2007) 11828-11834.
Gao, Haifeng et al. "Low-Polydispersity Star Polymers with Core Functionality by Cross-Linking Macromonomers Using Functional ATRP Initiators," Macromolecules 40 (2007) 399-401.
Hietala, Sami et al. "Synthesis and Rheological Properties of an Associative Star Polymer in Aqueous Solutions," Polymer 48 (2007) 4087-4096.
Shaver et al. "Organometallic Intermediates in the Controlled Radical Polymerization of Styrene by a-Diimine Iron Catalysts"; Organometallics, 26 (2007) 4725-4730.
Tsarevsky, Nicolay V. et al. "Graft Copolymers by a Combination of ATRP and Two Different Consecutive Click Reactions" Macromolecules 40:13 (2007) 4439-4445.
Adkins, Chinessa T. et al. "Synthesis of Star Polymer Architectures with Site-Isolated Chromophore Cores," Macromolecules 41 (2008) 3472-3480.
Blencowe, Anton et al. "Synthesis of Buckminsterfullerene C60 Functionalised Core Cross-Linked Star Polymers," Polymer 49 (2008) 825-830.
Fukukawa, Ken-Ichi et al. "Synthesis and Characterization of Core-Shell Star Copolymers for In Vivo PET Imaging Applications," Biomacromolecules 9 (2008) 1329-1339.
Gao, Haifeng et al. "Synthesis of Low-Polydispersity Miktoarm Star Copolymers via a Simple 'Arm-First' Method: Macromonomers as Arm Precursors," Macromolecules 41:12 (2008) 4250-4257.
Moad, Graeme et al. "Radical Addition-Fragmentation Chemistry in Polymer Synthesis" Polymer 49 (2008) 1079-1131.
Sciannamea, Valerie et al. "In-Situ Nitroxide-Mediated Radical Polymerization (NMP) Processes: Their Understanding and Optimization" Chem. Rev. 108:3 (2008) 1104-1126.
Spiniello, Marisa et al. "Synthesis and Characterization of Fluorescently Labeled Core Cross-Linked Star Polymers," J. Polm. Sci. Part A: Polym. Chem. 46 (2008) 2422-2432.
Gao, Haifeng et al. "Synthesis of Functional Polymers with Controlled Architecture by CRP of Monomers in the Presence of Cross-Linkers: From Stars to Gels," Progress in Polymer Science 34:4 (2009) 317-350.
Hietala, Sami et al. "Rheological Properties of Associative Star Polymers in Aqueous Solutions: Effect of Hydrophone Length and Polymer Topology," Macromolecules 42 (2009) 1726-1732.
Plitcha, et al., "ICAR ATRP of Styrene and Methyl Methacrylate with Ru(Cp*)Cl(PPh3)3," Macromolecules, 42 (2009), 2330-2332.
Bencherif, Sidi A. et al. "Cell-Adhesive Star Polymers Prepared by ATRP," Biomacromolecules 10 (2010) 1795-1803.
Gao, Haifeng et al. "Modular Approaches to Star and Miktoarm Star Polymers by ATRP of Cross-Linkers," Macromol. Symp. 291-292 (2010) 12-16.

* cited by examiner

SALT-TOLERANT STAR MACROMOLECULES

CROSS-REFERENCE TO RELATED APPLICATIONS

This application is a continuation application of U.S. application Ser. No. 14/765,452, filed Aug. 3, 2015, which is the National Phase application of International Application No. PCT/US2014/014416, filed Feb. 3, 2014, which designates the United States and was published in English, which further claims the benefit of priority to U.S. Provisional Application No. 61/760,210, filed Feb. 4, 2013. The foregoing related applications, in their entirety, are incorporated herein by reference. This application further incorporates by reference, in their entirety, each of the following: U.S. Pat. No. 8,173,750, U.S. application Ser. No. 12/926,780, filed Dec. 8, 2010, and U.S. Provisional Application No. 61/695,103, filed Aug. 30, 2012.

FIELD OF THE INVENTION

The present invention relates salt-tolerant star macromolecules, salt-tolerant star macromolecule compositions and methods of making and using the same.

SUMMARY OF THE INVENTION

The salt-tolerant star macromolecules of the present invention include macromolecules comprising at least two different arms with at least one arm comprising a salt-tolerant-enhancing polymeric segment and compositions comprising mixtures of salt-tolerant star macromolecules and processes/methods of making and using the same. In addition, the present invention includes formulations and systems that incorporate salt-tolerant star macromolecules and/or salt-tolerant star macromolecule compositions as well as processes/methods of making and using the same.

The salt-tolerant star macromolecules of the present invention include macromolecules having a Salt Tolerance of at least 10,000 cP, at 0.3 wt % gel in a 0.4 wt % NaCl concentration.

The salt-tolerant star macromolecules of the present invention may be suitable for providing salt tolerancy, use as thickening agents, use as rheology modifiers, use in fracking fluids, use in mining applications, use in cosmetic and personal care applications, use in home care applications, use in adhesive applications, use in electronic applications, use in medical and pharmaceutical applications, use in paper applications, or use in agricultural applications.

In one aspect the invention provides a polymer composition comprising salt-tolerant star macromolecules, each salt-tolerant star macromolecule having a core and five or more arms, wherein the number of arms within a salt-tolerant star macromolecule varies across the composition of star molecules; and the arms on a star are covalently attached to the core of the star; each arm comprises one or more (co)polymer segments; and at least one arm and/or at least one segment exhibits a different solubility from at least one other arm or one other segment, respectively, in a reference liquid of interest.

In one aspect of the invention, the salt-tolerant star macromolecule, emulsifier, gel, emulsifier-free emulsion, emulsion and/or thickening agent, including those formed by a one-pot process, ATRP, CRP, and/or combinations of one or more of these processes, may be used to provide a certain level of control over viscosity and consistency factors in many aqueous and oil based systems including, for example, fracking fluid additives, gelling agents, gels, proppant stabilizers, breakers, friction reducers, thickening agents.

In another aspect of the invention, the salt-tolerant star macromolecules may be suitable in oil and gas applications, including but not limited to, as rheology modifiers for fracturing fluids/drilling well fluids, gelling agents, gels, dispersants, proppant stabilizers and carriers, breakers, friction reducers, lubricants, scale-buildup inhibitors, heat transfer fluids, thickening agents, additives to improve oil extraction from oil sands, emulsion breakers for oil-sand-water emulsions, or additives to improve dewatering of oil sands.

In another aspect of the invention, the salt-tolerant star macromolecules may be suitable in mining applications, including but not limited to, dust suppressants, flocculating agents, gold and precious metal extraction, and precious metal processing, lubricants and drag reduction agents for pipeline slurry transport.

In another aspect of the invention, the salt-tolerant star macromolecules may be suitable in cosmetic and personal care applications, including but not limited to, cosmetic creams, lotions, gels, sprayable lotion, sprayable cream, sprayable gel, hair styling sprays and mousses, hair conditioners, shampoos, bath preparations, ointments, deodorants, mascara, blush, lip stick, perfumes, powders, serums, skin cleansers, skin conditioners, skin emollients, skin moisturizers, skin wipes, sunscreens, shaving preparations, solids, and fabric softeners.

In another aspect of the invention, the salt-tolerant star macromolecules may be suitable in home care applications, including but not limited to, cleaners for windows and glass, and other household surfaces, toilet areas, enzyme production, drain cleaners, liquid and gelled soaps, polishes and waxes, liquid and powdered detergents including detergents for laundry and in dish washing.

In another aspect of the invention, the salt-tolerant star macromolecules may be suitable in adhesive applications, including but not limited to, associative complexes, billboard adhesives, carpet backsizing compounds, hot melt adhesives, labeling adhesives, latex adhesives, leather processing adhesives, plywood laminating adhesives, paper adhesives, wallpaper pastes, wood glue.

In another aspect of the invention, the salt-tolerant star macromolecules may be suitable in electronic applications, including but not limited to, antistatic film and packaging, conductive inks, rheology control agents used for copper foil production, multilayer ceramic chip capacitors, photoresists, plasma display screens, lubricants for wire, cable, and optical fibers, gel lacquers for coil coating.

In another aspect of the invention, the salt-tolerant star macromolecules may be suitable in medical and pharmaceutical applications, including but not limited to, but not limited to, medical device lubrication, antibacterial coatings, pharmaceutical excipients such as binders, diluents, fillers, lubricants, glidants, disintegrants, polish agents, suspending agents, dispersing agents, plasticizers.

In another aspect of the invention, the salt-tolerant star macromolecules may be suitable in paper applications, including but not limited to, coatings, dispersion for tissue and thin papers, filler retention and drainage enhancement, flocculation and pitch control, grease-proof coatings, adhesives, release coatings, surface sizing, sizes for gloss and ink holdout, tail tie and pickup adhesives for papermaking.

In another aspect of the invention, the salt-tolerant star macromolecules may be suitable in agricultural applications, including but not limited to, animal feed, dispersing agents, drift control, encapsulation, seed coatings, seed tape, spray adherents, water-based sprays and spray emulsions, water-soluble packaging.

In another aspect of the invention, the salt-tolerant star macromolecules may be suitable in other applications including but not limited to, water- and solvent-based coating compositions, water- and solvent-based lubricants, water- and solvent-based viscosity index modifiers, paints, plasticizers, antifoaming agents, antifreeze substances, corrosion inhibitors, detergents, dental impression materials, dental fillers, inkjet printer ink and other inks, ceramic and brick forming, prepolymers such as polyols for use in polyesters, polyurethanes, polycarbonates. For rheology modifier applications, characteristics are high gel strength, stability in the presence of salt and increased temperatures, high shear thinning characteristics, forms versatile low viscosity soluble concentrations, and synergistic interactions with added agents to adjust their rheology profile to optimize properties such as sedimentation, flow and leveling, sagging, spattering, etc.

In another aspect of the invention, there is a salt-tolerant star macromolecule, or a method of making or using the same, that when dissolved in water at a concentration of at least 0.3 wt. % forms a homogeneous gel and has a dynamic viscosity of at least 10,000 cP in a 0.4 wt. % NaCl aqueous solution, such as a dynamic viscosity of at least 25,000 cP in 0.2 wt. % NaCl aqueous solution, according to the Salt Tolerance Test.

In another aspect of the invention, there is a salt-tolerant star macromolecule, or a method of making or using the same, that when dissolved in water at a concentration of at least 0.3 wt. % forms a homogeneous gel and has a dynamic viscosity in a NaCl-containing aqueous solution that is greater than the dynamic viscosity at 0.0 wt. % NaCl aqueous solution, such as having a maximum dynamic viscosity in an aqueous NaCl solution having a NaCl concentration other than 0.0 wt. %, or has an increase in dynamic viscosity with an increase in NaCl concentration, according to the Salt Tolerance Test.

In another aspect of the invention, there is a salt-tolerant star macromolecule, or a method of making or using the same, that when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test, and has a dynamic viscosity at 80° C. that is at least 50% relative to viscosity of the gel at 25° C., according to the Temperature Stability Test, such as a dynamic viscosity at 60° C. that is at least 60% relative to viscosity of the gel at 25° C., according to the Temperature Stability Test.

In another aspect of the invention, there is a salt-tolerant star macromolecule, or a method of making or using the same, that when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test, wherein the salt-tolerant star macromolecule comprises:
  i) a core;
  ii) a plurality of hydrophilic polymeric arms; and
  iii) at least one salt-tolerant-enhancing copolymeric arm, comprising:
    a) a hydrophilic polymeric polymerized segment proximal to the core; and
    b) a salt-tolerant-enhancing polymeric segment distal to the core, wherein the salt-tolerant-enhancing polymeric segment comprises: i) repeat units of monomeric residues of one or more polymerized salt-tolerant-enhancing monomers; and ii) optionally, repeat units of monomeric residues of one or more polymerized hydrophobic or hydrophilic monomers.

In another aspect of the invention, there is a salt-tolerant star macromolecule, or a method of making or using the same, that when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test, wherein the salt-tolerant star macromolecule comprises:
  i) a core;
  ii) a plurality of hydrophilic polymeric arms; and
  iii) at least one salt-tolerant-enhancing copolymeric arm, comprising:
    a) a hydrophilic polymeric polymerized segment proximal to the core; and
    b) a salt-tolerant-enhancing polymeric segment distal to the core, wherein the salt-tolerant-enhancing polymeric segment comprises: i) repeat units of monomeric residues of one or more polymerized salt-tolerant-enhancing monomers; and ii) optionally, repeat units of monomeric residues of one or more polymerized hydrophobic or hydrophilic monomers;
  wherein the salt-tolerant-enhancing polymeric segment comprises in the range of between 5-35% of the monomeric residues of one or more polymerized salt-tolerant-enhancing monomers.

In another aspect of the invention, there is a salt-tolerant star macromolecule, or a method of making or using the same, that when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test, wherein the salt-tolerant star macromolecule comprises:
  i) a core;
  ii) a plurality of hydrophilic polymeric arms; and
  iii) at least one salt-tolerant-enhancing copolymeric arm, comprising:
    a) a hydrophilic polymeric polymerized segment proximal to the core; and
    b) a salt-tolerant-enhancing polymeric segment distal to the core, wherein the salt-tolerant-enhancing polymeric segment comprises: i) repeat units of monomeric residues of one or more polymerized salt-tolerant-enhancing monomers; and ii) optionally, repeat units of monomeric residues of one or more polymerized hydrophobic or hydrophilic monomers;
  wherein the salt-tolerant-enhancing monomers comprise ionizable monomers, anionic monomers, cationic monomers, or hydrogen-bonding capable monomers.

In another aspect the invention, there is a salt-tolerant star macromolecule, or a method of making or using the same, that when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test, wherein the salt-tolerant star macromolecule is represented by Formula Z:

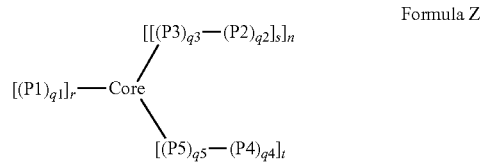

Formula Z wherein:
Core represents a crosslinked polymeric segment;
P1 represents a hydrophilic polymeric segment comprised of repeat units of monomeric residues of one or more polymerized hydrophilic monomers;
P2 independently represents a salt-tolerant-enhancing polymeric segment comprising repeat units of:
   a) monomeric residues of one or more polymerized salt-tolerant-enhancing monomers; and
   b) optionally, monomeric residues of one or more polymerized hydrophobic or hydrophilic monomers;
P3 independently represents a hydrophilic polymeric segment comprised of repeat units of monomeric residues of one or more polymerized hydrophilic monomers;
P4 represents a hydrophobic polymeric segment comprised of repeat units of monomeric residues of one or more polymerized hydrophobic monomers;
P5 represents a hydrophilic polymeric segment comprised of repeat units of monomeric residues of one or more polymerized hydrophilic monomers;
q1 represents the number of repeat units in P1 and has a value between 10 and 2000;
q2 independently represents the number of repeat units in P2 and has a value between 10 and 500;
q3 independently represents the number of repeat units in P3 and has a value between 10 and 2000;
q4 represents the number of repeat units in P4 and has a value between 10 and 500;
q5 represents the number of repeat units in P5 and has a value between 10 and 2000;
r represents the number of polymeric arms covalently attached to the Core and has a value in the range of from 0 to 1000;
s independently represents the number of salt-tolerant-enhancing copolymeric arms covalently attached to the Core and has a value in the range of from 1 to 1000;
t represents the number of copolymeric arms covalently attached to the Core and has a value in the range of from 0 to 1000; and
n represents the number of salt-tolerant-enhancing arm types covalently attached to the Core and has a value of at least 1;
wherein:
   i) the molar ratio of:
      a) r to s is in the range of between 40:1 and 1:40;
      b) the molar ratio of r to t is in the range of between 40:1 and 1:40;
      c) the molar ratio of t to s is in the range of between 40:1 and 1:40;
      d) the molar ratio of r to (s+t) is in the range of between 40:1 and 1:40; or
      e) combinations thereof; and
   ii) r and t cannot both equal zero unless n represents a value of at least 2.

In another aspect the invention, there is a salt-tolerant star macromolecule, or a method of making or using the same, that when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test, wherein the salt-tolerant star macromolecule is a mikto star macromolecule.

In another aspect the invention, there is a salt-tolerant star macromolecule, or a method of making or using the same, that when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test, wherein the salt-tolerant star macromolecule has a molecular weight (Mn) in the range of from 5,000 g/mol to 10,000,000 g/mol, or the arms of the salt-tolerant star macromolecule independently have a molecular weight (Mn) in the range of from 1,000 g/mol to 250,000 g/mol.

In another aspect the invention, there is a salt-tolerant star macromolecule, or a method of making or using the same, that when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test, wherein the salt-tolerant star macromolecule has a viscosity of greater than 40,000 cP at a pH between 6 to 11, or has a viscosity of less than 5,000 cP at a shear rate of 4 sec$^{-1}$.

In another aspect the invention, there is a salt-tolerant star macromolecule comprising a mixture of 2 or more arm types, such as 3 or more arm types, that when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test. For example, the 2 or more arm types, such as 3 or more arm types, of the salt-tolerant star macromolecule may comprise homopolymeric arm types, copolymeric arm types, hydrophilic arm types, hydrophobic arm types, salt-tolerant-enhancing arm types, or combinations, mixtures, or varying molar ratios thereof. The 2 or more arm types, such as 3 or more arm types, of the salt-tolerant star macromolecule may comprise varying degrees of polymerization. In another aspect the invention, the dynamic viscosity of the salt-tolerant star macromolecule comprising a mixture of 2 or more arm types, such as 3 or more arm types, may be dependent on the molar ratio of the mixture of arm types of said salt-tolerant star macromolecule, according to the Salt Tolerance Test, or may be NaCl concentration dependent, according to the Salt Tolerance Test, or combinations thereof.

In another aspect the invention, there is a salt-tolerant thickening agent, or a method of making or using the same, comprising a salt-tolerant star macromolecule that when dissolved in water at a concentration of at least 0.3 wt. % forms a homogeneous gel and has a dynamic viscosity of at least 10,000 cP in a 0.4 wt. % NaCl aqueous solution, such as a dynamic viscosity of at least 25,000 cP in 0.2 wt. % NaCl aqueous solution, according to the Salt Tolerance Test.

In another aspect the invention, there is a method of making a salt-tolerant composition, comprising: adding the salt-tolerant star macromolecule that when dissolved in water at a concentration of at least 0.3 wt. % forms a homogeneous gel and has a dynamic viscosity of at least 10,000 cP in a 0.4 wt. % NaCl aqueous solution, such as a dynamic viscosity of at least 25,000 cP in 0.2 wt. % NaCl aqueous solution, according to the Salt Tolerance Test.

In another aspect the invention, there is a method of making an aqueous composition salt-tolerant, comprising: adding the salt-tolerant star macromolecule that when dissolved in water at a concentration of at least 0.3 wt. % forms a homogeneous gel and has a dynamic viscosity of at least 10,000 cP in a 0.4 wt. % NaCl aqueous solution, such as a dynamic viscosity of at least 25,000 cP in 0.2 wt. % NaCl aqueous solution, according to the Salt Tolerance Test.

In another aspect the invention, there is a one-pot method of preparing a star macromolecule, comprising:
   i) preparing one or more of a first arm, comprising:
      a) feeding a first amount of a radical initiator in a controlled manner to a reaction vessel containing a first group of monomers at a pre-determined temperature; and b) polymerizing the first group of monomers to greater than 15% monomer conversion;
ii) preparing one or more of a second arm and, optionally, extending the prepared one or more first arms, comprising:
   a) adding a second arm initiator to the reaction vessel;
   b) adding a second group of monomers to the reaction vessel;
   c) feeding a second amount of the radical initiator in a controlled manner to the reaction vessel containing the second arm initiator, the second group of monomers, and optionally the prepared one or more first arms, at a pre-determined temperature; and
   d) polymerizing the second group of monomers to greater than 70% monomer conversion;
iii) optionally, repeating step ii) to prepare one or more of a third arm;
iv) crosslinking the prepared one or more first arms, the prepared one or more second arms, and optionally, the prepared one or more third arms; and
v) isolating the prepared star macromolecule.

In another aspect the invention, there is a one-pot method of preparing a star macromolecule, comprising:
i) preparing one or more of a first arm, comprising:
   a) feeding a first amount of a radical initiator in a controlled manner to a reaction vessel containing a first group of monomers at a pre-determined temperature; and
   b) polymerizing the first group of monomers to greater than 15% monomer conversion;
ii) preparing one or more of a second arm and, optionally, extending the prepared one or more first arms, comprising:
   a) adding a second arm initiator to the reaction vessel;
   b) adding a second group of monomers to the reaction vessel;
   c) feeding a second amount of the radical initiator in a controlled manner to the reaction vessel containing the second arm initiator, the second group of monomers, and optionally the prepared one or more first arms, at a pre-determined temperature; and
   d) polymerizing the first group of monomers to greater than 70% monomer conversion;
iii) optionally, repeating step ii) to prepare one or more of a third arm;
iv) crosslinking the prepared one or more first arms, the prepared one or more second arms, and optionally, the prepared one or more third arms; and
v) isolating the prepared star macromolecule;
wherein the one-pot method reduces the preparation time by at least 75%, relative to multi-pot preparations, is exclusive of intermediate purification steps, or consists of one washing step after crosslinking.

In one aspect of the invention, there is a salt-tolerant star macromolecule, or a method of making or using the same, comprising: a plurality of arms comprising at least two types of arms, wherein a first-arm-type extends beyond a second-arm-type and said first-arm-type has a salt-tolerant-enhancing segment on its distal end, wherein at least a portion of the salt-tolerant-enhancing segment may extend beyond the length of the second-arm-types either by the size of the monomeric segment or segments (which may be varied by length of monomeric residue, degree of polymerization, and/or both) for which the salt-tolerant-enhancing segment is attached.

In one aspect of the invention, there is a salt-tolerant star macromolecule, or a method of making or using the same, comprising: a plurality of arms comprising at least three types of arms, wherein a first-arm-type extends beyond a second-arm-type and said first-arm-type has a salt-tolerant-enhancing segment (homopolymeric or copolymeric) on its distal end, wherein at least a portion of the salt-tolerant-enhancing segment may extend beyond the length of the second-arm-types either by the size of the monomeric segment or segments (which may be varied by length of monomeric residue, degree of polymerization, and/or both) for which the salt-tolerant-enhancing segment is attached; and wherein a third-arm-type extends beyond a second-arm-type and said third-arm-type has a hydrophobic segment (homopolymeric or copolymeric) on its distal end, wherein at least a portion of the hydrophobic segment (homopolymeric or copolymeric) may extend beyond the length of the second-arm-types either by the size of the monomeric segment or segments (which may be varied by length of monomeric residue, degree of polymerization, and/or both) for which the hydrophobic segment (homopolymeric or copolymeric) is attached.

Recognizing that the "length" of an arm or segment and the "extending beyond" limitation may be theoretical, meaning that while it is not empirically measured it is understood to "extend beyond" and/or have a longer "length" relative to the length of the second-arm-type if the degree of polymerization is greater for monomeric residues of the same type or of the same theoretical length.

In one aspect of the invention, there is a salt-tolerant star macromolecule, or a method of making or using the same, comprising: a plurality of arms comprising at least two types of arms, wherein the degree of polymerization of a first-arm-type is greater than the degree of polymerization of a second-arm-type, and wherein said first-arm-type has a distal end portion that is salt-tolerant-enhancing. In another aspect of the invention, this star macromolecule may be formed by first forming or obtaining the salt-tolerant-enhancing portion then forming the remaining portion of the first-arm-type from the end of the salt-tolerant-enhancing portion and the second-arm-type, in a one-pot synthesis, wherein the polymerization of the second portion of the first-arm-type is commenced prior to the initialization of the second-arm-type but there is at least some point wherein portions, e.g., substantial portions, of the first-arm-type and second-arm-type are being polymerically extended simultaneously.

In one aspect of the invention, there is a salt-tolerant star macromolecule, or a method of making or using the same, comprising: a plurality of arms comprising at least three types of arms, wherein the degree of polymerization of a first-arm-type and a third-arm-type are greater than the degree of polymerization of a second-arm-type, and wherein said first-arm-type and said third-arm-type have a distal end portion that is hydrophobic and salt-tolerant-enhancing, respectively. In another aspect of the invention, this star macromolecule may be formed by first forming or obtaining the hydrophobic portion and the salt-tolerant-enhancing portion then forming the remaining portion of the first-arm-type from the end of the hydrophobic, the third-arm-type from the end of the salt-tolerant-enhancing portion, and the second-arm-type, in a one-pot synthesis, wherein the polymerization of the second portion of the first-arm-type and the second portion of the third-arm-type are commenced prior to the initialization of the second-arm-type but there is at least some point wherein portions, e.g., substantial portions, of the first-arm-type, third-arm-type, and second-arm-type are being polymerically extended simultaneously.

In one aspect of the invention, there is an oil-soluble, salt-tolerant star macromolecule, or a method of making or using the same, comprising: a plurality of different arms comprising at least two types of arms, wherein a first-arm-type extends beyond a second-arm-type and said first-arm-type has a salt-tolerant-enhancing segment (homopolymeric or copolymeric) on its distal end, and said second-arm-type has a hydrophilic segment on its distal end.

In one aspect of the invention, there is an oil-soluble, salt-tolerant star macromolecule, or a method of making or using the same, comprising: a plurality of different arms comprising at least three types of arms, wherein a first-arm-type extends beyond a second-arm-type and said first-arm-type has a salt-tolerant-enhancing segment (homopolymeric or copolymeric) on its distal end, and the second-arm-type has a hydrophilic segment on its distal end, and wherein a third-arm-type extends beyond said second-arm-type and the third-arm-type has a hydrophobic segment (homopolymeric or copolymeric) on its distal end.

In one aspect of the invention, there is an oil-soluble, salt-tolerant star macromolecule, or a method of making or using the same, comprising: a plurality of arms comprising at least two types of arms, wherein the degree of polymerization of a first-arm-type is greater than the degree of polymerization of a second-arm-type, and wherein said first-arm-type has a salt-tolerant-enhancing segment on its distal end, and wherein said second-arm-type has a hydrophilic segment on its distal end.

In one aspect of the invention, there is an oil-soluble, salt-tolerant star macromolecule, or a method of making or using the same, comprising: a plurality of arms comprising at least three types of arms, wherein the degree of polymerization of a first-arm-type is greater than the degree of polymerization of a second-arm-type, and wherein said first-arm-type has a salt-tolerant-enhancing segment on its distal end, and wherein said second-arm-type has a hydrophilic segment on its distal end, and wherein the degree of polymerization of a third-arm-type is greater than the degree of polymerization of the second-arm-type, and wherein said third-arm-type has a hydrophobic (homopolymeric or copolymeric) on its distal end.

In one aspect of the invention, there is a salt-tolerant star macromolecule, or a method of making or using the same, comprising: a plurality of arms comprising at least two types of arms, wherein the degree of polymerization of a first-arm-type is greater than the degree of polymerization of a second-arm-type, and wherein said first-arm-type has a distal end portion that is salt-tolerant-enhancing, and the proximal portion of the first-arm-type and the second-arm-type are the same with the only difference between the first-arm-type and the second-arm-type being that the first-arm-type has a salt-tolerant-enhancing portion on its distal end. In another aspect of the invention, this star macromolecule may be formed by first forming or obtaining the salt-tolerant-enhancing portion and then forming the remaining portion of the first-arm-type from the end of the salt-tolerant-enhancing portion, and the second-arm-type simultaneously in a one-pot synthesis.

In one aspect of the invention, there is a salt-tolerant star macromolecule, or a method of making or using the same, comprising: a plurality of arms comprising at least three types of arms, wherein the degree of polymerization of a first-arm-type and third-arm-type are greater than the degree of polymerization of a second-arm-type, and wherein said first-arm-type and third-arm-type have a distal end portion that is salt-tolerant-enhancing and hydrophobic, respectively, and the proximal portion of the first-arm-type and the third-arm-type and the second-arm-type are the same with the only difference between the first-arm-type and the third-arm-type and the second-arm-type being that the first-arm-type and the third-arm-type have a salt-tolerant-enhancing and hydrophobic portion on their distal ends, respectively. In another aspect of the invention, this star macromolecule may be formed by first forming or obtaining the salt-tolerant-enhancing portion and the hydrophobic portion and then forming the remaining portion of the first-arm-type and third-arm-type from the end of the salt-tolerant-enhancing and hydrophobic portion, respectively, and the second-arm-type simultaneously in a one-pot synthesis.

BRIEF DESCRIPTION OF THE FIGURES

The following figures exemplify aspects of the disclosed process but do not limit the scope of the process to the examples discussed.

DETAILED DESCRIPTION OF THE INVENTION

Figure 1:
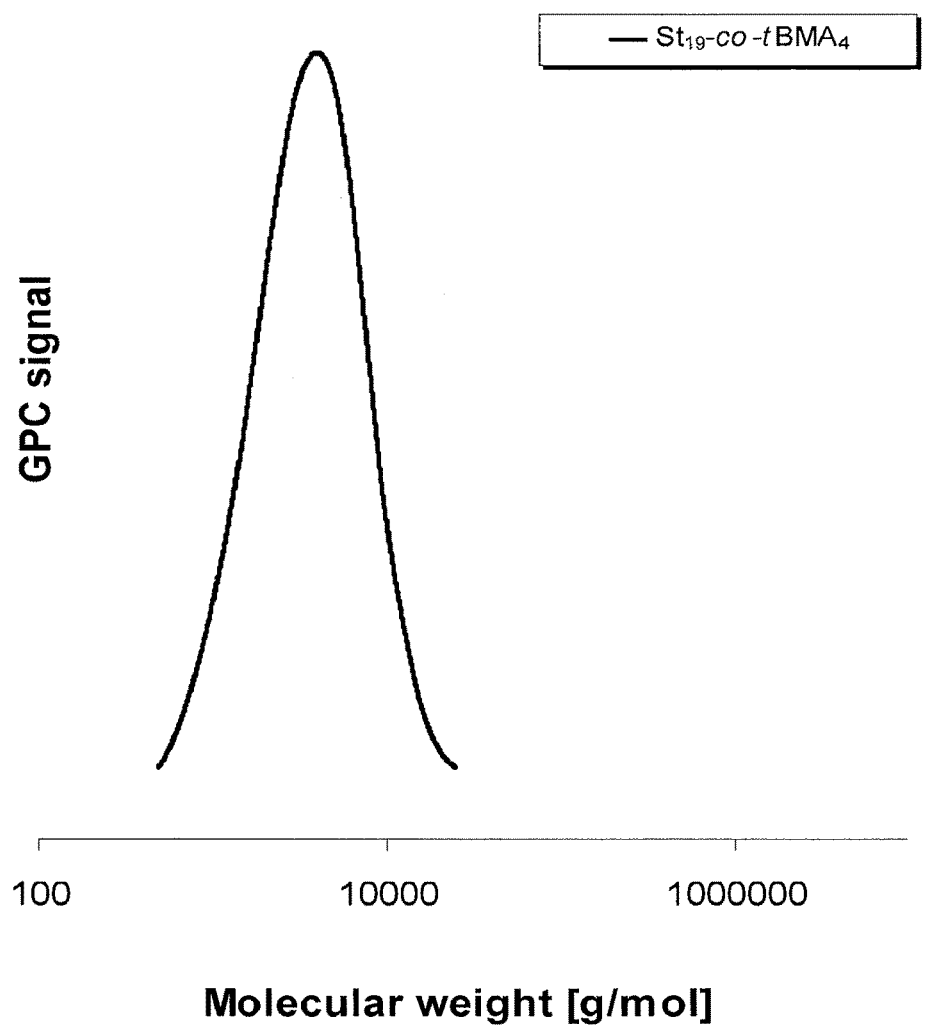
FIG. 1. GPC curve for the poly(styrene-co-tert-butyl methacrylate) macroinitiator formed in step 1 of the synthesis of an exemplary $(St_{19}$-co-$MAA_4)$-b-$AA_{325}$/$AA_{98})$ star macromolecule.

The term "solubility" or "soluble" is understood to mean that when a component is mixed into a solvent and tested, at STP in a 1 cm cuvette, it has a light transmittance value, at a wavelength at or around a UV/Vis minimum wavelength for the mixture, of at least 40%, for example, at least 50%, 70%, 85%, or at least 95%.

The term "clear" as is used to describe a homogenous gel or homogenous solution is understood to mean that when the gel or solution is tested, at STP in a 1 cm cuvette, it has a light transmittance value, at a wavelength at or around a UV/Vis minimum wavelength for the gel or solution, of at least 40%, for example, at least 50%, 70%, 85%, or at least 95%.

The term "water-soluble monomer" is understood to mean a monomer having at least about 10 wt. % solubility in water at STP. For example, a water soluble monomer may have at least 15 wt. %, 20 wt. %, 25 wt. %, or at least 30 wt. % solubility in water at STP.

The term "water-insoluble monomer" is understood to mean a monomer having less water solubility than a water soluble monomer, for example, less that about 5 wt. %, such as less than 1 wt. % or 0.5 wt. % solubility in water at STP.

The term "water-soluble star macromolecule" is understood to mean a star macromolecule that is soluble in water, pH adjusted if necessary to a pH of no greater than 8 with sodium hydroxide, at a concentration of at least 5 g/L, for example, between 8 g/L to 100 g/L, such as, at least 10 g/L, 12 g/L, 15 g/L, or at least 20 g/L. For example, a water-soluble star macromolecule having an aqueous solubility of at least 10 g/L may include the introduction of at least 10 g of the star macromolecule into approximately 1 L of water, neutralizing the mixture, if necessary, by adjusting the pH of the resulting mixture to about pH 8 (e.g., with the addition of base, such as sodium hydroxide), and vigorously stirring at a temperature no greater than 100° C. for no more than about 60 minutes, to achieve dissolution of the star macromolecule, and testing the solubility at STP.

The term "oil-soluble star macromolecule" is understood to mean a star macromolecule that is soluble in mineral oil at a concentration of at least 5 g/L, for example, between 8 g/L to 100 g/L, such as, at least 10 g/L, 12 g/L, 15 g/L, or at least 20 g/L of mineral oil. For example, an oil-soluble star macromolecule having an oil solubility of at least 10 g/L may include the introduction of at least 10 g of the star macromolecule into approximately 1 L of mineral oil, and vigorously stirring at a temperature no greater than 100° C. for no more than about 60 minutes, to achieve dissolution of the star macromolecule, and testing the solubility at STP.

The term "hydrophilic" is understood to mean, in relation to a material, such as a polymeric arm, or a polymeric segment of a polymeric arm, that the material is water soluble and comprises hydrophilic segments having an HLB equal to or greater than 8, for example, an HLB equal to 16-20, or equal to or greater than 18, 19, or 19.5. In certain embodiments, the hydrophilic segment may comprise at least 75 mol % of water-soluble monomer residues, for example, between 80 mol % to 100 mol % or at least 85 mol %, 90 mol %, 95 mol %, or at least 97 mol % water-soluble monomer residues.

The term "hydrophobic" is understood to mean, in relation to a material, such as a polymeric arm, or a polymeric segment of a polymeric arm, that the material is water insoluble and comprises hydrophilic segments having an HLB less than 8, for example, an HLB less than 7. In certain embodiments, the hydrophobic segment may comprise at least 75 mol % of water-insoluble monomer residues, for example, between 80 mol % to 100 mol % or at least 85 mol %, 90 mol %, 95 mol %, or at least 97 mol % water-insoluble monomer residues.

The term "monomer residue" or "monomeric residue" is understood to mean the residue resulting from the polymerization of the corresponding monomer. For example, a polymer derived from the polymerization of an acrylic acid monomer (or derivatives thereof, such as acid protected derivatives of acrylic acid including but not limited to t-butyl ester of acrylic acid), will provide polymeric segments, identified as PAA, comprising repeat units of monomeric residues of acrylic acid, i.e., "—$CH(CO_2H)CH_2$—". For example, a polymer derived from the polymerization of styrene monomers will provide polymeric segments, identified as PSt, comprising repeat units of monomeric residues of styrene, i.e., "—$CH(C_6H_5)CH_2$—." For example, a polymer derived from the polymerization of monomeric divinylbenzene monomers will provide polymeric segments comprising repeat units of monomeric residues of divinylbenzene, i.e., "—$CH_2CH(C_6H_5)CHCH_2$—."

The term "emulsifier" is understood to mean a component that comprises an appreciable weight percent of an amphiphilic compound having a molecular weight of less than 5,000 MW. Emulsifiers are usually linear organic compounds that contain both hydrophobic portions (tails) and hydrophilic portions (heads), i.e., are amphiphilic. Examples of emulsifiers include but are not limited to: alkyl benzenesulfonates, alkanesulfonates, olefin sulfonates, alkylethersulfonates, glycerol ether sulfonates, α-methyl ester sulfonates, sulfofatty acids, alkyl sulfates, fatty alcohol ether sulfates, glycerol ether sulfates, hydroxy mixed ether sulfates, monoglyceride (ether) sulfates, fatty acid amide (ether) sulfates, mono- and dialkylsulfosuccinates, mono- and dialkylsulfosuccinamates, sulfotriglycerides, ether carboxylic acids and salts thereof, fatty acid isethionates, fatty acid sarcosinates, fatty acid taurides, acyl lactylates, acyl tartrates, acyl glutamates, acyl aspartates, alkyl oligoglucoside sulfates, protein fatty acid condensates (particularly wheat-based vegetable products) and alkyl (ether) phosphates, alkylbetaines, alkylamidobetaines, aminopropionates, aminoglycinates, imidazoliniumbetaines and sulfobetaines.

The term "emulsifier-free" is understood to mean a composition or mixture wherein the formulation is substantially devoid of any emulsifiers, for example less than 0.1 wt. % of emulsifier, relative to the total composition, or less than 0.05 wt. % of emulsifier, relative to the total composition, or less than 0.01 wt. % of emulsifier, relative to the total composition, or a formulation where there is no emulsifier.

The term "STP" is understood to mean standard conditions for temperature and pressure for experimental measurements, wherein the standard temperature is a temperature of 25° C. and the standard pressure is a pressure of 1 atm.

The term "hydroxyl" and "hydroxy" is understood to mean the functional group —OH.

The term "salt-tolerant-enhancing" is understood to mean any monomer, polymer, polymeric segment, or star macromolecules having an ionizable functional group, an anionic functional group, a cationic functional group, or a hydrogen-bonding capable functional group, such as a hydrogen bond donating functional group or a hydrogen bond accepting functional group.

In certain embodiments, the salt-tolerant star macromolecules of the present invention, when dissolved in water at a concentration of at least 0.3 wt. % form a homogeneous gel and have a dynamic viscosity of at least 10,000 cP in a 0.4 wt. % NaCl aqueous solution, according to the Salt Tolerance Test, for example, have a dynamic viscosity of at least 15,000 cP in a 0.4 wt. % NaCl aqueous solution, such as between 10,000 cP and 150,000 cP; between 10,000 cP and 125,000 cP; between 10,000 cP and 100,000 cP; between 10,000 cP and 75,000 cP; between 10,000 cP and 50,000 cP; between 10,000 cP and 40,000 cP; between 30,000 cP and 100,000 cP; or between 50,000 cP and 150,000 cP, in a 0.4 wt. % NaCl aqueous solution, according to the Salt Tolerance Test. The salt-tolerant star macromolecules of the present invention, when dissolved in water at a concentration of at least 0.3 wt. %, for example, at least 0.35 wt. %, such as at least 0.4 wt. %, at least 0.45 wt. %, or at least 0.5 wt. %, form a homogeneous gel and have a dynamic viscosity of at least 10,000 cP in a 0.4 wt. % NaCl aqueous solution, according to the Salt Tolerance Test. The salt-tolerant star macromolecules of the present invention, when dissolved in water at a concentration of at least 0.3 wt. % form a homogeneous gel and have a dynamic viscosity of at least 10,000 cP in a 0.4 wt. % NaCl aqueous solution, according to the Salt Tolerance Test, for example, have a dynamic viscosity of at least 10,000 cP in a 0.45 wt. % NaCl aqueous solution, such as in a 0.5 wt. %; 0.55 wt. %; 0.6 wt. %; 0.65 wt. %; 0.7 wt. %; 0.75 wt. %; 0.8 wt. %; 0.85 wt. %; 0.9 wt. %; 0.95 wt. %; or 1.0 wt. % NaCl aqueous solution, according to the Salt Tolerance Test.

In certain embodiments, the salt-tolerant star macromolecules of the present invention, when dissolved in water at a concentration of at least 0.3 wt. % form a homogeneous gel and have a dynamic viscosity of at least 25,000 cP in 0.2 wt. % NaCl aqueous solution, according to the Salt Tolerance Test, for example, have a dynamic viscosity of at least 30,000 cP in a 0.5 wt. % NaCl aqueous solution, such as between 25,000 cP and 150,000 cP; between 25,000 cP and 125,000 cP; between 25,000 cP and 100,000 cP; between 25,000 cP and 75,000 cP; between 25,000 cP and 50,000 cP; between 25,000 cP and 40,000 cP; between 30,000 cP and 100,000 cP; or between 50,000 cP and 150,000 cP, in a 0.2 wt. % NaCl aqueous solution, according to the Salt Tolerance Test.

In certain embodiments, the salt-tolerant star macromolecules of the present invention, when dissolved in water at a concentration of at least 0.3 wt. % form a homogeneous gel and have a dynamic viscosity in a NaCl-containing aqueous solution that is greater than the dynamic viscosity at 0.0 wt. % NaCl aqueous solution, according to the Salt Tolerance Test, for example, have a maximum dynamic viscosity in an aqueous NaCl solution having a NaCl concentration other than 0.0 wt. %, according to the Salt Tolerance Test, such as a maximum dynamic viscosity in an aqueous NaCl solution having a NaCl concentration of greater than 0.05 wt. % NaCl, such as between 0.05 wt. % and 5 wt. % NaCl concentration; between 0.05 wt. % and 4 wt. %; between 0.05 wt. % and 3 wt. %; between 0.05 wt. % and 2 wt. %; between 0.05 wt. % and 1 wt. %; between 0.05 wt. % and 0.5 wt. %; between 0.1 wt. % and 5 wt. %; between 0.2 wt. % and 2.5 wt. %; or between 0.15 wt. % and 1 wt. %. In certain embodiments, the salt-tolerant star macromolecule has a dynamic viscosity in 0.01-0.5 wt. % NaCl aqueous solution greater than the dynamic viscosity in a 0.0 wt. % NaCl aqueous solution, according to the Salt Tolerance Test, such as a dynamic viscosity in 0.1 wt. % NaCl aqueous solution greater than the dynamic viscosity in a 0.05 wt. % NaCl aqueous solution, according to the Salt Tolerance Test. In certain embodiments, the salt-tolerant star macromolecule, when dissolved in water at a concentration of at least 0.3 wt. % form a homogeneous gel, has an increase in dynamic viscosity with an increase in NaCl concentration, according to the Salt Tolerance Test, such as a dynamic viscosity that increases with increasing NaCl concentration, according to the Salt Tolerance Test.

In certain embodiments, the salt-tolerant star macromolecules of the present invention, when dissolved in water at a concentration of at least 0.3 wt. % form a homogeneous gel and has a dynamic viscosity in a 0.1 wt. % NaCl aqueous solution that is at least 50% of the dynamic viscosity at 0.0 wt. % NaCl aqueous solution, according to the Salt Tolerance Test, for example, at least 60%, such as at least 65%; at least 70%; at least 75%; at least 80%; at least 90%; at least 100%; or greater than 100% of the dynamic viscosity at 0.0 wt. % NaCl aqueous solution, according to the Salt Tolerance Test.

In certain embodiments, the salt-tolerant star macromolecules of the present invention, when dissolved in water at a concentration of at least 0.3 wt. % form a homogeneous gel and has a dynamic viscosity in a 0.2 wt. % NaCl aqueous solution that is at least 25% of the dynamic viscosity at 0.0 wt. % NaCl aqueous solution, according to the Salt Tolerance Test, for example, at least 30%, such as at least 40%; at least 50%; at least 60%; at least 75%; at least 90%; at least 100%; or greater than 100% of the dynamic viscosity at 0.0 wt. % NaCl aqueous solution, according to the Salt Tolerance Test. In certain embodiments, the salt-tolerant star macromolecule has a dynamic viscosity of the salt-tolerant star macromolecule in a 0.4 wt. % NaCl aqueous solution is at least 30% of the dynamic viscosity at 0.0 wt. % NaCl aqueous solution, according to the Salt Tolerance Test, for example, at least 35%, such as at least 40%; at least 45%; at least 50%; at least 55%; at least 60%; at least 75%; at least 80%; at least 90%; or greater than 100% of the dynamic viscosity at 0.0 wt. % NaCl aqueous solution, according to the Salt Tolerance Test.

In certain embodiments, the salt-tolerant star macromolecules of the present invention, when dissolved in water at a concentration of at least 0.3 wt. % form a homogeneous gel and have a dynamic viscosity of at least 10,000 cP in a 0.5 wt. % NaCl aqueous solution, according to the Salt Tolerance Test, and have a dynamic viscosity at 80° C. is at least 50% relative to viscosity of the gel at 25° C., according to the Temperature Stability Test, for example at least 55%, such as at least 60%; at least 70%; at least 80%; or at least 90%, relative to viscosity of the gel at 25° C., according to the Temperature Stability Test.

In certain embodiments, the salt-tolerant star macromolecules of the present invention, when dissolved in water at a concentration of at least 0.3 wt. % form a homogeneous gel and have a dynamic viscosity of at least 10,000 cP in a 0.5 wt. % NaCl aqueous solution, according to the Salt Tolerance Test, and have a dynamic viscosity at 60° C. is at least 60% relative to viscosity of the gel at 25° C., according to the Temperature Stability Test, for example at least 65%, such as at least 70%; at least 75%; at least 80%; or at least 90%, relative to viscosity of the gel at 25° C., according to the Temperature Stability Test.

In certain embodiments, the salt-tolerant star macromolecules of the present invention, comprise: i) a core, such as a hydrophobic core or a hydrophilic core; ii) a plurality of hydrophilic polymeric arms; and iii) at least one salt-tolerant-enhancing copolymeric arm, comprising: a) a hydrophilic polymeric polymerized segment proximal to the core; and b) a salt-tolerant-enhancing polymeric segment distal to the core. In certain embodiments, the one or more of the arms of the plurality of hydrophilic polymeric arms of the salt-tolerant star macromolecule may comprise a hydrophilic homopolymeric arm or a hydrophilic copolymeric arm, for example, a block copolymeric arm, a gradient copolymeric arm, or a random copolymeric arm.

In certain embodiments, the salt-tolerant-enhancing polymeric segment distal to the core may comprise a salt-tolerant-enhancing homopolymeric segment or a salt-tolerant-enhancing copolymeric segment, for example a block copolymeric segment, a gradient copolymeric segment, or a random copolymeric segment. The salt-tolerant-enhancing polymeric segment may comprise repeat units of monomeric residues of one or more polymerized salt-tolerant-enhancing monomers, and may optionally have repeat units of monomeric residues of one or more polymerized hydrophobic or hydrophilic monomers. In certain embodiments, the repeat units of the monomeric residues of one or more polymerized hydrophobic or hydrophilic monomers may be present in the salt-tolerant-enhancing polymeric segment. In certain embodiments, the salt-tolerant-enhancing polymeric segment may comprise copolymeric segment of repeat units of monomeric residues of one or more polymerized hydrophobic monomers, and monomeric residues of one or more polymerized salt-tolerant-enhancing monomers. The salt-tolerant star macromolecule of the present invention may comprise a salt-tolerant-enhancing polymeric segment comprising copolymeric segment of repeat units of monomeric residues of one or more polymerized hydrophilic monomers, and monomeric residues of one or more polymerized salt-tolerant-enhancing monomers. In certain embodiments, the salt-tolerant-enhancing polymeric segment may comprise a copolymeric segment of repeat units of monomeric residues of one or more polymerized hydrophilic monomers, monomeric residues of one or more polymerized hydrophobic monomers, and monomeric residues of one or more polymerized salt-tolerant-enhancing monomers.

In certain embodiments, the salt-tolerant-enhancing polymeric segment may comprise in the range of between 5-100% of the monomeric residues of one or more polymerized salt-tolerant-enhancing monomers, for example, between 5-95%, such as between 5-90%; between 5-80%; between 5-75%; between 5-70%; between 5-60%; between 5-50%; between 5-40%; between 5-35%; between 5-30%; between 5-25%; between 5-20%; between 5-15%; between 5-10%; between 25-75%; between 50-100%; between 35-65%; or between 10-40% of the monomeric residues of one or more polymerized salt-tolerant-enhancing monomers. In certain embodiments, a salt-tolerant-enhancing copolymeric arm may comprise more polymerized monomeric residues than a hydrophilic polymeric arm, for example, a hydrophilic polymeric polymerized segment of a salt-tolerant-enhancing copolymeric arm may comprise more polymerized monomeric residues than a hydrophilic polymeric arm.

In an embodiment, the polymer composition, the number of arms on any particular star varies across the population of star macromolecules in each composition, due to the synthetic process used for the synthesis of the composition. This process is called "arm first" method and is described in details herein below. Due to variation in the number of arms in star macromolecules, the number of arms r, s and t are referred as an average number of arms.

As used herein, the term "reference liquid of interest" means the liquid to which the polymer composition will be added. Suitable examples of reference liquids include, but are not limited to, water, oil or mixture thereof or water with additives which include but are not limited to; surfactants, oils, fats and waxes, emulsifiers, silicone compounds, UV protectors, antioxidants, various water soluble substances, biogenic agents, and enzyme inhibitors. Such agents are disclosed in U.S. Pat. Nos. 6,663,855 and 7,318,929 and are herein incorporated by reference to provide definitions for those terms.

Monomer units within the arms may be connected with C—C covalent bonds. This is believed to make them hard to degrade so that the star macromolecule may perform as efficient thickening agent in a harsh environment (very high/low pH or in the presence of strong oxidizing agents).

Suitable crosslinkers for the core encompass all of the compounds which are capable, under the polymerization conditions, of bringing about crosslinking. These include but are not limited di-, tri-, tetra-functional (meth)acrylates, di-, tri- and tetra-functional styrenes and other multi- or poly-functional crosslinkers.

Some examples of the crosslinking agents may include but are not limited to 1,2-divinylbenzene, 1,3-divinylbenzene and 1,4-divinylbenzene, 1,2-ethanediol di(meth)acrylate, 1,3-propanediol di(meth)acrylate, 1,4-butanediol di(meth)acrylate, 1,5-hexanediol di(meth)acrylate, divinylbenzene, ethyleneglycol di(meth)acrylate, propyleneglycol di(meth)acrylate, butyleneglycol di(meth)acrylate, triethyleneglycol di(meth)acrylate, polyethyleneglycol di(meth)acrylate, polypropyleneglycol di(meth)acrylate, polybutyleneglycol di(meth)acrylate, and allyl(meth)acrylate, glycerol di(meth)acrylate, trimethylolpropane tri(meth)acrylate, pentaerythritol tetra(meth)acrylate, allyl methacrylate, allyl acrylate.

The terms 'mostly soluble', 'not fully soluble', and 'not soluble' are used to describe the extent which a composition which is capable of being dissolved in a reference liquid of interest.

The term 'mostly soluble' is used to describe a composition which is capable dissolves completely with exception of a slight cloudiness in the reference liquid of interest. The term 'not fully soluble' is used to describe a composition which disperses with a cloudiness in the reference liquid of interest. The term 'not soluble' is used to describe a composition which does not disperse and remains as a solid in the reference liquid of interest. A list of solvents and non-solvent for polymers can be found in "Polymer Handbook, 4$^{th}$ Ed." edited by Brandrup J.; Immergut, Edmund H.; Grulke, Eric A.; Abe, Akihiro; Bloch, Daniel R., John Wiley & Sons: 2005.

An embodiment of the present invention can be exemplified by a multi-arm salt-tolerant star macromolecule wherein the average number of arms in the star macromolecule is between 5 and 500, preferentially between 10 and 250.

In one embodiment, the salt-tolerant star macromolecule has a core which contains additional functionality and/or expanded free volume. 'Expended free volume' of the core is defined as the core with lower crosslink density. The free volume in the core is generated when during the crosslinking process of crosslinker with monomer P3 and/or with monomer P5, or crosslinker is used. If P3, P5, or crosslinkers, are monomers with functional groups, these groups will be incorporated in the core.

In one embodiment, the star macromolecule may store and release in controlled rate the small molecules. 'Small molecules' are UV absorbers, minerals, dyes, pigments, solvents, surfactants, metal ions, salts, or oils. These small molecules can be stored inside the core of the star macromolecule and next released. Each small molecule has some affinity to the core, is soluble in the core environment. Higher affinity of the small molecule to the core will result in the lower rate of release from star macromolecule. The affinity may be increased or decreased through non-covalent forces including ionic, H-bonding, electrostatic, hydrophobic, coordination and metal chelating interactions.

In one embodiment, the star macromolecule displays shear thinning behavior. 'Shear thinning' is defined as is an effect where viscosity decreases with increasing rate of shear stress. The extent of shear thinning behavior is characterized using a Brookfield-type viscometer where viscosities are measured under different shear rates.

In one embodiment, the star macromolecule arms comprise a (co)polymer segment that exhibits an upper, or higher, critical solution temperature (UCST or HCST) whereby the star macromolecule is soluble in a liquid at higher temperature, say above 44° C., then at the lower use temperature the outer shell polymer segments become insoluble and self assemble to form a shear sensitive gel or in another embodiment the invention the outer shell of the star macromolecule arms comprise a (co)polymer segment that exhibits a lower critical solution temperature (LCST), say 5° C., whereby the star macromolecule is soluble in a liquid at lower temperature then at the use temperature the outer shell polymer segments become insoluble and self assemble to form a shear sensitive gel. In the case of a LCST it is envisioned that a copolymer segment with an LCST below 10° C., preferable below 5° C. would be optimal. A non-limiting example would be a copolymerization of BuMA and DMAEMA and preparation of copolymers with designed LCST. A copolymer with 10% BuMA has a LCST close to 0° C. and one would use less BuMA or a less hydrophobic monomer such as MMA to increase the LCST to ~5° C. Indeed the Tg of the segment of the star can be selected to allow dissolution of the star in room temperature aqueous media.

In one embodiment, the star macromolecule arms comprise a crosslinked core, and arms comprising an water soluble polymeric segment (e.g. poly(acrylic acid), poly(2-hydroxyethyl acrylate), poly(N-isopropylacrylamide), poly(ethylene glycol) methacrylate, quaternized poly(dimethyl-aminoethyl methacrylate), etc.) and a hydrophobic polymeric segment (e.g. polystyrene or substituted polystyrenes, poly(alkyl(meth)acrylate), etc.) or a hydrocarbon-based segment. Suitable hydrocarbon-based segments can comprise low molecular weight α-olefin. Lower molecular weight α-olefins are commercially available and higher molecular weight species can be prepared by telomerization of ethylene or ethylene propylene mixtures. [Kaneyoshi, H.; Inoue, Y.; Matyjaszewski, K. *Macromolecules* 2005, 38, 5425-5435.]

Suitable hydrophobic monomers that may be used to form an arm or segment of an arm, for example a polymeric segment of an arm, such as for P4 (or optionally within P2), of a star macromolecule may include, but is not limited to, styrene, methyl acrylate, ethyl acrylate, n-butyl acrylate, iso-butyl acrylate, t-butyl acrylate, 2-ethylhexyl acrylate, decyl acrylate, octyl acrylate; methyl methacrylate; ethyl methacrylate; n-butyl methacrylate; iso-butyl methacrylate; t-butyl methacrylate; 2-ethylhexyl methacrylate; decyl methacrylate; methyl ethacrylate; ethyl ethacrylate; n-butyl ethacrylate; iso-butyl ethacrylate; t-butyl ethacrylate; 2-ethylhexyl ethacrylate; decyl ethacrylate; 2,3-dihydroxypropyl acrylate; 2,3-dihydroxypropyl methacrylate; 2-hydroxypropyl acrylate; hydroxypropyl methacrylate; glycidyl methacrylate; glycidyl acrylate, acrylamides, styrene; styrene optionally substituted with one or more C1-C12 straight or branched chain alkyl groups; or alkylacrylate. For example, the hydrophobic monomer may comprise styrene; alpha-methylstyrene; t-butylstyrene; p-methylstyrene; methyl methacrylate; or t-butyl-acrylate. For example, the hydrophobic monomer may comprise styrene. In certain embodiments, the hydrophobic monomer may comprise a protected functional group.

Suitable hydrophilic monomers for that may be used to form an arm or segment of an arm, for example, a polymeric segment of an arm, such as for P1, P3, or P5 (or optionally within P2), of a star macromolecule may include, but is not limited to, 2-acrylamido-2-methylpropane sulfonic acid (AMPS), styrene sulphonic acid, protected and unprotected acrylic acids and methacrylic acids including; ethacrylic acid, methyl acrylate, ethyl acrylate, α-butyl acrylate, iso-butyl acrylate, t-butyl acrylate, 2-ethylhexyl acrylate, decyl acrylate, octyl acrylate; methyl methacrylate; ethyl methacrylate; n-butyl methacrylate; iso-butyl methacrylate; t-butyl methacrylate; 2-ethylhexyl methacrylate; decyl methacrylate; methyl ethacrylate; ethyl ethacrylate; n-butyl ethacrylate; iso-butyl ethacrylate; t-butyl ethacrylate; 2-ethylhexyl ethacrylate; decyl ethacrylate; 2,3-dihydroxypropyl acrylate; 2,3-dihydroxypropyl methacrylate; 2-hydroxyethyl acrylate; 2-hydroxypropyl acrylate; hydroxypropyl methacrylate; glyceryl monoacrylate; glyceryl monoethacrylate; glycidyl methacrylate; glycidyl acrylate; acrylamide; methacrylamide; ethacrylamide; N-methyl acrylamide; N,N-dimethyl acrylamide; N,N-dimethyl methacrylamide; N-ethyl acrylamide; N-isopropyl acrylamide; N-butyl acrylamide; N-t-butyl acrylamide; N,N-di-n-butyl acrylamide; N,N-diethylacrylamide; N-octyl acrylamide; N-octadecyl acrylamide; N,N-diethylacrylamide; N-phenyl acrylamide; N-methyl methacrylamide; N-ethyl methacrylamide; N-dodecyl methacrylamide; N,N-dimethylaminoethyl acrylamide; quaternised N,N-dimethylaminoethyl acrylamide; N,N-dimethylaminoethyl methacrylamide; quaternised N,N-dimethylaminoethyl methacrylamide; N,N-dimethylaminoethyl acrylate; N,N-dimethylaminoethyl methacrylate; quaternised N,N-dimethyl-aminoethyl acrylate; quaternised N,N-dimethylaminoethyl methacrylate; 2-hydroxyethyl acrylate; 2-hydroxyethyl methacrylate; 2-hydroxyethyl ethacrylate; glyceryl acrylate; 2-methoxyethyl acrylate; 2-methoxyethyl methacrylate; 2-methoxyethyl ethacrylate; 2-ethoxyethyl acrylate; 2-ethoxyethyl methacrylate; 2-ethoxyethyl ethacrylate; maleic acid; maleic anhydride and its half esters; fumaric acid; itaconic acid; itaconic anhydride and its half esters; crotonic acid; angelic acid; diallyldimethyl ammonium chloride; vinyl pyrrolidone vinyl imidazole; methyl vinyl ether; methyl vinyl ketone; maleimide; vinyl pyridine; vinyl pyridine-N-oxide; vinyl furan; styrene sulphonic acid and its salts; allyl alcohol; allyl citrate; allyl tartrate; vinyl acetate; vinyl alcohol; vinyl caprolactam; vinyl acetamide; or vinyl formamide. For example, the hydrophilic monomer may comprise protected and unprotected acrylic acid, such as methacrylic acid, ethacrylic acid, methyl acrylate, ethyl acrylate, α-butyl acrylate, iso-butyl acrylate, t-butyl acrylate, 2-ethylhexyl acrylate, decyl acrylate, octyl acrylate; methyl acrylate;

methyl methacrylate; methyl ethacrylate; ethyl acrylate; ethyl methacrylate; ethyl ethacrylate; n-butyl acrylate; n-butyl methacrylate; n-butyl ethacrylate; 2-ethylhexyl acrylate; 2-ethylhexyl methacrylate; 2-ethylhexyl ethacrylate; N-octyl acrylamide; 2-methoxyethyl acrylate; 2-hydroxyethyl acrylate; N,N-dimethylaminoethyl acrylate; N,N-dimethylaminoethyl methacrylate; acrylic acid; methacrylic acid; N-t-butylacrylamide; N-sec-butylacrylamide; N,N-dimethylacrylamide; N,N-dibutylacrylamide; N,N-dihydroxyethyllacrylamide; 2-hydroxyethyl acrylate; 2-hydroxyethyl methacrylate; benzyl acrylate; 4-butoxycarbonylphenyl acrylate; butyl acrylate; 4-cyanobutyl acrylate; cyclohexyl acrylate; dodecyl acrylate; 2-ethylhexyl acrylate; heptyl acrylate; iso-butyl acrylate; 3-methoxybutyl acrylate; 3-methoxypropyl acrylate; methyl acrylate; N-butyl acrylamide; N,N-dibutyl acrylamide; ethyl acrylate; methoxyethyl acrylate; hydroxyethyl acrylate; or diethyleneglycolethyl acrylate. For example, the hydrophilic monomer may comprise protected and unprotected acrylic acid, such as methacrylic acid, ethacrylic acid, methyl acrylate, ethyl acrylate, α-butyl acrylate, iso-butyl acrylate, t-butyl acrylate, 2-ethylhexyl acrylate, decyl acrylate, octyl acrylate; 2-hydroxyethyl acrylate; N-isopropylacrylamide; ethylene glycol methacrylate; (polyethylene glycol) methacrylate; or quaternized dimethylaminoethyl methacrylate. For example, the hydrophilic monomer may comprise acrylic acid, methacrylic acid, 2-hydroxyethyl acrylate, acrylamide, vinyl pyrrolidone, vinyl pyridine, styrene sulphonic acid, PEG-methacrylate, 2-(dimethylamino)ethyl methacrylate, 2-(trimethylamino) ethyl methacrylate, 2-acrylamido-2-methylpropane sulphonic acid, acrylic acid, acrylic anhydride, beta-carboxyethyl acrylate, methacrylic acid, 4-methacryloxyethyl trimellitic anhydride, 3-methacryloyl-(1)-lysine, o-nitrobenzyl methacrylate, 2-propene-1-sulfonic acid, 2-sulfoethyl methacrylate, trichloroacrylic acid, 4-vinylbenzoic acid, acrylamide/s, 2-(N,N-dimethylamino)-ethyl acrylate, N-[2-N,N-dimethylamino)-ethyl] methacrylamide, 2-(N,N-dimethylamino)-ethyl methacrylate, 3-dimethylaminoneopentylacrylate, N-[3-(N,N-methylamino)-propyl] acrylamide, N-[3-(N,N-Dimethylamino)-propyl] methacrylamide, 2-N-morpholinoethyl acrylate, 2-N-morpholinoethyl methacrylate, 3-methacryloyl-(1)-lysine, N,N-diallylamine, diallyldimethyl, 2-aminoethyl methacrylate, N-(2-aminoethyl) methacrylamide hydrochloride, N-(3-aminopropyl)-methacrylamide hydrochloride, N-(t-BOC-aminopropyl)-acrylamide, 2-(t-butylamino)ethyl methacrylate, 2-(N,N-diethylamino)-ethyl methacrylate (DEAEMA), 2-diisopropylaminoethyl methacrylate. For example, the hydrophilic monomer may comprise acrylic acid.

Suitable salt-tolerant-enhancing monomers for P2 that may be used to form a salt-tolerant-enhancing segment may include, but are not limited to, monomers having an ionizable functional group, an anionic functional group, a cationic functional group, or a hydrogen-bonding capable functional group, such as a hydrogen bond donating functional group or a hydrogen bond accepting functional group. For example, suitable salt-tolerant-enhancing monomers may include, but is not limited to, protected and unprotected acrylic acid, methacrylic acid, ethacrylic acid, methyl acrylate, ethyl acrylate, α-butyl acrylate, iso-butyl acrylate, t-butyl acrylate, 2-ethylhexyl acrylate, decyl acrylate, octyl acrylate, methyl methacrylate, ethyl methacrylate, n-butyl methacrylate, iso-butyl methacrylate, t-butyl methacrylate, 2-ethylhexyl methacrylate, decyl methacrylate, methyl ethacrylate, ethyl ethacrylate, n-butyl ethacrylate, iso-butyl ethacrylate, t-butyl ethacrylate, 2-ethylhexyl ethacrylate, decyl ethacrylate, 2,3-dihydroxypropyl acrylate, 2,3-dihydroxypropyl methacrylate, 2-hydroxyethyl acrylate, 2-hydroxypropyl acrylate, hydroxypropyl methacrylate, glyceryl monoacrylate, glyceryl monoethacrylate, glycidyl methacrylate, glycidyl acrylate, acrylamide, methacrylamide, ethacrylamide, N-methyl acrylamide, N,N-dimethyl acrylamide, N,N-dimethyl methacrylamide, N-ethyl acrylamide, N-isopropyl acrylamide, N-butyl acrylamide, N-t-butyl acrylamide, N,N-di-n-butyl acrylamide, N,N-diethylacrylamide, N-octyl acrylamide, N-octadecyl acrylamide, N,N-diethylacrylamide, N-phenyl acrylamide, N-methyl methacrylamide, N-ethyl methacrylamide, N-dodecyl methacrylamide, N,N-dimethylaminoethyl acrylamide, quaternised N,N-dimethylaminoethyl acrylamide, N,N-dimethylaminoethyl methacrylamide, quaternised N,N-dimethylaminoethyl methacrylamide, N,N-dimethylaminoethyl acrylate, N,N-dimethylaminoethyl methacrylate, quaternised N,N-dimethyl-aminoethyl acrylate, quaternised N,N-dimethylaminoethyl methacrylate, 2-hydroxyethyl methacrylate, 2-hydroxyethyl ethacrylate, glyceryl acrylate, 2-methoxyethyl acrylate, 2-methoxyethyl methacrylate, 2-methoxyethyl ethacrylate, 2-ethoxyethyl acrylate, 2-ethoxyethyl methacrylate, 2-ethoxyethyl ethacrylate, maleic acid, maleic anhydride and its half esters, fumaric acid, itaconic acid, itaconic anhydride and its half esters, crotonic acid, angelic acid, diallyldimethyl ammonium chloride, vinyl pyrrolidone vinyl imidazole, methyl vinyl ether, methyl vinyl ketone, maleimide, vinyl pyridine, vinyl pyridine-N-oxide, vinyl furan, styrene sulphonic acid and its salts, allyl alcohol, allyl citrate, allyl tartrate, vinyl acetate, vinyl alcohol, vinyl caprolactam, vinyl acetamide, vinyl formamide, allyl heptafluorobutyrate, allyl heptafluoroisopropyl ether, allyl 1H,1H-pentadecafluorooctyl ether, allylpentafluorobenzene, allyl perfluoroheptanoate, allyl perfluorononanoate, allyl perfluorooctanoate, allyl tetrafluoroethyl ether, allyl trifluoroacetate, bis(hexafluoroisopropyl) itaconate, bis(hexafluoroisopropyl) maleate, bis(perfluorooctyl) itaconate, bis(perfluorooctyl)maleate, bis(trifluoroethyl) itaconate, bis(2,2,2-trifluoroethyl) maleate, 2-(N-butylperfluorooctanesulfamido) ethyl acrylate, trihydroperfluoroheptyl acrylate, trihydroperfluoroheptyl methacrylate, trihydroperfluoroundecyl acrylate, trihydroperfluoroundecyl methacrylate, epifluorohydrin, 2-(N-ethylperfluorooctane sulfamido) ethyl acrylate, 2-(N-ethylperfluorooctane sulfamido) ethyl methacrylate, 2-fluoroethyl acrylate, 2-fluoroethyl methacrylate, m-fluorostyrene, o-fluorostyrene, p-fluorostyrene, tetrahydroperfluorodecyl acrylate, tetrahydroperfluorodecyl methacrylate, 1H,1H-heptafluorobutylacrylamide, heptafluorobutyl acrylate, 1H,1H-heptafluorobutylmethacrylamide, 2-N-heptafluorobutyrylamino-4,6-dichlorotriazine, 1H,1H-heptafluoro-n-butyl methacrylate, 1H,1H,9H-hexadecafluorononyl acrylate, 1H,1H,9H-hexadecafluorononyl methacrylate, hexafluoro bisphenol A diacrylate, hexafluoro bisphenol A dimethacrylate, 2,2,3,4,4,4-hexafluorobutyl acrylate, 2,2,3,4,4,4-hexafluorobutyl methacrylate, hexafluoroisopropyl acrylate, mono-hexafluoroisopropyl maleate, hexafluoroisopropyl urethane of isocyanatoethyl methacrylate, 2,2,3,3,4,4,5,5-octafluoro-1,6-hexanediol diacrylate, 2,2,3,3,4,4,5,5-octafluoro-1,6-hexanediol dimethacrylate, 1H,1H,5H-octafluoropentyl acrylate, 1H,1H,5H-octafluoropentyl methacrylate, pentafluorobenzyl acrylate, pentafluorobenzyl methacrylate, pentafluorophenyl acrylate, pentafluorophenyl methacrylate, 2,2,3,3,3-pentafluoropropyl acrylate, 2,2,3,3,3-pentafluoropropyl methacrylate, pentafluorostyrene, perfluorocyclohexyl-1,4-dimethyl dimethacrylate, perfluorocyclohexyl methyl acrylate, perfluorocyclohexylmethyl methacrylate, perfluorocyclopentene, perfluoroheptoxypoly(propyloxy)

acrylate, perfluoroheptoxypoly-(propyloxy) methacrylate, perfluorooctoxy-poly(iso-butoxy)-2-chloropropoxy-1,2-propyl diacrylate, mono-perfluorooctyl maleate, mono-perfluorooctyl itaconate, perfluorooctyl acrylate, 1H,1H-perfluorooctyl acrylate, 1H,1H-perfluorooctyl methacrylate, polyperfluoroethylene glycol diacrylate, polyperfluoroethylene glycol dimethacrylate, 2,2,3,3-tetrafluoro-1,4-butanediol diacrylate, 2,2,3,3-tetrafluoro-1,4-butanediol dimethacrylate, 2,2,3,3-tetrafluoropropyl acrylate, 2,2,3,3-tetrafluoropropyl methacrylate, 1,1,5,5-tetrahydroperfluoro-1,5-pentanediol dimethacrylate, trifluoroethyl acid itaconate, mono-trifluoroethyl acid maleate, 2,2,2-trifluoroethyl acrylate, 2,2,2-trifluoroethyl methacrylate, 3-(trifluoromethyl) benzyl acrylate, 3-(trifluoromethyl) benzyl methacrylate, 1-(trifluoromethyl) vinyl acetate, 4-vinylbenzyl hexafluoroisopropyl ether, 4-vinylbenzyl perfluorooctanoate, 4-vinylbenzyl trifluoroacetate, vinyl heptafluorobutyrate, vinyl perfluoroheptanoate, vinyl perfluorononanoate, vinyl perfluorooctanoate, vinyl trifluoroacetate, hexafluoroisopropyl itaconate, hexafluoroisopropyl methacrylate, tridecafluoro-1,1,2,2-tetrahydrooctyl-1,1-methyl dimethoxy silane, tridecafluoro-1,1,2,2-Tetrahydrooctyl-1-dimethyl methoxy silane and mixtures thereof.

Even more preferred salt-tolerant-enhancing monomers are those selected from methyl acrylate, methyl methacrylate, methyl ethacrylate, ethyl acrylate, ethyl methacrylate, ethyl ethacrylate, n-butyl acrylate, n-butyl methacrylate, n-butyl ethacrylate, 2-ethylhexyl acrylate, 2-ethylhexyl methacrylate, 2-ethylhexyl ethacrylate, N-octyl acrylamide, 2-methoxyethyl acrylate, 2-hydroxyethyl acrylate, N,N-dimethylaminoethyl acrylate, N,N-dimethylaminoethyl methacrylate, acrylic acid, methacrylic acid, N-t-butylacrylamide, N-sec-butylacrylamide, N,N-dimethylacrylamide, N,N-dibutylacrylamide, N,N-dihydroxyethyllacrylamide 2-hydroxyethyl acrylate, 2-hydroxyethyl methacrylate, benzyl acrylate, 4-butoxycarbonylphenyl acrylate, butyl acrylate, 4-cyanobutyl acrylate, cyclohexyl acrylate, dodecyl acrylate, 2-ethylhexyl acrylate, heptyl acrylate, iso-butyl acrylate, 3-methoxybutyl acrylate, 3-methoxypropyl acrylate, methyl acrylate, N-butyl acrylamide, N,N-dibutyl acrylamide, ethyl acrylate, methoxyethyl acrylate, hydroxyethyl acrylate, diethyleneglycolethyl acrylate, styrene (optionally substituted with one or more C1-C12 straight or branched chain alkyl groups), alpha-methylstyrene, t-butylstyrene, p-methylstyrene, 2-fluoroethyl acrylate, 2-fluoroethyl methacrylate, m-fluorostyrene, o-fluorostyrene, p-fluorostyrene, and mixtures thereof.

Suitable monomers that may be used to form a core of a salt-tolerant star macromolecule may include, but are not limited to, a multifunctional monomer, for example, a hexafunctional monomer, a pentafunctional monomer, a tetrafunctional monomer, a trifunctional monomer, or a difunctional monomer. For example, a crosslinker may be a hydrophobic monomer or a hydrophilic monomer, such as a hydrophobic multifunctional monomer or a hydrophilic multifunctional monomer, for example, a hydrophobic difunctional monomer or a hydrophilic difunctional monomer. For example, the crosslinker may be a hydrophobic crosslinker, including, but not limited to, 1,2-divinylbenzene; 1,3-divinylbenzene; 1,4-divinylbenzene; 1,2-ethanediol di(meth)acrylate; 1,3-propanediol di(meth)acrylate; 1,4butanediol di(meth)acrylate; 1,5-hexanediol di(meth) acrylate; divinylbenzene; ethyleneglycol di(meth)acrylate; di(ethylene glycol) diacrylate (DEGlyDA); propyleneglycol di(meth)acrylate; butyleneglycol di(meth)acrylate; triethyleneglycol di(meth)acrylate; polyethyleneglycol di(meth) acrylate; polypropyleneglycol di(meth)acrylate; polybutyleneglycol di(meth)acrylate; allyl(meth)acrylate; glycerol di(meth)acrylate; trimethylolpropane tri(meth)acrylate; pentaerythritol tetra(meth)acrylate; allyl methacrylate; or allyl acrylate. For example, the crosslinker may be di(ethylene glycol) diacrylate (DEGlyDA) or divinylbenzene. For example, the crosslinker may be divinylbenzene.

Suitable salt-tolerant star macromolecules may include, but are not limited to, a mikto star macromolecule, a water-soluble star macromolecule, a gel-forming star macromolecule, emulsifier/thickening agent star macromolecules, fracking fluid thickening star macromolecules, fracking fluid gelling star macromolecules, or combinations thereof. In certain embodiments, the star macromolecule may have a molecular weight of greater than 5,000 g/mol, for example, between 5,000 g/mol and 10,000,000 g/mol; such as between 25,000 g/mol and 7,000,000 g/mol; between 50,000 g/mol and 5,000,000 g/mol; 20,000 g/mol and 1,000,000 g/mol; between 100,000 g/mol and 2,500,000 g/mol; between 125,000 g/mol and 1,750,000 g/mol; between 150,000 g/mol and 1,750,000 g/mol; between 200,000 g/mol and 1,500,000 g/mol; between 225,000 g/mol and 1,250,000 g/mol; between 125,000 g/mol and 1,000,000 g/mol; between 125,000 g/mol and 900,000 g/mol; between 125,000 g/mol and 800,000 g/mol; between 125,000 g/mol and 700,000 g/mol; between 150,000 g/mol and 650,000 g/mol; between 200,000 g/mol and 500,000 g/mol; between 200,000 g/mol and 600,000 g/mol; between 225,000 g/mol and 650,000 g/mol; between 250,000 g/mol and 550,000 g/mol; between 350,000 g/mol and 500,000 g/mol; between 300,000 g/mol and 500,000 g/mol; or between 350,000 g/mol and 750,000 g/mol.

Star macromolecules with a single peak in the GPC curve with a polydispersity index (PDI) above 1.0 and below 3.5 are preferred. Suitable salt-tolerant star macromolecules may have a polydispersity index (PDI) of less than 3.0, for example, a PDI of less than 2.5, such as less than 2.0 or less than 1.7. For example, a star macromolecule may have a PDI of between 1.0 to 3.0, such as between 1.0 and 2.7; between 1.0 and 2.5; between 1.5 and 2.4; between 1.0 and 1.9; between 1.0 and 1.8; between 1.0 and 1.7; between 1.0 and 1.6; between 1.0 and 1.5; between 1.0 and 1.4; between 1.0 and 1.3; between 1.0 and 1.2; between 1.0 and 1.1; between 1.05 and 1.75; between 1.1 and 1.7; between 1.15 and 1.65; between 1.15 and 1.55; between 1.7 and 2.3.

Suitable salt-tolerant star macromolecules may comprise arms that are of the same type or a different type and are homopolymeric, copolymeric, comprise multiple block segment, random segments, gradient segments or no particular segments. In certain embodiments, the star macromolecule may comprise, for example, one or more arm-types, such as, two or more, three or more, four or more, or five or more arm-types. Suitable arm types may include, but are not limited to, homopolymeric arms, copolymeric arms, such as random copolymeric arms or block copolymeric arms, or combinations thereof. For example, a star macromolecule may comprise homopolymeric arms and copolymeric arms, such as block copolymeric arms. Suitable arm types may also include, but are not limited to, salt-tolerant-enhancing arms, hydrophilic arms, hydrophobic arms, or amphiphilic arms. In certain embodiments, a star macromolecule arm may comprise hydrophilic polymeric segments comprising hydrophilic monomeric residues, salt-tolerant-enhancing segments comprising salt-tolerant-enhancing monomeric residues, hydrophobic polymeric segments comprising hydrophobic monomeric residues, amphiphilic polymeric segments comprising amphiphilic monomeric residues, or combinations thereof. For example, in certain embodiments, a star macromolecule may comprise homopolymeric arms and copolymeric arms, such as hydrophilic homopolymeric arms, copolymeric arms comprising hydrophilic polymeric segments and salt-tolerant-enhancing polymeric segments, and copolymeric arms comprising hydrophilic polymeric segments and hydrophobic polymeric segments.

Suitable salt-tolerant star macromolecules may comprise hydrophilic polymeric segments, such as P1, P3, or P5, which may comprise a hydrophilic homopolymeric segment or a hydrophilic copolymeric segment comprising repeat units of monomeric residues of one or more, such as two or more, polymerized hydrophilic monomers, for example, a hydrophilic segment block copolymeric segment, a hydrophilic gradient copolymeric segment, or a hydrophilic random copolymeric segment.

Suitable salt-tolerant star macromolecules may comprise salt-tolerant-enhancing polymeric segments, such as P2, which may comprise a salt-tolerant-enhancing homopolymerized segment or a salt-tolerant-enhancing copolymerized segment comprising repeat units of monomeric residues of one or more, such as two or more, polymerized salt-tolerant-enhancing monomers, and optionally, monomeric residues of one or more, such as two or more, polymerized hydrophobic or hydrophilic monomers. The salt-tolerant-enhancing copolymerized segment may be a salt-tolerant-enhancing segment block copolymeric segment, a salt-tolerant-enhancing gradient copolymeric segment, or a salt-tolerant-enhancing random copolymeric segment. In certain embodiments, the monomeric residues of the one or more, or two or more, polymerized hydrophobic or hydrophilic monomers are present in the salt-tolerant-enhancing copolymeric segment. For example, the salt-tolerant-enhancing copolymerized segment may be block, gradient, or random copolymeric segment comprising repeat units of monomeric residues of one or more, such as two or more, polymerized salt-tolerant-enhancing monomers, and monomeric residues of one or more, such as two or more, polymerized hydrophobic monomers. For example, the salt-tolerant-enhancing copolymerized segment may be block, gradient, or random copolymeric segment comprising repeat units of monomeric residues of one or more, such as two or more, polymerized salt-tolerant-enhancing monomers, and monomeric residues of one or more, such as two or more, polymerized hydrophilic monomers. In certain embodiments, the salt-tolerant-enhancing copolymerized segment may be block, gradient, or random copolymeric segment comprising repeat units of monomeric residues of one or more, such as two or more, polymerized salt-tolerant-enhancing monomers, and monomeric residues of one or more, such as two or more, polymerized hydrophobic monomers, and monomeric residues of one or more, such as two or more, polymerized hydrophilic monomers.

Suitable salt-tolerant star macromolecules may comprise hydrophobic polymeric segments, such as P4, which may comprise a hydrophobic homopolymeric segment or a hydrophobic copolymeric segment comprising repeat units of monomeric residues of one or more, such as two or more, polymerized hydrophobic monomers, for example, a hydrophobic segment block copolymeric segment, a hydrophobic gradient copolymeric segment, or a hydrophobic random copolymeric segment.

Suitable salt-tolerant star macromolecules may also comprise arms that are covalently linked to the core of the star macromolecule. In certain embodiments, the arms of a star macromolecule may be covalently linked to the core of the star macromolecule via crosslinking, such as crosslinking with a crosslinker, for example, a hydrophobic difunctional crosslinker or a hydrophilic difunctional crosslinker. For example, arms of a star macromolecule, such as homopolymeric arms and block copolymeric arms of a mikto star macromolecule, may be covalently linked together to form a core by crosslinking an end of the arms with a crosslinker, such as with a hydrophobic difunctional crosslinker or a hydrophilic difunctional crosslinker.

Suitable salt-tolerant star macromolecules may also comprise arms of varying length and/or degree of polymerization. In certain embodiments, for example, a star macromolecule may comprise homopolymeric arms and block copolymeric arms, wherein the homopolymeric arms of a shorter length and/or a lesser degree of polymerization in relation to the block copolymeric arms. In certain embodiments, for example, a star macromolecule may comprise homopolymeric arms and block copolymeric arms, wherein the block copolymeric arms of a longer length and/or a greater degree of polymerization in relation to the homopolymeric arms. In certain embodiments, a star macromolecule may comprise hydrophilic homopolymeric arms and block copolymeric arms, comprising (i) hydrophobic polymeric segments distal to the star core and hydrophilic polymeric segments that are proximal to the core of the star, wherein a distal portion of the hydrophobic polymeric segments of the copolymeric arm extends beyond a distal portion of the hydrophilic homopolymeric arms, and (ii) salt-tolerant-enhancing polymeric segments distal to the star core and hydrophilic polymeric segments that are proximal to the core of the star, wherein a distal portion of the salt-tolerant-enhancing polymeric segments of the copolymeric arm extends beyond a distal portion of the hydrophilic homopolymeric arms. For example, a star macromolecule may comprise hydrophilic homopolymeric arms comprising polymerized hydrophilic monomeric residues and block copolymeric arms comprising (i) hydrophobic polymeric segments distal to the core of the star and hydrophilic polymeric segments that are proximal to the core of the star, wherein the distal hydrophobic polymeric segments extend beyond the most distal portion, in relation to the core, of the hydrophilic homopolymeric arms, and/or wherein a distal portion of the proximal hydrophilic polymeric segments of the copolymeric arm extend beyond the most distal portion, in relation to the core, of the hydrophilic homopolymeric arms, (ii) salt-tolerant-enhancing polymeric segments distal to the core of the star and hydrophilic polymeric segments that are proximal to the core of the star, wherein the distal salt-tolerant-enhancing polymeric segments extend beyond the most distal portion, in relation to the core, of the hydrophilic homopolymeric arms, and/or wherein a distal portion of the proximal hydrophilic polymeric segments of the copolymeric arm extend beyond the most distal portion, in relation to the core, of the hydrophilic homopolymeric arms.

In certain embodiments, a star macromolecule may comprise hydrophilic homopolymeric arms and block copolymeric arms, comprising (i) hydrophobic polymeric segments distal to the star core and hydrophilic polymeric segments that are proximal to the star core, wherein the degree of polymerization of the hydrophilic polymeric segments of the copolymeric arms are greater than, for example, greater than 20%, such as between 30% to 300%, between 40% to 250%, between 50% to 200%, between 75% to 250%, or between 100% to 500%, the degree of polymerization of the hydrophilic homopolymeric arms, such that a distal portion of the hydrophilic polymeric segments of the copolymeric arm extends beyond the a distal portion of the hydrophilic homopolymeric arms, and (ii) salt-tolerant-enhancing polymeric segments distal to the star core and hydrophilic polymeric segments that are proximal to the star core, wherein the degree of polymerization of the hydrophilic polymeric segments of the copolymeric arms are greater than, for example, greater than 20%, such as between 30% to 300%, between 40% to 250%, between 50% to 200%, between 75% to 250%, or between 100% to 500%, the degree of polymerization of the hydrophilic homopolymeric arms, such that a distal portion of the hydrophilic polymeric segments of the copolymeric arms extends beyond the a distal portion of the hydrophilic homopolymeric arms.

In certain embodiments, suitable salt-tolerant star macromolecules may comprise hydrophilic homopolymeric arms comprising polymerized hydrophilic monomeric residues and block copolymeric arms comprising (i) hydrophobic polymeric segments distal to the core of the star and hydrophilic polymeric segments proximal to the core of the star, (ii) salt-tolerant-enhancing polymeric segments distal to the core of the star and hydrophilic polymeric segments proximal to the core of the star, wherein the polymerized hydrophilic monomeric residues of the homopolymeric arm and the hydrophilic polymeric segments of the copolymeric arms may be derived from the same hydrophilic monomers, and may have the same or different degree of polymerization, for example, a degree of polymerization of between 10 to 2000 monomeric residues, such as, between 50 to 500 monomeric residues; between 50 to 400 monomeric residues; between 50 to 300 monomeric residues; between 50 to 200 monomeric residues; between 100 to 250 monomeric residues; between 125 to 175 monomeric residues; or between 150 to 300 monomeric residues. For example, a star macromolecule may comprise hydrophilic homopolymeric arms comprising polymerized hydrophilic monomeric residues and block copolymeric arms comprising (i) hydrophobic polymeric segments distal to the core of the star and hydrophilic polymeric segments proximal to the core of the star, (ii) salt-tolerant-enhancing polymeric segments distal to the core of the star and hydrophilic polymeric segments proximal to the core of the star, wherein the polymerized hydrophilic monomeric residues of the homopolymeric arm and the hydrophilic polymeric segments of the copolymeric arms may be derived from the same hydrophilic monomers, and may have the same degree of polymerization, and wherein the hydrophobic polymeric segments of the copolymeric arms may have a degree of polymerization of between 1 to 500 monomeric residues, such as between 1 to 450 monomeric residues; between 1 to 400 monomeric residues; between 1 to 350 monomeric residues; between 10 to 425 monomeric residues; between 20 to 250 monomeric residues; between 30 to 200 monomeric residues; between 50 to 200 monomeric residues; between 1 to 60 monomeric residues; between 1 to 50 monomeric residues; between 1 to 45 monomeric residues; between 5 to 40 monomeric residues; between 8 to 35 monomeric residues; between 10 to 30 monomeric residues; between 12 to 25 monomeric residues; between 14 to 22 monomeric residues; between 15 to 30 monomeric residues; or between 5 to 20 monomeric residues, and wherein the salt-tolerant-enhancing polymeric segments of the copolymeric arms may have a degree of polymerization of between 1 to 500 monomeric residues, such as between 1 to 450 monomeric residues; between 1 to 400 monomeric residues; between 1 to 350 monomeric residues; between 10 to 425 monomeric residues; between 20 to 250 monomeric residues; between 30 to 200 monomeric residues; between 50 to 200 monomeric residues; between 1 to 60 monomeric residues; between 1 to 50 monomeric residues; between 1 to 45 monomeric residues; between 5 to 40 monomeric residues; between 8 to 35 monomeric residues; between 10 to 30 monomeric residues; between 12 to 25 monomeric residues; between 14 to 22 monomeric residues; between 15 to 30 monomeric residues; or between 5 to 20 monomeric residues.

In certain embodiments, suitable salt-tolerant star macromolecules may comprise hydrophilic polymeric arms comprising repeat units of polymerized hydrophilic monomeric residues having a degree of polymerization of the monomeric residues, represented by q1, having a value between 10 to 2000, such as, between 50 to 500; between 50 to 400; between 50 to 300; between 50 to 200; between 100 to 250; between 125 to 175; or between 150 to 300.

In certain embodiments, suitable salt-tolerant star macromolecules may comprise salt-tolerant-enhancing copolymeric arms comprising repeat units of polymerized salt-tolerant-enhancing monomeric residues having a degree of polymerization of the monomeric residues, represented by q2, having a value between 10 to 500, such as, between 10 to 400; between 10 to 300; between 10 to 200; between 10 to 100; between 10 to 75; between 10 to 50; between 10 to 40; between 10 to 30; between 10 to 20; between 10 to 15; between 15 to 25; between 20 to 30; between 20 to 40; between 20 to 50; between 17 to 33; or between 13 to 23.

In certain embodiments, suitable salt-tolerant star macromolecules may comprise salt-tolerant-enhancing copolymeric arms comprising repeat units of polymerized hydrophilic monomeric residues having a degree of polymerization of the monomeric residues, represented by q3, having a value between 10 to 2000, such as, between 50 to 500; between 50 to 400; between 50 to 300; between 50 to 200; between 100 to 250; between 125 to 175; or between 150 to 300.

In certain embodiments, suitable salt-tolerant star macromolecules may comprise hydrophobic copolymeric arms comprising repeat units of polymerized hydrophobic monomeric residues having a degree of polymerization of the monomeric residues, represented by q4, having a value between 10 to 500, such as, between 10 to 400; between 10 to 300; between 10 to 200; between 10 to 100; between 10 to 75; between 10 to 50; between 10 to 40; between 10 to 30; between 10 to 20; between 10 to 15; between 15 to 25; between 20 to 30; between 20 to 40; between 20 to 50; between 17 to 33; or between 13 to 23.

In certain embodiments, suitable salt-tolerant star macromolecules may comprise hydrophobic copolymeric arms comprising repeat units of polymerized hydrophilic monomeric residues having a degree of polymerization of the monomeric residues, represented by q5, having a value between 10 to 2000, such as, between 50 to 500; between 50 to 400; between 50 to 300; between 50 to 200; between 100 to 250; between 125 to 175; or between 150 to 300.

Suitable salt-tolerant star macromolecules may have a wide range of total number of arms, for example, a star macromolecule may comprise greater than 5 arms. For example, a suitable star macromolecule may comprise between 5 and 500 arms, such as between 10 and 400 arms; between 12 and 300 arms; between 14 and 200 arms; between 14 and 150 arms; between 15 and 100 arms; between 15 and 90 arms; between 15 and 80 arms; between 15 and 70 arms; between 15 and 60 arms; between 15 and 50 arms; between 20 and 50 arms; between 25 and 45 arms; between 25 and 35 arms; between 30 and 45 arms; or between 30 and 50 arms.

Suitable salt-tolerant star macromolecules may have more than one arm type, such as two or more different arm types, where in a molar ratio of the different arm types may be between 40:1 and 1:1. For example, a star macromolecule comprising two different arm types, such as a homopolymeric arm, for example, a hydrophilic homopolymeric arm, and a copolymeric arm, for example, a copolymeric arm comprising hydrophilic polymeric segments and hydrophobic polymeric segments, may have a molar ratio of the two different arm types between 40:1 to 2:1, such as between 35:1 to 2:1; between 30:1 to 2:1; between 25:1 to 2:1; between 20:1 to 2:1; between 15:1 to 2:1; between 10:1 to 2:1; between 9:1 to 2:1; between 8:1 to 2:1; between 7:1 to 2:1; between 7:3 to 2:1; between 7:5 to 2:1; between 4:5 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; or between 5:1 to 3:1, and a copolymeric arm comprising hydrophilic polymeric segments and salt-tolerant-enhancing polymeric segments, may have a molar ratio of the two different arm types between 40:1 to 2:1, such as between 35:1 to 2:1; between 30:1 to 2:1; between 25:1 to 2:1; between 20:1 to 2:1; between 15:1 to 2:1; between 10:1 to 2:1; between 9:1 to 2:1; between 8:1 to 2:1; between 7:1 to 2:1; between 7:3 to 2:1; between 7:5 to 2:1; between 4:5 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; or between 5:1 to 3:1. For example, a star macromolecule comprising three different arm types, such as a homopolymeric arm, for example, a hydrophilic homopolymeric arm, and a first copolymeric arm, for example, a copolymeric arm comprising hydrophilic polymeric segments and hydrophobic polymeric segments, and a second copolymeric arm comprising hydrophilic polymeric segments and salt-tolerant-enhancing polymeric segments, may have a molar ratio of homopolymeric arms to the two copolymeric arms types between 40:1 to 2:1, such as between 35:1 to 2:1; between 30:1 to 2:1; between 25:1 to 2:1; between 20:1 to 2:1; between 15:1 to 2:1; between 10:1 to 2:1; between 9:1 to 2:1; between 8:1 to 2:1; between 7:1 to 2:1; between 7:3 to 2:1; between 7:5 to 2:1; between 4:5 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; or between 5:1 to 3:1.

Suitable salt-tolerant star macromolecules may be represented by the Formula Z, wherein the star macromolecule may have a sum total number of arms (r+s+t) of between 3 and 500; such as between 5 and 450; between 8 and 400; between 10 and 300; between 12 and 350; between 14 and 300; between 15 and 250; between 16 and 200; between 5 and 150; between 5 and 100; between 5 and 100; between 5 and 50; between 5 and 25; between 10 and 75; between 15 and 45; between 15 and 30; or between 20 and 40.

Suitable salt-tolerant star macromolecules may be represented by the Formula Z, wherein the star macromolecule may have a total number of hydrophilic polymeric arms, such as hydrophilic homopolymeric arms or hydrophilic copolymeric arms, covalently attached to the core, represented by r having a value of 0 to 1000, such as between 2 and 500; between 3 and 300; between 4 and 200; between 5 and 150; between 6 and 100; between 7 and 75; between 8 and 50; between 9 and 40; between 10 and 30; between 15 and 45; between 20 and 30; between 25 and 50; between 50 and 100; between 75 and 125; between 10 and 75; between 15 and 45; between 15 and 30; or between 20 and 40.

Suitable salt-tolerant star macromolecules may be represented by the Formula Z, wherein the star macromolecule may have a total number of salt-tolerant-enhancing copolymeric arms covalently attached to the core, independently represented by s having a value of between 1 and 1000, such as between 2 and 500; between 3 and 250; between 4 and 200; between 5 and 150; between 6 and 100; between 7 and 75; between 8 and 50; between 9 and 40; between 10 and 30; between 15 and 45; between 20 and 30; between 25 and 50; between 50 and 100; between 75 and 125; between 10 and 75; between 15 and 45; between 15 and 30; between 20 and 40; between 2 and 50; between 2 and 40; between 2 and 30; between 2 and 25; between 3 and 20; between 4 and 15; between 1 and 10; between 1 and 8; between 1 and 6; or between 2 and 5.

Suitable salt-tolerant star macromolecules may be represented by the Formula Z, wherein the star macromolecule may have a total number of hydrophobic copolymeric arms covalently attached to the core, represented by t having a value of 0 to 1000, such as between 2 and 500; between 3 and 300; between 4 and 200; between 5 and 150; between 6 and 100; between 7 and 75; between 8 and 50; between 9 and 40; between 10 and 30; between 15 and 45; between 20 and 30; between 25 and 50; between 50 and 100; between 75 and 125; between 10 and 75; between 15 and 45; between 15 and 30; between 20 and 40; between 2 and 50; between 2 and 40; between 2 and 30; between 2 and 25; between 3 and 20; between 4 and 15; between 1 and 10; between 1 and 8; between 1 and 6; or between 2 and 5.

Suitable salt-tolerant star macromolecules may be represented by the Formula Z, wherein the star macromolecule may have a total number of salt-tolerant-enhancing arms types covalently attached to the core, represented by n having a value of at least 1, such as between 1 to 10; between 2 and 9; between 3 and 8; between 4 and 7; between 5 and 10; between 2 and 7; or between 1 and 5.

Suitable salt-tolerant star macromolecules may include, but is not limited to, comprising arms having a molecular weight of greater than 1,000 g/mol. For example, a star macromolecule may comprise arms having a molecular weight of between 1,000 g/mol and 400,000 g/mol, such as between 2,000 g/mol and 300,000 g/mol; 5,000 g/mol and 200,000 g/mol; 5,000 g/mol and 100,000 g/mol; 5,000 g/mol and 75,000 g/mol; 5,000 g/mol and 60,000 g/mol; 5,000 g/mol and 50,000 g/mol; 10,000 g/mol and 100,000 g/mol; 10,000 g/mol and 150,000 g/mol; between 10,000 g/mol and 125,000 g/mol; between 10,000 g/mol and 100,000 g/mol; between 10,000 g/mol and 90,000 g/mol; between 10,000 g/mol and 80,000 g/mol; between 10,000 g/mol and 70,000 g/mol; between 50,000 g/mol and 60,000 g/mol; between 50,000 g/mol and 70,000 g/mol; between 10,000 g/mol and 40,000 g/mol; between 10,000 g/mol and 30,000 g/mol; between 10,000 g/mol and 20,000 g/mol; between 20,000 g/mol and 175,000 g/mol; between 20,000 g/mol and 100,000 g/mol; between 20,000 g/mol and 75,000 g/mol; between 20,000 g/mol and 50,000 g/mol; between 15,000 g/mol and 45,000 g/mol; or between 15,000 g/mol and 30,000 g/mol.

Suitable arms of a salt-tolerant star macromolecule may include, but is not limited to, arms having an HLB value of at least 17 (wherein the HLB is calculated per the formula set forth in the test procedures). For example, suitable arms of a star macromolecule may have an HLB value of greater than 17.25, such as greater than 18.5; at least 19; between 17.5 to 20; between 17.5 to 19.5; between 18 to 20; between 18.5 to 20; between 19 to 20; between 19.5 to 20; between 18 to 19.5; between 18.5 to 19.75; between 18.2 to 19.2; or between 18.75 to 19.5.

Suitable hydrophobic polymeric segments of a copolymeric arm of a salt-tolerant star macromolecule may include, but is not limited to, hydrophobic polymeric segments having an HLB value of less than 8. For example, suitable hydrophobic polymeric segments may have an HLB value of less than 7, such as less than 6; less than 5; less than 4; less than 3; less than 2; or about 1.

Suitable arms of a salt-tolerant star macromolecule may include, but is not limited to, arms having a polydispersity index (PDI) value of less than 3.0. For example, suitable arms of a star macromolecule may have PDI value of less than 2.5, such as less that 2.25; less that 2.0; less than 1.7; between 1.0 to 3.0, such as between 1.0 and 2.5; between 1.0 and 2.3; between 1.0 and 2.0; between 1.0 and 1.9; between 1.0 and 1.8; between 1.0 and 1.7; between 1.0 and 1.6; between 1.0 and 1.5; between 1.0 and 1.4; between 1.0 and 1.3; between 1.0 and 1.2; between 1.0 and 1.1; between 1.05 and 1.75; between 1.1 and 1.7; between 1.15 and 1.65; or between 1.15 and 1.55.

Suitable cores of a salt-tolerant star macromolecule may be formed by or derived from, but is not limited to, cross-linking of a plurality of arms and a crosslinker. The core may be a core a hydrophobic core or a hydrophilic core. For example, a core may be formed by or derived from cross-linking of a plurality of homopolymeric arms and a plurality of copolymeric arms with a crosslinker, such as a multi-functional monomer crosslinker, for example, a hydrophobic difunctional monomer crosslinker. In certain embodiments, the core may be formed or derived from crosslinking a plurality of hydrophilic polymeric arms and a first plurality of copolymeric arms, comprising block hydrophilic polymeric segments and block hydrophobic polymeric segments, and a second plurality of copolymeric arms, comprising block hydrophilic polymeric segments and block salt-tolerant-enhancing polymeric segments, with a crosslinker, such as a hydrophobic difunctional monomer crosslinker, for example divinylbenzene, wherein the molar ratio of the homopolymeric arms to the first copolymeric arms may be between 40:1 to 2:1, and the molar ratio of the homopolymeric arms to the second copolymeric arms may be between 40:1 to 2:1.

Suitable salt-tolerant star macromolecules may include, but is not limited to, comprising a core having a molecular weight of greater than 3,000 g/mol. For example, a star macromolecule may comprise a core having a molecular weight of between 3,000 g/mol and 90,000 g/mol, such as between 3,000 g/mol and 45,000 g/mol; between 3,000 g/mol and 40,000 g/mol; between 3,000 g/mol and 30,000 g/mol; between 3,000 g/mol and 20,000 g/mol; between 3,000 g/mol and 15,000 g/mol; between 5,000 g/mol and 40,000 g/mol; between 6,000 g/mol and 30,000 g/mol; between 7,000 g/mol and 25,000 g/mol; between 8,000 g/mol and 20,000 g/mol; between 5,000 g/mol and 15,000 g/mol; between 7,000 g/mol and 12,000 g/mol; between 5,000 g/mol and 9,000 g/mol; between 8,000 g/mol and 10,000 g/mol; or between 9,000 g/mol and 15,000 g/mol.

Suitable salt-tolerant star macromolecules may be used to form a clear, homogeneous gel when dissolved in water at a concentration of at least 0.05 wt. % at a pH of about 7.5 at STP. For example, a star macromolecule may form a clear, homogeneous gel when dissolved in water at a concentration of between 0.05 wt. % to 3 wt. %, such as between 0.1 wt. % to 2.5 wt. %; between 0.1 wt. % to 2 wt. %; between 0.2 wt. % to 2.0 wt. %; between 0.2 wt. % to 1.5 wt. %; between 0.2 wt. % to 1.0 wt. %; between 0.2 wt. % to 2.5 wt. %; between 0.3 wt. % to 2.5 wt. %; between 0.4 wt. % to 2.0 wt. %; between 0.5 wt. % to 2.0 wt. %; between 0.6 wt. % to 2.0 wt. %; between 0.7 wt. % to 1.5 wt. %; between 0.8 wt. % to 1.2 wt. %; between 0.9 wt. % to 1.1 wt. %; between 0.5 wt. % to 2.5 wt. %; between 0.75 wt. % to 1.5 wt. %; or between 0.8 wt. % to 1.6 wt. %.

Suitable salt-tolerant star macromolecules, in accordance with the pH Efficiency Range Test Procedure described below herein, may be used to form a clear, homogeneous gel, wherein the star macromolecule at a concentration of 0.4 wt. %, may have a viscosity of at least 20,000 cP, at a pH of between about 4 to about 12, for example, at a pH of between about 5 to about 11.5 such as at a pH of between about 5 to about 11; between about 5 to about 10.5; between about 5 to about 10; between about 5 to about 9.5; between about 5 to about 9; between about 5 to about 8.5; between about 5 to about 8; between about 6 to about 11; between about 5.5 to about 10; between about 6 to about 9; between about 6.5 to about 8.5; between about 7 to about 8; between about 7.5 to about 8.5; or between about 6.5 to about 7.5.

In certain embodiments, for example, suitable salt-tolerant star macromolecules, in accordance with the pH Efficiency Range Test Procedure described below herein, may be used to form a clear, homogeneous gel, wherein the star macromolecule at a concentration of 0.4 wt. %, may have a viscosity of at least 20,000 cP at a pH between about 5.5 to about 11. For example, at a pH between about 5.5 to about 11 may have a viscosity of at least 30,000 cP, such as, at least 40,000 cP; between 20,000 cP to 250,000 cP; between 20,000 cP to 250,000 cP; between 20,000 cP to 225,000 cP; between 20,000 cP to 200,000 cP; between 20,000 cP to 175,000 cP; between 20,000 cP to 150,000 cP; between 20,000 cP to 125,000 cP; between 30,000 cP to 250,000 cP; between 30,000 cP to 200,000 cP; between 40,000 cP to 175,000 cP; or between 40,000 cP to 150,000 cP. For example, a gel at a pH between about 6 to about 11 may have a viscosity of at least 20,000 cP, such as, at least 30,000 cP; at least 40,000 cP; between 20,000 cP to 250,000 cP; between 20,000 cP to 250,000 cP; between 20,000 cP to 225,000 cP; between 20,000 cP to 200,000 cP; between 20,000 cP to 175,000 cP; between 20,000 cP to 150,000 cP; between 20,000 cP to 125,000 cP; between 30,000 cP to 250,000 cP; between 30,000 cP to 200,000 cP; between 40,000 cP to 175,000 cP; or between 40,000 cP to 150,000 cP. For example, at a pH between about 7 to about 10.5 may have a viscosity of at least 60,000 cP, such as at least 70,000 cP; between 60,000 cP to 250,000 cP; between 60,000 cP to 225,000 cP; between 60,000 cP to 200,000 cP; between 60,000 cP to 175,000 cP; between 60,000 cP to 150,000 cP; between 60,000 cP to 125,000 cP; between 60,000 cP to 115,000 cP; between 60,000 cP to 105,000 cP; or between 60,000 cP to 100,000 cP. For example, at a pH between about 4.5 to about 9.0 may have a viscosity of at least 95,000 cP, such as at least 100,000 cP; between 95,000 cP to 250,000 cP; between 95,000 cP to 225,000 cP; between 95,000 cP to 200,000 cP; between 95,000 cP to 175,000 cP; between 95,000 cP to 150,000 cP; between 95,000 cP to 125,000 cP; between 95,000 cP to 115,000 cP; or between 95,000 cP to 105,000 cP.

Suitable salt-tolerant star macromolecules, in accordance with the Dynamic Viscosity Test Procedure described below herein, may be used to form a clear, homogeneous gel, wherein the star macromolecule at a concentration of 0.4 wt. %, may have a viscosity of less than 5,000 cP at a shear rate of 4 $sec^{-1}$, such as a viscosity of less than 4,000 cP. For example, the star macromolecule at a concentration of 0.4 wt. %, may have a viscosity have a viscosity of less than 5,000 cP at a shear rate of 6 $sec^{-1}$, such as a viscosity of less than 4,000 cP or less than 3,000 cP. For example, a gel may have a viscosity of less than 15,000 cP at a shear rate of 0.7 $sec^{-1}$, such as a viscosity of less than 14,000 cP or less than 13,000 cP. In certain embodiments, suitable gels of the salt-tolerant star macromolecules of the present invention may have a viscosity of less than 5,000 cP at a shear rate of between 4 and 50 sec$^{-1}$, for example, at a shear rate of between 4 and 45 sec$^{-1}$; such as between 4 and 40 sec$^{-1}$; between 4 and 30 sec$^{-1}$; between 4 and 25 sec'; between 10 and 30 sec$^{-1}$; between 15 and 25 sec$^{-1}$; between 20 and 50 sec$^{-1}$; between 30 and 40 sec$^{-1}$; or between 35 and 50 sec$^{-1}$. Suitable gels may include, but is not limited to, gels having shear-thinning value of at least 5, such as a shear-thinning value of at least 6, or between 5 to 15, such as between 5 to 15; between 7 to 12; between 8 to 10; or between 6 to 13.

Suitable salt-tolerant star macromolecules, in accordance with the Dynamic Viscosity Test Procedure described below herein, include those that have a shear-thinning value of at least 6, such as a shear-thinning value of between 6 to 100, such as between 15 to 90; between 20 to 80; between 25 to 70; between 25 to 50; or between 30 to 40.

Suitable salt-tolerant star macromolecules, in accordance with the Dynamic Viscosity Test Procedure described below herein, include those that have a dynamic viscosity value, of greater than 20,000 cP at 1 rpm, and at a concentration of 0.2 wt. %, such as a dynamic viscosity value of greater than 24,000 cP; greater than 28,000 cP; or greater than 30,000 cP at a concentration of 0.2 wt. %.

Suitable emulsions may include, but is not limited to, emulsions that are emulsifier-free and wherein the emulsion is thickened by suitable salt-tolerant star macromolecules. For example, the star macromolecule that may be included in the emulsifier-free emulsion may be a water-soluble star macromolecule, wherein the water-soluble star macromolecule emulsifies the emulsifier-free emulsion.

Suitable salt-tolerant star macromolecules, include salt-tolerant star macromolecules that have an emulsion value of greater than 60 minutes, for example, greater than 3 hours, such as greater than 6 hours; greater than 10 hours; greater than 20 hours; greater than 40 hours; or greater than 100 hours.

Suitable salt-tolerant star macromolecules, according to Formula Z, may include salt-tolerant star macromolecules wherein, for example, P1 comprises hydrophilic monomers, P2 comprises salt-tolerant-enhancing monomers, P3 comprises hydrophilic monomers, P4 comprises hydrophobic monomers, and P5 comprises hydrophilic monomers. For example, star macromolecules, according to Formula Z, may include star macromolecules wherein q2 and q4 may have a value of between 1 to 500, for example, between 1 to 250, such as, between 1 to 150; between 1 to 100; between 1 to 75; between 1 to 60; between 1 to 45; between 5 to 40; between 8 to 35; between 10 to 30; between 12 to 25; between 14 to 20; between 15 to 30; or between 5 to 20; and q1, q3 and/or q5 have a value of between 10 to 2000, for example, between 10 to 1500, such as, between 10 to 1000; between 10 to 750; between 10 to 500; between 10 to 400; between 50 to 300; between 50 to 200; between 100 to 250; between 125 to 175; between 100 to 400; between 150 to 250; between 150 to 350; between 200 to 300; between 150 to 300; between 50 to 150; or between 75 to 125. For example, star macromolecules, according to Formula Z, may include star macromolecules wherein r, s, or t, or the sum of r and t, or the sum of s and t, may be greater than 5, such as between 5 and 500; between 5 and 400; between 5 and 300; between 5 and 200; between 5 and 100; between 5 and 90; between 10 and 75; between 15 and 80; between 15 and 70; between 15 and 60; between 15 and 50; between 20 and 50; between 25 and 45; between 25 and 35; between 30 and 45; or between 30 and 50. For example, star macromolecules, according to Formula Z, may include star macromolecules wherein, independently, the molar ratio of r to t, or the molar ratio of s to t, is in the range of between 40:1 to 1:40, such as between 40:1 to 1:30; between 40:1 to 1:20; between 40:1 to 1:15; between 40:1 to 1:10; between 40:1 to 1:5; between 40:1 to 2:1; between 30:1 to 2:1; between 20:1 to 2:1; between 15:1 to 2:1; between 10:1 to 2:1; between 9:1 to 2:1; between 8:1 to 2:1; between 7:1 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; between 7:3 to 2:1; between 7:4 to 2:1; between 5:4 to 2:1; or between 5:1 to 3:1. For example, star macromolecules, according to Formula Z, may include star macromolecules wherein the core may be derived from crosslinker monomers, such as hydrophobic crosslinker monomers. For example, star macromolecules, according to Formula Z, may include star macromolecules wherein the core may comprise crosslinker monomeric residues, such as hydrophobic crosslinker monomeric residues.

Suitable salt-tolerant star macromolecules, may include, but is not limited to, star macromolecules formed by crosslinking the arms with a crosslinker, such as crosslinking homopolymeric arms and block copolymeric arms with a hydrophobic crosslinker. For example, the homopolymeric arms and the copolymeric arms of a star macromolecule may be covalently attached to the core via crosslinkage with a crosslinker. For example, a core of a prepared star macromolecule may be prepared by crosslinking an end of a homopolymeric arm with an end of a copolymeric arm, such as an end of a hydrophilic homopolymeric arm with a hydrophilic end of a copolymeric arm. For example, the core of a prepared star macromolecules may be formed by crosslinking an ATRP-functional terminal group end of a homopolymeric arm with an ATRP-functional terminal group end of a copolymeric arm.

Suitable initiators that may be used to form the salt-tolerant star macromolecules disclosed herein, may include, but is not limited to, nitroxide initiators, such as stable nitroxide initiators, for example, 2,2,6,6-Tetramethylpiperidine-1-oxyl, sometimes called TEMPO; transition metal complexes, such cobalt containing complexes; ATRP initiators, comprising halides, such as, bromide, chloride, or iodide, and transition metal sources, such as, copper, iron, ruthenium transition metal sources; iodide with RCTP catalysts, such as germanium or tin catalysts; RAFT initiators, such as dithioesters, dithiocarbamates, or xanthates; ITP catalysts, comprising iodides; tellurium compounds (e.g., TERP); stibine compounds (e.g., SBRP); or bismuth compounds (e.g., BIRP). For example, in certain embodiments, an initiator may further comprise a monomeric residue, a polymeric segment comprising monomeric residues, or a small-molecule, such as diethyl 2-bromo-2-methylmalonate (DEBMM). For example, in certain embodiments, an initiator may comprise an ATRP initiator, wherein the ATRP initiator serves as a terminal functional group. For example, in certain embodiments, an initiator may comprise an ATRP-functional terminal group, comprising an ATRP initiator, such as halides and transition metal sources.

Suitable radical initiators that may be used to form the salt-tolerant star macromolecules disclosed herein, may include, but is not limited to, azo-containing compounds such as 2,2'-azobis(2-methylpropionitrile (AIBN); a peroxide, for example, benzoyl peroxide (BPO), lauroyl peroxide, or cyclohexanone peroxide; a peroxy acid, for example, peroxyacetic acid or peroxybenzoic acid; tert-butyl peracetate; 1,1-bis(tert-butylperoxy)-3,3,5-(dibutyl phthalate) trimethylcyclohexane; 2,2'-azobis(4-methoxy-2,4-dimethyl valeronitrile) (V-70); 2,2'-azobis(2,4-dimethyl valeronitrile) (V-65); dimethyl 2,2'-azobis(2-methylpropionate) (V-601);

2,2'-azobis(2-methylbutyronitrile) (V-59); 1,1'-azobis(cyclohexane-1-carbonitrile) (V-40); 2,2'-azobis[N-(2-propenyl)-2-methylpropionamide] (VF-096); or derivatives or combinations thereof. Other suitable radical initiators may include, but are not limited to acetophenone; anisoin; anthraquinone; anthraquinone-2-sulfonic acid sodium salt monohydrate; (benzene) tricarbonylchromium; benzyl; benzoin ethyl ether; 4-benzoylbiphenyl; 2-benzyl-2-(dimethylamino)-4'-morpholinobutyrophenone; 4,4'-bis(diethylamino)benzophenone; camphorquinone; 2-chlorothioxanthen-9-one; (cumene)cyclopentadienyliron(II) hexafluorophosphate; dibenzosuberenone; 2,2-diethoxyacetophenone; 4,4'-dihydroxybenzophenone; 2,2-dimethoxy-2-phenylacetophenone; 4-(dimethylamino)benzophenone; 4,4'-dimethylbenzil; 2,5-dimethylbenzophenone; 3,4-dimethylbenzophenone; 4'-ethoxyacetophenone; 2-ethylanthraquinone; ferrocene; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; methybenzoylformate; 2-methyl-4'-(methylthio)-2-morpholinopropiophenone; phenanthrenequinone; 4'-phenoxyacetophenone; thioxanthen-9-one); or derivatives or combinations thereof.

Although any conventional method can be used for the synthesis of the multi-arm salt-tolerant star macromolecules of the invention, free radical polymerization is the preferred and living/controlled radical polymerization (CRP) is the most preferred process.

Star polymers are nano-scale materials with a globular shape and can be formed by the "arm first" procedure, can have a crosslinked core and can optionally possess multiple segmented arms of similar composition. Stars can be designed as homo-arm stars or mikto-arm stars.

Synthesis of star polymers of the invention can be accomplished by "living" polymerization techniques via one of three strategies: 1) core-first" which is accomplished by growing arms from a multifunctional initiator; 2) "coupling-onto" involving attaching preformed arms onto a multifunctional core and the 3) arm-first" method which involves cross-linking preformed linear arm precursors using a divinyl compound.

Figure 10:
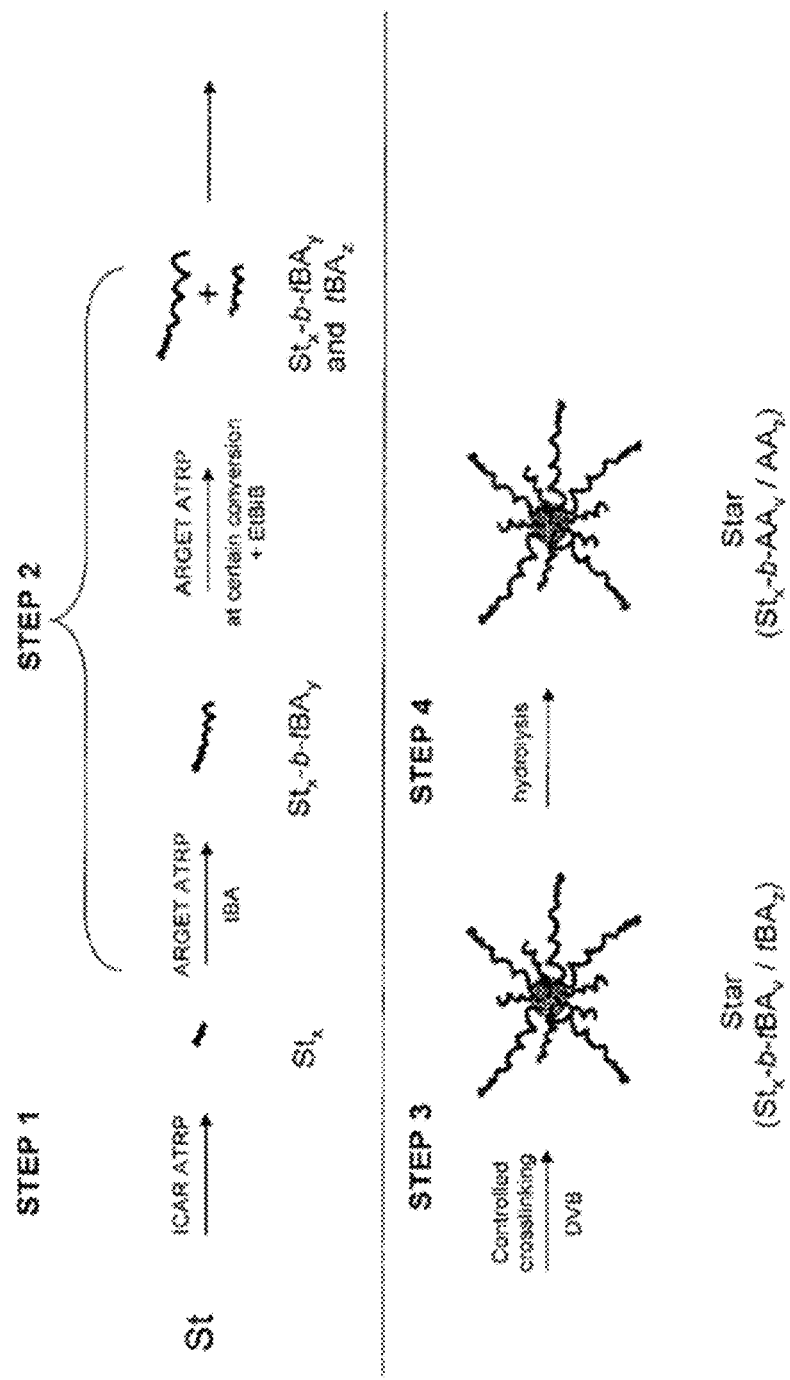
FIG. 10: depicts a multistep synthesis of $(St_x\text{-}b\text{-}AA_y/AA_z)$ miktoarm stars copolymers.

A comparative process, identified as Scheme 1 and depicted in FIG. 10 is shown in Example 1, which provides a synthetic pathway for preparing the star macromolecule (Advantomer), is a multistep, multi-pot process. The comparative synthesis requires extensive purification and drying of the polymer after each step which results in the generation of huge amounts of chemical waste (solvents and non-solvents for precipitation) as well as energy consumption (energy used for drying process). These very long purification procedures significantly increase the costs of the final production. These purification procedures are required due to lower conversion of monomer (<65%) which needs to be removed before the next synthetic step can be performed. Due to the use of ARGET ATRP, it is impossible to achieve high monomer conversion and a polymer with high chain-end functionality. The high chain-end functionality is required for the synthesis of the well-defined star macromolecules.

Figure 11:
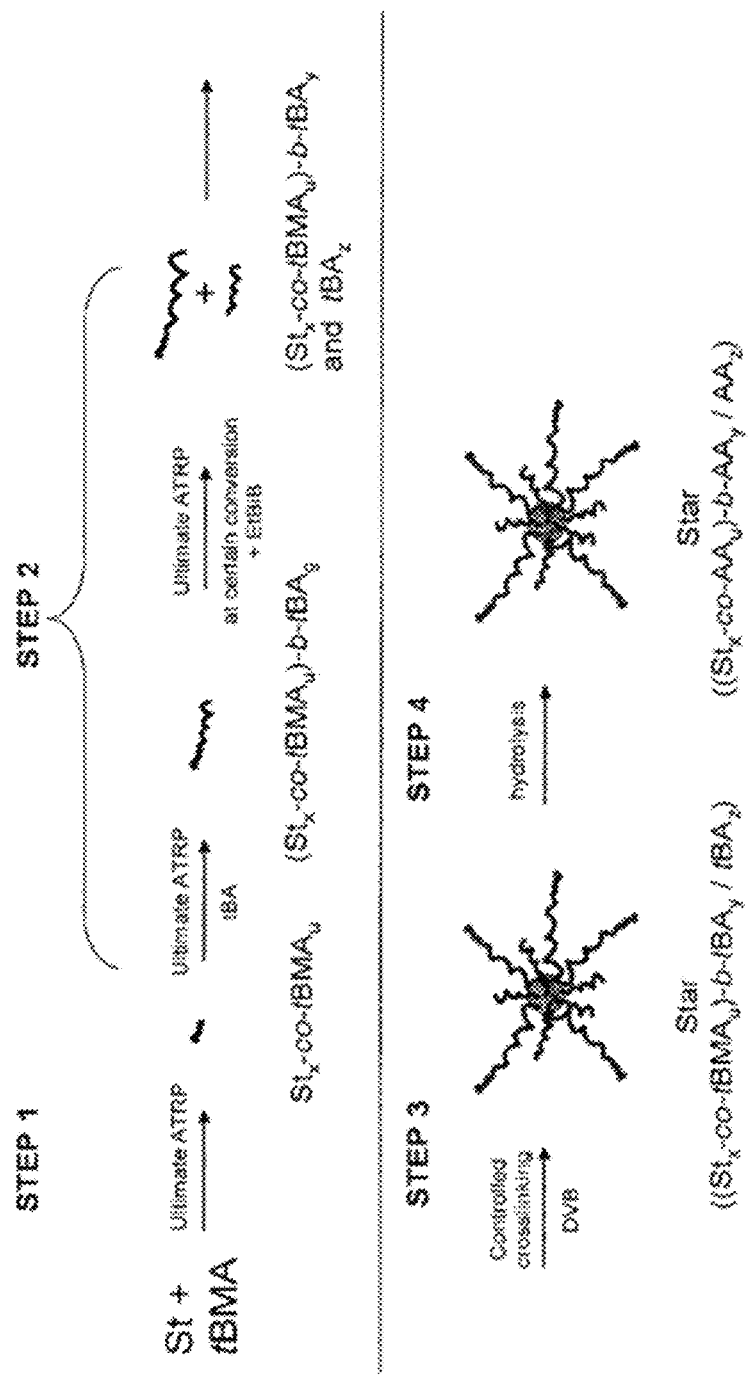
FIG. 11: depicts a multistep synthesis of ((St-co-MAA)-b-AA/AA) miktoarm stars copolymers, where Steps 2, 3 and 4 are performed in "one pot".

In certain embodiments, the method of making a star macromolecule, such as a salt-tolerant star macromolecule, comprises a one-pot method. The advantages of the "one pot" process for the synthesis of star copolymers has been described and demonstrated in Examples 2-6, as shown in Scheme 2 and depicted in FIG. 11, to generate new well-defined star macromolecules. The one-pot method disclosed herein comprises using a novel polymerization technique called Ultimate ATRP instead of ARGET ATRP. This one-pot method uses controlled feeding of radical initiator to the reaction vessel at very a specific temperature. This allows reaching high monomer conversion (>70%, such as >80%) and higher polymer chain-end functionality. This method also provides great control over kinetics and exothermic effects during the polymerization process. Due to high conversion of the monomer after each step, it is possible to continue the polymerization reaction in "one pot" by adding subsequent chemicals without the need for purification between the steps. As a result, the chemical waste is significantly reduced (just one short washing after step 4 is required) and the full synthesis can be performed in much shorter times (3 days vs. 15-20 days using the standard comparative process illustrated in Example 1 (FIG. 10)).

In certain embodiments, star macromolecules may be prepared according to the one-pot method of the present invention, comprising: preparing one or more of a first arm, and after achieving a high conversion of the monomer, initiate preparing one or more of a second arm in the same pot, while optionally, extending the prepared one or more first arms, followed by crosslinking the prepared one or more first arms and the prepared one or more second arms, washing the resulting product and isolating the final star macromolecule. The one pot method may further comprise the preparation of more than two arms in the one pot prior to the crosslinking step, such as preparing one or more of at least 3 arm types, at least 4, at least 5, at least 10, at least 15, at least 20 arm types in the one pot, for example, between 2-30, such as between 2-25, between 2-20, between 2-15, between 2-10, between 2-8, between 2-6, between 3-30, between 3-25, between 3-20, between 3-15, between 3-10, between 3-7, between 3-5, between 4-15, between 5-20, between 5-10, between 10-20, or between 20-30, arm types in the one pot.

In certain embodiments, according to the one pot method of the present invention, preparing of one or more of a first arm of a star macromolecule may comprise feeding a first amount of a radical initiator in a controlled manner to a reaction vessel containing a first group of monomers at a pre-determined temperature, followed by polymerizing the first group of monomers to greater than 15% monomer conversion, for example polymerizing the first group of monomers to greater than 20% monomer conversion, such as greater than 25%; greater than 30%; greater than 35%; greater than 40%; greater than 45%; or greater than 50% monomer conversion; for example between 15 and 97% monomer conversion, such as between 15 and 97%; between 15 and 95%; between 15 and 90%; between 15 and 85%; between 15 and 80%; between 15 and 75%; between 15 and 70%; between 15 and 65%; between 15 and 50%; between 15 and 45%; between 15 and 40%; between 15 and 35%; between 25 and 97%; between 25 and 75%; between 35 and 80%; or between 50 and 97% monomer conversion. Upon achieving greater than 15% monomer conversion in preparing the one or more first arms, one or more of a second arm of the star macromolecule, and optionally, extending the prepared one or more first arms, may begin, comprising: adding a second arm initiator to the reaction vessel, adding a second group of monomers to the reaction vessel, and feeding (at a pre-determined temperature) a second amount of the radical initiator in a controlled manner to the reaction vessel containing the second arm initiator, the second group of monomers, and optionally the prepared one or more first arms, followed by polymerizing the second group of monomers to greater than 15% monomer conversion. For example polymerizing the second group of monomers to greater than 20% monomer conversion, such as greater than 25%; greater than 30%; greater than 35%; greater than 40%; greater than 45%; or greater than 50% monomer conversion; for example between 15 and 97% monomer conversion, such as between 15 and 97%; between 15 and 95%; between 15 and 90%; between 15 and 85%; between 15 and 80%; between 15 and 75%; between 15 and 70%; between 15 and 65%; between 15 and 50%; between 15 and 45%; between 15 and 40%; between 15 and 35%; between 25 and 97%; between 25 and 75%; between 35 and 80%; or between 50 and 97% monomer conversion. Upon achieving greater than 15% monomer conversion in preparing the one or more second arms, and optionally, extending the prepared one or more first arms, further arm types may be initiated in the one pot, such as a third arm type, or more than 3 arm types, following similar steps in preparing the first and second arm types, or the total group of arms may be crosslinked to form the eventual star macromolecule. If the total range of arm types has been achieved, then the monomer conversion is driven to at least 70% prior to beginning the crosslinking. For example after initiating the preparation of the last arm type to be incorporated into the desired star macromolecule, and prior to beginning the crosslinking step, the polymerization of the monomers in the reaction vessel is driven to greater than 70%, such as greater than 75%; greater than 80%; greater than 85%; greater than 90%; greater than 95%; or greater than 97% monomer conversion, prior to beginning the crosslinking step; for example between 70 and 97% monomer conversion, such as between 75 and 97%; between 80 and 97%; between 85 and 95%; between 70 and 90%; between 85 and 97%; or between 90 and 97% monomer conversion prior to beginning the crosslinking step. The crosslinking of the total group of arms types prepared in the one method, according to the present invention, comprises adding the crosslining agent, and continuing the polymerization in the one pot. The resulting product may then be washed and isolated.

In certain embodiments, the one pot method of preparing star macromolecules may reduce the total preparation time of the star macromolecule by at least 50%, relative to multi-pot preparations, for example, by at least 55%, such as at least 60%; at least 65%; at least 70%; at least 75%; at least 80%; at least 85%; at least 90%; or at least 95%, relative to multi-pot preparations. In certain embodiments, the one pot method of preparing star macromolecules may be exclusive of intermediate purification steps, or may one require one intermediate washing step or one washing step after crosslinking.

In certain embodiments, the salt-tolerant star macromolecules of the present invention, and those made by the methods of preparing the same, may be used as a salt-tolerant thickening agent, such as a salt-tolerant thickening agent in aqueous media, or an oil-based media, or a mixed water and oil-based media. In certain embodiments, a method of making or preparing a salt-tolerant composition may include adding a salt-tolerant star macromolecule disclosed herein, such that when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test. In certain embodiments, a method of making an aqueous composition salt-tolerant may include adding at least 0.3 wt. % of a salt-tolerant star macromolecule disclosed herein to an aqueous composition, wherein the salt-tolerant star macromolecule when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test.

Without wishing to be bound to a particular mechanism, the observed salt-tolerance of the salt-tolerant star macromolecules, and compositions using the same, in aqueous mixtures is alterable based on the type of salt-tolerant-enhancing monomers included in the stars, for example, ionizable monomers, anionic monomers, cationic monomers, or hydrogen-bonding capable monomers, such as hydrogen bond donating monomers or hydrogen bond accepting monomers. In certain embodiments, the salt-tolerant star macromolecules comprise at least two types of arms: a first arm type comprising hydrophilic polyelectrolytes arms, and a second arm type comprising a hydrophilic polyelectrolytes block and a salt-tolerant-enhancing block. In certain embodiments, the salt-tolerant star macromolecules comprise at least three types of arms: a first arm type comprising hydrophilic polyelectrolytes arms, a second arm type comprising a hydrophilic polyelectrolytes block and a salt-tolerant-enhancing block, and a third arm type comprising a hydrophilic polyelectrolytes block and a hydrophobic block. These arms are covalently attached to the core of the star at the ends of hydrophilic blocks.

When the salt-tolerant star macromolecule is an amphiphilic star polymer, partially or totally neutralized by base in water solution, the negative charges repellent on hydrophilic chains may help stretching of the hydrophilic arms in water which may be good for increasing the viscosity of the solution. Meanwhile, the hydrophobic blocks may associate together due to the hydrophobic interactions in water solution. In this way, different star polymer molecules may be connected to form a large net in water solution and increase the viscosity of water. As salts are added to the polymer solution, the shrink of hydrophilic chains can break the hydrophobic interactions between hydrophobic chains. The dissociation of the polymer network and shrink of hydrophilic arms may result in the loss of viscosity.

The hydrophobic copolymeric chains having hydrogen bond donors or acceptors functional groups can form hydrogen bonds with water so the hydrophobic chains can have better stretch in water than those hydrophobic polymer chains without hydrogen bonds with water. The better stretch of these hydrophobes may contribute larger interface to hydrophobic interactions as they associate together. While salts are added, the hydrogen bonds between hydrophobic chains and water are broken from partially to totally with the increase amount of salts. As a result, the circumstance around the hydrophobic polymer chains may turn to more hydrophobic and may lead to stronger hydrophobic interactions between hydrophobic chains, which may strengthen the polymer network. As for the hydrophilic chains, the addition of salts may weaken the negative charges repellent along the chains and the arms may tend to shrink. Such tendency increases as the amount of electrolytes increases. In the presence of salts, the enhanced hydrophobic interactions between hydrophobes tend to reinforce the polymer network while the weakened negative charge repulsions tend to pull the network apart. With the addition of salts, if the increase of the hydrophobic interactions between hydrophobes can counteract or surpass the increase of shrinking of hydrophilic chains, the viscosity may retain or even increase. But as the growing force of shrink is stronger than the hydrophobic interactions between hydrophobes, the connections between stars may gradually break and consequently the viscosity will decrease gradually. This may be a major reason for salt-tolerant effect. When hydrogen bond donor or acceptors moieties are introduced into hydrophobes of the star polymers disclosed herein, the observed viscosity increased and then gradually decreased as the amount of salt increased. In star polymers having hydrophobic chains without hydrogen bond donors or acceptors moieties, a sharp decrease in viscosity was observed when salts are added.

While all above controlled polymerization procedures are suitable for preparation of an embodiment of the disclosed self assembling star macromolecules, other embodiments are also exemplified, for example, the preparation of the self assembling multi-arm stars with narrow MWD, in contrast to prior art using ATRP. The reason for the use of the Controlled Radical Polymerization process (CRP) known as ATRP; disclosed in U.S. Pat. Nos. 5,763,546; 5,807,937; 5,789,487; 5,945,491; 6,111,022; 6,121,371; 6,124,411: 6,162,882: and U.S. patent application Ser. Nos. 09/034,187; 09/018,554; 09/359,359; 09/359,591; 09/369,157; 09/126,768 and 09/534,827, and discussed in numerous publications listed elsewhere with Matyjaszewski as co-author, which are hereby each incorporated into this application in their entirety, is that convenient procedures were described for the preparation of polymers displaying control over the polymer molecular weight, molecular weight distribution, composition, architecture, functionality and the preparation of molecular composites and tethered polymeric structures comprising radically (co)polymerizable monomers, and the preparation of controllable macromolecular structures under mild reaction conditions.

An aspect of the present invention relates to the preparation and use of multi-arm star macromolecules by an "arm first" approach, discussed by Gao, H.; Matyjaszewski, K. *JACS;* 2007, 129, 11828. The paper and cited references therein are hereby incorporated by reference to describe the fundamentals of the synthetic procedure. The supplemental information available within the cited reference provides a procedure for calculation of the number of arms in the formed star macromolecule.

It is expected that biphasic systems such as a mini-emulsion or an ab initio emulsion system would also be suitable for this procedure since mini-emulsion systems have been shown to function as dispersed bulk reactors [Min, K.; Gao, H.; Matyjaszewski, K. *Journal of the American Chemical Society* 2005, 127, 3825-3830] with the added advantage of minimizing core-core coupling reactions based on compartmentalization considerations.

In one embodiment star macromolecules are prepared with composition and molecular weight of each segment predetermined to perform as rheology modifiers in aqueous based solutions. The first formed segmented linear polymer chains are chain extended with a crosslinker forming a crosslinked core.

In another embodiment, a simple industrially scalable process for the preparation of star macromolecules is provided wherein the arms comprise segments selected to induce self assembly and wherein the self assemblable star macromolecules are suitable for use as rheology control agents in waterborne and solvent-borne coatings, adhesives, and fracturing fluid compositions.

An embodiment of the present invention can be exemplified by the preparation of a multi-arm star macromolecule wherein the number of arms in the star macromolecule is between 5 and 500, preferentially between 10 and 250, with segments selected to induce self assembly when the star macromolecule is dispersed in a liquid wherein the self assemblable star macromolecules are suitable for use as thickening agents or rheology modifiers in cosmetic and personal care compositions at low concentrations of the solid in the thickened solution, preferably less than 5 wt. %, and optimally less than 1 wt. %. The dispersion medium can comprise aqueous based systems or oil based systems.

Similar structures can also be prepared using the macromonomer method or a combination of the macromonomer and macroinitiator method in a controlled polymerization process, or even through free radical copolymerization conducted on macromonomers, as known to those skilled in the art. [Gao, H.; Matyjaszewski, K. *Chem.-Eur. J.* 2009, 15, 6107-6111.]

Both the macromonomer and macroinitiator procedures allow incorporation of polymer segments prepared by procedures other than CRP [WO 98/01480] into the final star macromolecule. Polymer segments can comprise segments that are bio-degradable of are formed from monomers prepared from biological sources.

As noted above the first formed ATRP macroinitiator can be prepared by conducting a sequential ATRP (co)polymerization of salt-tolerant-enhancing, hydrophobic, and/or hydrophilic monomers or precursors thereof or can be prepared by other polymerization procedures that provide a functional terminal atom or group that can be converted into an ATRP initiator with a bifunctional molecule wherein one functionality comprises a transferable atom or group and the other functionality an atom or group that can react with the functionality first present on the (co)polymer prepared by a non-ATRP procedure. [WO 98/01480]

In aqueous solutions, the composition and molecular weight of the outer shell of hydrophobes, or agents that participate in molecular recognition, can be selected to induce self-assembly into aggregates and act as physical crosslinkers. Above a certain concentration, corresponding to the formation of a reversible three dimensional network, the solutions will behave as physical gels thereby modifying the rheology of the solution.

In one embodiment, the polymer compositions of the invention have significantly lower critical concentration for network (gel) formation compared to networks formed with block copolymers, graft and stars with a low specific number of attached arms due to:

multi-arm structure (many transient junctions possible between hydrophobic parts of the stars)

very high molecular weight of each star (5 thousand to 5 million or higher) allows high swelling ratio of the molecules in solution molecular organization on larger scales (>1 µm)

Whereas the examples above and below describe the preparation and use of block copolymers as arms with a well defined transition from one segment to the adjoining segment a segmented copolymer with a gradient in composition can also be utilized. The presence of a gradient can be created by addition of a second monomer prior to consumption of the first monomer and will affect the volume fraction of monomer units present in the transition form one domain to another. This would affect the shear responsiveness of the formed star macromolecule.

Star macromolecules with narrow polydispersity comprising arms with block copolymer segments can be formed with as few as 5 arms by selecting appropriate concentration of reagents, crosslinker and reaction temperature.

Star macromolecules can be prepared in a mini-emulsion or reverse mini-emulsion polymerization system. The first formed block copolymers are used as reactive surfactants for star synthesis by reaction with a selected crosslinker in mini-emulsion.

In an embodiment, the polymer compositions having salt-tolerant star macromolecules of the present invention, the salt-tolerant star macromolecule, emulsifier, gel, emulsifier-free emulsion, emulsion and/or thickening agent, including those formed by a one-pot process, ATRP, CRP, and/or combinations of one or more of these processes, may be used to provide a certain level of control over viscosity and consistency factors in many aqueous and oil based systems including, for example, fracking fluid additives, gelling agents, gels, proppant stabilizers, breakers, friction reducers, thickening agents.

In an embodiment, the salt-tolerant star macromolecules of the present invention (or the polymer compositions having the same), may be suitable in oil and gas applications, including but not limited to, as rheology modifiers for fracturing fluids/drilling well fluids, gelling agents, gels, dispersants, proppant stabilizers and carriers, breakers, friction reducers, lubricants, scale-buildup inhibitors, heat transfer fluids, thickening agents, additives to improve oil extraction from oil sands, emulsion breakers for oil-sand-water emulsions, or additives to improve dewatering of oil sands.

In an embodiment, the salt-tolerant star macromolecules of the present invention (or the polymer compositions having the same), may be suitable in mining applications, including but not limited to, dust suppressants, flocculating agents, gold and precious metal extraction, and precious metal processing, lubricants and drag reduction agents for pipeline slurry transport.

In an embodiment, the salt-tolerant star macromolecules of the present invention (or the polymer compositions having the same), may be suitable in cosmetic and personal care applications, including but not limited to, cosmetic creams, lotions, gels, sprayable lotion, sprayable cream, sprayable gel, hair styling sprays and mousses, hair conditioners, shampoos, bath preparations, ointments, deodorants, mascara, blush, lip stick, perfumes, powders, serums, skin cleansers, skin conditioners, skin emollients, skin moisturizers, skin wipes, sunscreens, shaving preparations, solids, and fabric softeners.

In an embodiment, the salt-tolerant star macromolecules of the present invention (or the polymer compositions having the same), may be suitable in home care applications, including but not limited to, cleaners for windows and glass, and other household surfaces, toilet areas, enzyme production, drain cleaners, liquid and gelled soaps, polishes and waxes, liquid and powdered detergents including detergents for laundry and in dish washing.

In an embodiment, the salt-tolerant star macromolecules of the present invention (or the polymer compositions having the same), may be suitable in adhesive applications, including but not limited to, associative complexes, billboard adhesives, carpet backsizing compounds, hot melt adhesives, labeling adhesives, latex adhesives, leather processing adhesives, plywood laminating adhesives, paper adhesives, wallpaper pastes, wood glue.

In an embodiment, the salt-tolerant star macromolecules of the present invention (or the polymer compositions having the same), may be suitable in electronic applications, including but not limited to, antistatic film and packaging, conductive inks, rheology control agents used for copper foil production, multilayer ceramic chip capacitors, photoresists, plasma display screens, lubricants for wire, cable, and optical fibers, gel lacquers for coil coating.

In an embodiment, the salt-tolerant star macromolecules of the present invention (or the polymer compositions having the same), may be suitable in medical and pharmaceutical applications, including but not limited to, but not limited to, medical device lubrication, antibacterial coatings, pharmaceutical excipients such as binders, diluents, fillers, lubricants, glidants, disintegrants, polish agents, suspending agents, dispersing agents, plasticizers.

In an embodiment, the salt-tolerant star macromolecules of the present invention (or the polymer compositions having the same), may be suitable in paper applications, including but not limited to, coatings, dispersion for tissue and thin papers, filler retention and drainage enhancement, flocculation and pitch control, grease-proof coatings, adhesives, release coatings, surface sizing, sizes for gloss and ink holdout, tail tie and pickup adhesives for papermaking.

In an embodiment, the salt-tolerant star macromolecules of the present invention (or the polymer compositions having the same), may be suitable in agricultural applications, including but not limited to, animal feed, dispersing agents, drift control, encapsulation, seed coatings, seed tape, spray adherents, water-based sprays and spray emulsions, water-soluble packaging.

In an embodiment, the salt-tolerant star macromolecules of the present invention (or the polymer compositions having the same), may be suitable in other applications including but not limited to, water- and solvent-based coating compositions, water- and solvent-based lubricants, water- and solvent-based viscosity index modifiers, paints, plasticizers, antifoaming agents, antifreeze substances, corrosion inhibitors, detergents, dental impression materials, dental fillers, inkjet printer ink and other inks, ceramic and brick forming, prepolymers such as polyols for use in polyesters, polyurethanes, polycarbonates. For rheology modifier applications, characteristics are high gel strength, stability in the presence of salt and increased temperatures, high shear thinning characteristics, forms versatile low viscosity soluble concentrations, and synergistic interactions with added agents to adjust their rheology profile to optimize properties such as sedimentation, flow and leveling, sagging, spattering, etc.

EXAMPLES

TABLE 1

| Abbreviation | Name | Form | Purity | Commercial Source |
| --- | --- | --- | --- | --- |
| St | styrene | liquid | 99% | Sigma Aldrich |
| MMA | methyl methacrylate | liquid | 99% | Sigma Aldrich |
| tBA | tert-butyl acrylate | liquid | 98% | Sigma Aldrich |
| tBMA | tert-butyl methacrylate | liquid | 98% | Sigma Aldrich |
| AA | acrylic acid (formed by deprotection) | NA | NA | NA |
| MAA | methacrylic acid (formed by deprotection) | NA | NA | NA |
| Me6TREN | tris[2-(dimethylamino)ethyl]amine | liquid | 95% | ATRP Solutions |
| TPMA | tris(2-pyridylmethyl)amine | solid | 95% | ATRP Solutions |
| bpy | 2,2'-bipyridine | solid | 99% | Sigma Aldrich |

TABLE 1-continued

| Abbreviation | Name | Form | Purity | Commercial Source |
|---|---|---|---|---|
| AIBN | 2,2'-Azobis(2-methylpropionitrile) | solid | 98% | Sigma Aldrich |
| Sn(EH)2 | tin(II) 2-ethylhexanoate | liquid | 95% | Sigma Aldrich |
| DVB | divinylbenzene | liquid | 80% | Sigma Aldrich |
| FA | formic acid | liquid | 99% | Sigma Aldrich |
| THF | tetrahydrofuran | liquid | 99.9% | Sigma Aldrich |
| NaOH | sodium hydroxide | solid | 98% | Sigma Aldrich |
| EBiB | ethyl α-bromoisobutyrate | liquid | 98% | Sigma Aldrich |
| DEBMM | diethyl 2-bromo-2-methylmalonate | liquid | 98% | Sigma Aldrich |
| DMF | diethylformamide | liquid | 98% | Sigma Aldrich |
|  | anisole | liquid | 99% | Sigma Aldrich |
|  | acetonitrile | liquid | 99.8% | Sigma Aldrich |
| NaCl | sodium chloride | solid | 99.7% | Fisher Chemical |
| V-70 | 2,2'-azobis(4-methoxy-2,4-dimethyl valeronitrile) | solid |  | Wako |
| HCl | hydrochloric acid | liquid | 37% | Sigma Aldrich |
| ACHX | 1,1'-azobis(cyclohexane-1-carbonitrile) | solid | 98% | Sigma Aldrich |
| HEA | hydroxyethyl acrylate |  |  |  |
| TFA | trifluroacetic acid |  |  |  |
|  | Methylene chloride | liquid |  | 99.6% |
| DMAEMA | 2-(dimethylamino)ethyl methacrylate |  |  |  |
| PEGMA | (polyethylene glycol) methacrylate |  |  |  |
| NIPAM | N-isopropylacrylamide |  |  |  |

Synthesis of Star Copolymers (Examples 1-6)

Example 1: Preparation of a ($St_{15}$-b-$AA_{290}$/$AA_{150}$) Miktoarm Star Macromolecule (Referenced Herein as Advantomer)

A four step procedure was developed for the preparation of a poly(acrylic acid) based miktoarm star macromolecule and is described in Scheme 1. 0.55 kg of the miktoarm star macromolecule with $St_{15}$-b-$AA_{290}$ and $AA_{150}$ arms (molar ratio of arms: 1/4) was prepared as follows.

Step 1: Synthesis of a Polystyrene Macroinitiator ($St_{15}$) Having 15 DP

A polystyrene macroinitiator was formed using ICAR ATRP by introducing the following components into the 4-L reaction vessel: 2500 mL of St, 83.7 mL of DEBMM, 195 mg of $CuBr_2$, 253 mg of TPMA, 3.6 g of AIBN, 10 mL of DMF, and 75 mL of anisole (corresponds to molar ratio: St/DEBMM/$CuBr_2$/TPMA/AIBN=50/1/0.002/0.003/0.05) at T=60° C., t=10.2 h. The reaction was run to ~30% conversion. The resulting reaction product was purified to obtain the PSt in powder form (yield ~650 g). A portion of the $St_{15}$ powder was dissolved in THF and passed through the GPC column. The measured molecular weight of the hydrophobic, polystyrene segment=1600 which is equivalent to an average degree of polymerization (DP) of about 15-16 and the PDI was measured to be 1.24.

Step 2: Synthesis of Polystyrene-b-Poly(t-Butyl Acrylate) and Poly(t-Butyl Acrylate) Macroinitiator The following components were introduced into the 4-L reaction vessel in the following molar ratio: tBA/$St_{15}$ (from Example 1, Step 1)/$CuBr_2$/TPMA/Sn(EH)$_2$=200/0.2/0.01/0.06/0.1, in anisole at T=55° C. (corresponds to amounts: 2400 mL of tBA, 26.9 g of PSt from Example 1 in Step 1, 188 mg of $CuBr_2$, 1.46 g TPMA, 2.7 mL of Sn(EH)$_2$, 100 mL of DMF, and 1100 mL of anisole). About 2.0 hours after the reaction was initiated, the conversion of the tBA reached about 6% and a portion of the $St_{15}$-b-tBA was recovered and measured by GPC with the following results $M_n$=19,800 g/mol; PDI=1.16. It was determined that the following $St_{15}$-b-$tBA_{140}$ copolymeric block was obtained. Then, 0.8 molar ratio amount (9.87 mL), relative to the initially introduced components, of EBiB was injected into the polymerization mixture. The reaction was continued and stopped after about 19.8 h when the conversion of the monomer reached 61%. The reaction product was purified by precipitation into 40 L of methanol/water (10/1 v/v) and next dried in the vacuum oven for 48 h at 50° C. (yield: 1250 g of polymer product). Next, polymer was analyzed by GPC. Based on the GPC measured the final molecular weight of the product was determined to be poly(t-butyl acrylate) segment in the block copolymer was ~37,200 g/mol, $St_{15}$-b-$tBA_{290}$, and the molecular weight of poly(t-butyl acrylate) initiated from EBiB was 19,200 g/mol which is equivalent to a DP=150, $tBA_{150}$. The overall molecular weight of mixture of arms resulted in $M_n$=20,800 g/mol and PDI=1.27.

Step 3: Synthesis of the ($St_{15}$-b-$tBA_{290}$/$tBA_{150}$) Miktoarm Star Macromolecule.

A mikto multi-arm star macromolecule was prepared by conducting a further chain extension reaction with the polymer $St_{15}$-b-$tBA_{290}$/$tBA_{150}$ formed in Example 1, Step 2. The reaction was conducted with a mole ratio of macroinitiators to divinylbenzene of 1:16 in anisole. The following components were introduced into the 4-L reaction vessel: 115 mL of DVB, 1050 g of $St_{15}$-b-$tBA_{290}$/$tBA_{150}$ from Example 1 in Step 2, 225 mg of $CuBr_2$, 1.03 g of TPMA, 2.45 mL of Sn(EH)$_2$, 115 mL of DMF, and 2500 mL of anisole (corresponds to molar ratio: DVB/[$St_{15}$-b-$tBA_{290}$/$tBA_{150}$] (from Example 1, Step 2)/$CuBr_2$/TPMA/Sn(EH)$_2$=16/1/0.02/0.07/0.15), T=95° C., t=20.6 h. The reaction product was purified via precipitation into 40 L of methanol and next dried in the vacuum oven for 48 h at 50° C. (yield: 1050 g of polymer product). Next polymer was analyzed by GPC. The GPC apparent molecular weight of the star was 109,400 with a PDI 1.52, which would indicate an average of six arms but this is an underestimate of the actual number of arms since the star molecule is a compact molecule. Indeed in this situation, the number of arms in the star molecule is close to 30.

Step 4: Deprotection of the ($St_{15}$-b-$tBA_{290}$/$tBA_{150}$) to ($St_{15}$-b-$AA_{290}$/$AA_{150}$) Star Deprotection of the ($St_{15}$-b-$tBA_{290}$/$tBA_{150}$) star macromolecule to ($St_{15}$-b-$AA_{290}$/$AA_{150}$) star block copolymer to provide water soluble poly(acrylic acid) segments in the mikto multi-arm star macromolecule. The $St_{15}$-b-$tBA_{290}$/$tBA_{150}$ arms of the miktoarm star macromolecule were transformed to $St_{15}$-b-$AA_{290}$/$AA_{150}$ arms with the following procedure. 900 g of polymer ($St_{15}$-b-$tBA_{290}$/$tBA_{150}$) (from Experiment 1, Step 3) was dissolved in 7200 mL of methylene chloride and 245 mL of trifluoroacetic acid to deprotect tBu groups, the reaction was performed at room temperature for 60.0 h. Then polymer was decanted and washed 3 times with 2 L of acetonitrile. Polymer was then solubilized in 5 L of THF and precipitated into 50 L of acetonitrile. The star macromolecule was dried in vacuum oven for 3 days at 50° C. The amount of polymer obtained after purification was 550 g, which would correspond to full conversion of tBA to AA.

Example 2: Preparation of a (($St_{19}$-co-$MAA_4$)-b-$AA_{325}$/$AA_{98}$) Star Macromolecule The simple "one-pot" procedure was developed for the preparation of a poly(acrylic acid) based miktoarm star macromolecule and is described in Scheme 2. The miktoarm star macromolecule with ($St_{19}$-co-$MAA_4$)-b-$AA_{325}$ and $AA_{98}$ arms (molar ratio of arms: 1/4) was prepared as follows.

Step 1: Synthesis of a Poly(Styrene-co-Tert-Butyl Methacrylate) Macroinitiator ($St_{19}$-co-$tBMA_4$) Having 23 DP A copolymer poly(styrene-co-tert-butyl methacrylate) macroinitiator was formed using ICAR ATRP by introducing the following components into the 100 mL reaction vessel at the following molar ratio: St/tBMA/EBiB/$CuBr_2$/Me6TREN/ACHX=40/10/1/0.003/0.06/0.03 (corresponds to amounts: 40 mL of St, 13.8 of tBMA, 1.28 mL of EBiB, 5.8 mg of $CuBr_2$, 0.14 mL of Me6TREN, 64 mg of ACHX, 2 mL of anisole, and 0.5 mL of DMF) at T=90° C., t=5.4 h. The reaction was run to ~25% conversion. The resulting reaction product was purified to obtain the $St_{19}$-co-$tBMA_4$ copolymer in a powder form (yield: 9 g). A portion of the $St_{19}$-co-$tBMA_4$ powder was dissolved in THF and passed through the GPC column. The GPC trace obtained for the macroinitiator is shown in FIG. 1. The measured molecular weight of the hydrophobic, poly(styrene-co-tert-butyl methacrylate) segment=2,500 g/mol which is equivalent to an average degree of polymerization (DP) of about 19 and 4 for styrene and tert-butyl methacrylate respectively, and the PDI was measured to be 1.69.

Figure 2:
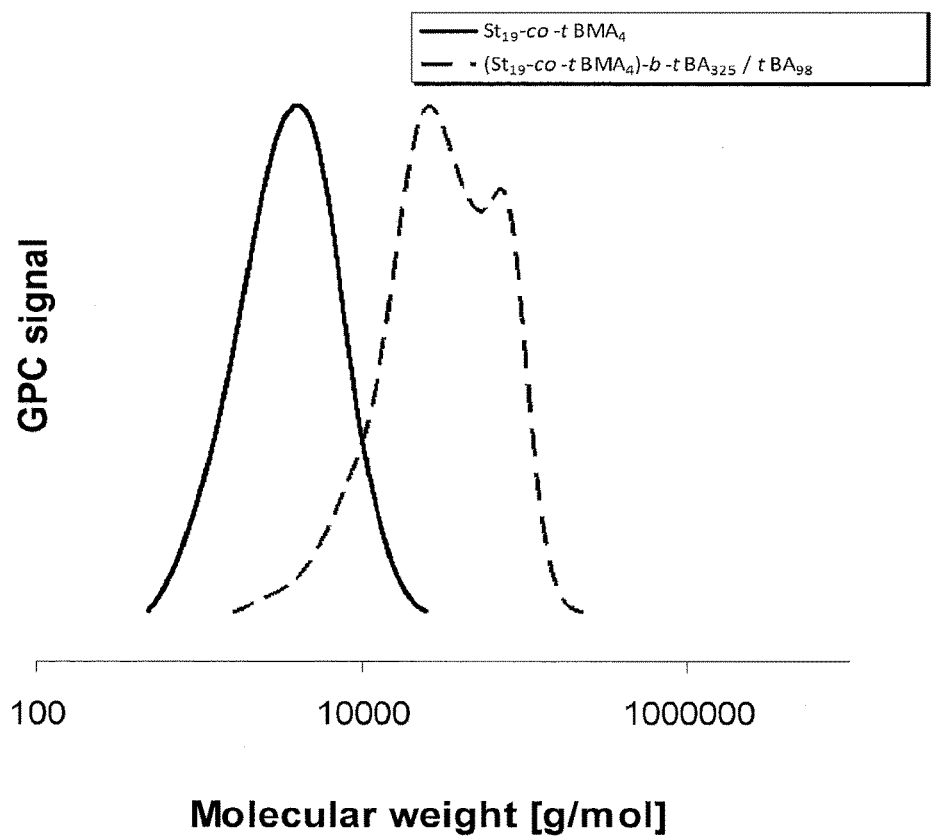
FIG. 2. GPC curve of the $St_{19}$-co-$tBMA_4)$ macroinitiator and the mixture of formed block copolymer arms $(St_{19}$-co-$tBMA_4)$-b-$tBA_{325}$ and homopolymer arms $tBA_{98}$ in step 2 of the synthesis of an exemplary $((St_{19}$-co-$MAA_4)$-b-$AA_{325}$/$AA_{98})$ star macromolecule.

Step 2: One-Pot Synthesis of Poly(Styrene-co-Tert-Butyl Methacrylate)-b-Poly(Tert-Butyl Acrylate) and Poly(Tert-Butyl Acrylate) Arms The following components were introduced into the 1-L reaction vessel: 300 mL of tBA, 6.6 g of $St_{19}$-co-$tBMA_4$ from Example 2 in Step 1, 29.3 mg of $CuBr_2$, 0.17 mL Me6TREN and 150 mL of anisole (corresponding molar ratio: tBA/P($St_{19}$-co-$tBMA_4$) (from Example 2, Step 1)/$CuBr_2$/Me6TREN=160/0.2/0.01/0.05), at T=65° C. Polymerization was started by continuous feeding solution of V-70 (101 mg) in acetone (30 mL) to the reaction mixture with the rate of 4.5 mL/h. This rate was adjusted during the polymerization process in order to control the kinetics and exothermic effects of the reaction. About 3.0 hours after the reaction was initiated, the conversion of the tBA reached about 21% and a portion of the ($St_{19}$-co-$tBMA_4$)-b-tBA was recovered and measured by GPC with the following results: $M_n$=31,700 g/mol, PDI=1.61. It was determined that the following ($St_{19}$-co-$tBMA_4$)-b-$tBA_{228}$ copolymeric block was obtained. The feeding of V-70 was stopped and then, 1.54 mL of EBiB (0.8 molar ratio amount relative to the initially introduced components) was injected into the polymerization mixture. The reaction was continued by feeding V-70 and stopped after about 6.9 h by stopping feeding V-70, stopping heating and opening reactor to air. Based on the GPC measured values the final molecular weight of poly(tert-butyl acrylate) segment in the block copolymer ($St_{19}$-co-$tBMA_4$)-b-$tBA_{325}$ was 44,300 g/mol and the molecular weight of poly(tert-butyl acrylate) initiated from EBiB was 12,600 g/mol which is equivalent to a DP=98. The overall molecular weight of mixture of arms resulted in $M_n$=20,100 g/mol and PDI=1.97. The GPC curves of the macroinitiator $St_{19}$-co-$tBMA_4$ and the mixture of formed block copolymer arms ($St_{19}$-co-$tBMA_4$)-b-$tBA_{325}$ and poly(tert-butyl acrylate) arms $tBA_{98}$ are shown in FIG. 2. The signal from block copolymer is overlapping with signal from homopolymer arms but this result clearly indicates that a clean chain extension from $St_{19}$-co-$tBMA_4$ macroinitiator had occurred.

Step 3: One-Pot Synthesis of the (($St_{19}$-co-$tBMA_4$)-b-$tBA_{325}$/$tBA_{98}$) Star Macromolecule.

Figure 3:
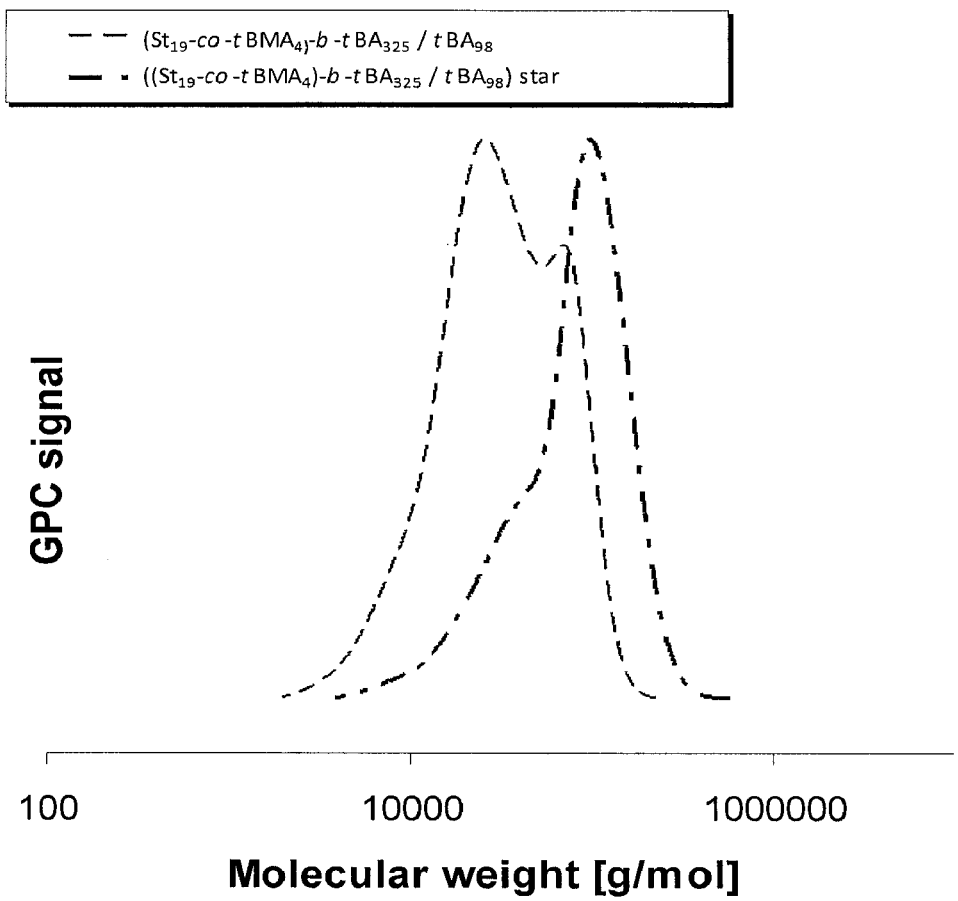
FIG. 3. GPC curves before and after the crosslinking of mixture of block copolymer arms and homopolymeric arms $(St_{19}$-co-$tBMA_4)$-b-$tBA_{325}$/$tBA_{98}$ in step 3 of the synthesis of an exemplary $((St_{19}$-co-$MAA_4)$-b-$AA_{325}$/$AA_{98})$ star macromolecule.

A mikto multi-arm star macromolecule was prepared by continuing a reaction in Step 2 in Example 2 and performing a crosslinking of the block copolymer and homopolymer arms. The synthesis started with the polymer solutions obtained above (Example 2, Step 2). To this 1-L reactor vessel were added following components: 450 mL of anisole, 24 mg of $CuBr_2$, 198 mg of TPMA, 15 mL of DMF, 35 mL of DVB and 0.5 mL of $Sn(EH)_2$ (corresponds to molar ratio: DVB/[($St_{19}$-co-$tBMA_4$)-b-$tBA_{325}$/$tBA_{98}$] (from Example 2, Step 2)/$CuBr_2$/TPMA/$Sn(EH)_2$=18/1/0.008/0.05/0.1), T=95° C., t=19.5 h. The GPC curves and results of the star forming reaction are provided in FIG. 3. It can be seen that a multi-arm star macromolecule with a crosslinked core was formed. The GPC apparent molecular weight of the star was 51,200 with a PDI 1.78, which would indicate an average of three arms but this is an underestimate of the actual number of arms since the star molecule is a compact molecule. Indeed in this situation, the number of arms in the star molecule is close to 30. The number of arms can be modified by conducting the core forming reaction with a different ratio of crosslinking agent to arm precursor or by running the reaction with a different concentration of reagents.

Step 4: Deprotection of the (($St_{19}$-co-$tBMA_4$)-b-$tBA_{325}$/$tBA_{98}$) to (($St_{19}$-co-$MAA_4$)-b-$AA_{325}$/$AA_{98}$) Star Deprotection of the (($St_{19}$-co-$tBMA_4$)-b-$tBA_{325}$/$tBA_{98}$) star macromolecule to (($St_{19}$-co-$MAA_4$)-b-$AA_{325}$/$AA_{98}$) star block copolymer to provide water soluble poly(acrylic acid) segments in the mikto multi-arm star macromolecule. The ($St_{19}$-co-$tBMA_4$)-b-$tBA_{325}$/$tBA_{98}$ arms of the miktoarm star macromolecule were transformed to (($St_{19}$-co-$MAA_4$)-b-$AA_{325}$/$AA_{98}$ arms with the following procedure. The 120 mL of the polymer solution from the Example 2, Step 3 was transferred to the 250 mL reaction vessel. To this vessel 33.6 mL of formic acid and 3 mL of concentrated HCl were added to deprotect tBu groups. The reaction was performed at 75° C. for 18.0 h. Then solid polymer (formed during the reaction) was decanted and washed 3 times with acetonitrile. Polymer was dried in the vacuum oven at 50° C. for 24 h and next solubilized in THF and precipitated into acetone/acetonitrile mixture. The star macromolecule was dried in vacuum oven for 2 days at 50° C. (yield 20 g). Based on the gravimetrical analysis full conversion of tBA and tBMA to AA and MAA respectively was achieved.

Example 3: Synthesis of ($MMA_{15}$-b-$AA_{367}$/$AA_{82}$) Star

The simple "one-pot" procedure was developed for the preparation of a poly(acrylic acid) based miktoarm star macromolecule similar to that described in Scheme 2. The miktoarm star macromolecule with $MMA_{15}$-b-$AA_{367}$ and $AA_{82}$ arms (molar ratio of arms: 1/4) was prepared as follows.

Step 1: Synthesis of a Poly(Methyl Methacrylate) Macroinitiator ($MMA_{15}$) Having 15 DP (#08-007-33)

$MMA_{15}$ macroinitiator was synthesized by using Atom Transfer Radical Polymerization (ATRP). The molar ratio of reagents is: MMA/DEBMM/CuBr/$CuBr_2$/bpy=22/1/0.2/0.02/0.44 in DMF (50% v/v). 150 mL of MMA, 12 mL of DEBMM, 0.31 g of $CuBr_2$, 4.37 g of bpy and 150 mL of DMF were added to a 500 mL round bottom flask. The flask was sealed with a rubber septum and the solution was purged with nitrogen for 1 hour. Under the nitrogen flow, the flask was opened and 1.8 g of CuBr was quickly added. Then the flask was sealed and heated up to 50° C. 2.5 hours later, the reaction was stopped. The polymer was precipitated to methanol and the molecular weight was measured by GPC. The Mn is 1525 g/mol and PDI is 1.06. Yield: 80 grams of polymer was obtained after purification.

Steps 2-4: Synthesis of $MMA_{15}$-b-$tBA_{367}$/$tBA_{82}$ Arms, Crosslinking and Deprotection to Produce ($MMA_{15}$-b-$AA_{367}$/$AA_{82}$) Star Copolymer in "One Pot" (#12-027-12).

The synthesis includes 3 steps: the synthesis of arms, the cross-linking of arms and the deprotection of star polymers. For the synthesis of arms, the molar ratio of reagents is: tBA/$MMA_{15}$ (from Example 3, Step 1)/EBiB/$CuBr_2$/$Me_6TREN$/V-70=160/0.2/0.8/0.01/0.05/0.025. Anisole was used as solvent (39% v/v). The synthesis of arms was conducted as follows. 18 g of $MMA_{15}$, 1400 mL of tBA and 900 mL of anisole were add to a 4 L Ace Glass reactor. In a 100 mL beaker 133.6 mg $CuBr_2$ was dissolved in 48 mL DMF with 0.8 mL $Me_6TREN$. Then $CuBr_2$/$Me_6TREN$ in DMF was added to the 4 L reactor. The polymer solution was stirred for 10 min in order to dissolve $MMA_{15}$ macroinitiator. The 4 L Ace Glass reactor was closed and the polymer solution was purged with nitrogen for 1.0 h. In a 50 mL flask, 460.4 mg of V-70 was dissolved in 30 mL of acetone and purged with $N_2$. The solution of V-70 in acetone was then transferred into 60 mL syringe under $N_2$. The 4 L Ace Glass reactor was heated up to 65° C. and V-70 in acetone was fed at the rate of 5 mL/h. This rate was adjusted during the polymerization process in order to control the kinetics and exothermic effects of the reaction. Sample was taken for analysis and as the monomer conversion reached 36%, 7.0 mL of EBiB was injected. Then V-70 was fed at 5 mL/h rate. 2 hours later, the monomer conversion reached 87%, and the synthesis of arms was finished. The cross-linking of arms was continued in the same reactor with the molar ratio as: [$MMA_{15}$-b-$tBA_{367}$/$tBA_{82}$]/DVB/$CuBr_2$/TPMA/Sn($EH_2$) =1/25/0.02/0.2/0.2. 70 mL of $CuBr_2$/TPMA in DMF solution, 130 mL of DVB and 1600 mL of anisole were added to the reactor and purged with $N_2$ for 1 hour. Then the polymer solution was heated up to 95° C. After 19 hours, the conversion of DVB reached 68%, the heating was stopped and the reactor was opened to air. The molecular weight of ($MMA_{15}$-b-$tBA_{367}$/$tBA_{82}$) star molecule was determined by GPC. Mn=50649 g/mol, PDI=2.27. The deprotection was conducted by adding 700 mL of formic acid and 0.8 mL sulfuric acid to the reactor. The solutions was heated up to 75° C. and stirred for 15 hours. Then the liquid was decanted and the solid polymer was washed with acetonitrile and acetone for 3 times in the reactor. The solid polymer was recovered and dried in vacuum oven at 40° C. for 1 day. Yield: the mass of ($MMA_{15}$-b-$AA_{367}$/$AA_{82}$) star was 590 grams.

Example 4: Synthesis of ($MMA_{22}$-b-$AA_{762}$/$AA_{59}$) Star

The simple "one-pot" procedure was used for the preparation of a poly(acrylic acid) based miktoarm star macromolecule similar to that described in Scheme 2. The miktoarm star macromolecule with $MMA_{22}$-b-$AA_{762}$ and $AA_{59}$ arms (molar ratio of arms: 1/4) was prepared as follows.

Step 1: Synthesis of a Poly(Methyl Methacrylate) Macroinitiator ($MMA_{22}$) Having 22 DP (#12-027-56)

$MMA_{22}$ macroinitiator was synthesized by using Activators ReGenerated by Electron Transfer (ARGET) ATRP. The molar ratio of reagents is: MMA/DEBMM/$CuBr_2$/TPMA/Sn($EH_2$)=50/1/0.005/0.0175/0.05 in anisole (20% v/v). In a 250 mL round bottom flask, 60 mL of MMA and 2.14 mL of DEBMM were added to 12 mL of anisole. 1.5 mL of pre-mixed $CuBr_2$/TPMA in DMF solution was added to the flask. The flask was sealed with a rubber septum and the solution was purged with nitrogen for 1.0 hour. The flask was then placed in an oil bath set at 75° C. 0.193 mL of Sn($EH_2$) was injected and the reaction started. Samples were taken to monitor the monomer conversion. After 23 hours, the flask was opened to air and the reaction was stopped. The polymer was purified by precipitation into methanol. The molecular weight measured by GPC is 2200 g/mol and PDI is 1.16. Yield: 15 grams of polymer was obtained after purification.

Steps 2-4: Synthesis of $MMA_{22}$-b-$tBA_{762}$/$tBA_{59}$ Arms, Crosslinking and Deprotection to Produce ($MMA_{22}$-b-$AA_{762}$/$AA_{59}$) Star Copolymer in "One Pot" (#12-022-117).

The synthesis includes 3 steps: the synthesis of arms, the cross-linking of arms and the deprotection of star polymers. For the synthesis of arms, the molar ratio of reagents is: tBA/$MMA_{22}$ (from Example 4, Step 1)/EBiB/$CuBr_2$/$Me_6TREN$/V-70=160/0.2/0.8/0.01/0.05/0.025. Anisole (33%, v/v) was used as solvent. The synthesis of arms was conducted as follows. In a 22 mL vial 19.05 mg $CuBr_2$ was dissolved in 6.6 mL DMF with 0.1 mL $Me_6TREN$ to make a stock solution. A 250 mL round bottom flask was charged with 0.78 g of $MMA_{22}$, 40 mL of tBA and 20 mL of anisole. 1.32 mL of $CuBr_2$/$Me_6TREN$ in DMF solution was added to the flask. The polymer solution was stirred for 10 min in order to dissolve the macroinitiator. The flask was sealed with a rubber septum and the solution was purged with nitrogen for 40 minutes. In a 22 mL vial 13.2 mg of V-70 was dissolved in 1 mL of acetone and purged with $N_2$ and then the solution of V-70 in acetone was transferred into 1 mL syringe under $N_2$. The flask was heated up to 65° C. 0.1 mL of V-70 in acetone was injected every 20 minutes. Sample was taken for analysis and as the conversion of monomer reached 43%, 0.2 mL of EBiB was injected. After that, 0.1 mL of V-70 in acetone was injected every 30 minutes. As the monomer conversion reached 80%, the flask was open to air. The cross-linking of arms was continued in the same flask with the molar ratio of reagents as: [$MMA_{22}$-b-$tBA_{762}$/$tBA_{59}$]/DVB/$CuBr_2$/TPMA/Sn($EH_2$)=1/25/0.02/0.2/0.2 in anisole. 2.0 mL of $CuBr_2$/TPMA in DMF solution, 4.28 mL DVB and 28 mL anisole were added to the flask. The polymer solution was purged with $N_2$ for 1 h. Then the flask was heated up to 95° C. 0.08 mL Sn($EH_2$) was injected, the reaction started. Sample was taken for analysis and 16 hours later as the conversion of DVB reached 80%, the heating was stopped and the flask was opened to air. Molecular weight of (MMA$_{22}$-b-tBA$_{762}$/tBA$_{59}$) star molecule was determined by GPC. Mn=129660 g/mol, PDI=2.36. The deprotection was then conducted by adding 15 mL of formic acid and 0.05 mL sulfuric acid to the flask. The reaction mixture was heated up to 75° C. After 6 hours, the reaction was finished. The liquid was decanted and the solid polymer was washed with acetonitrile and acetone in the flask for 3 times. The solid polymer was recovered from the flask and dried in vacuum oven at 40° C. for 1 day. Yield: the mass of (MMA$_{22}$-b-AA$_{762}$/AA$_{59}$) star was 16 grams.

Example 5: Synthesis of (MMA$_{15}$-b-AA$_{617}$/St$_{16}$-b-AA$_{617}$/AA$_{86}$) Star (Molar Ratio of Arms: 0.7/0.3/4) (Referenced Herein as (MMA$_{15}$-b-AA$_{617}$/St$_{16}$-b-AA$_{617}$/AA$_{86}$)(7/3) Star)

The simple "one-pot" procedure was used for the preparation of a poly(acrylic acid) based miktoarm star macromolecule similar to that described in Scheme 2. The miktoarm star macromolecule with MMA$_{15}$-b-AA$_{617}$, St$_{16}$-b-AA$_{617}$ and AA$_{86}$ arms (molar ratio of arms: 0.7/0.3/4) was prepared as follows.

Step 1: Synthesis of a Polystyrene Macroinitiator (St$_{16}$) Having 16 DP (#12-023-171-2)

St$_{16}$ macroinitiator was synthesized by using ATRP. The molar ratio of reagents is: St/EBiB/CuBr$_2$/Me$_6$TREN/AIBN=20/1/0.002/0.01/0.05. Anisole (20% v/v) was used as solvent. The reaction was conducted as follows. A 1 L Ace Glass reactor was charged with 800 mL of styrene, 51.2 mL of EBiB and 140 mL of anisole. Then 27.5 mL of CuBr$_2$/Me$_6$TREN in DMF was added to the reactor. The reactor was closed and the solution was purged with nitrogen for 1.0 hour. In a 100 mL flask 2.87 g of AIBN was dissolved in 40 mL of acetone and purged with N$_2$. The solution of AIBN in acetone was transferred into 60 mL syringe under N$_2$. The 1 L reactor was heated up to 70° C. AIBN in acetone was fed at the rate of 8 mL/h. After 1 hour, 12.5 mL of CuBr$_2$/Me$_6$TREN in DMF was added to the 1 L reactor. 4.8 hours later, feeding of AIBN was stopped and the reactor was opened. The polymer solution was precipitated into methanol (1/10 v/v). The solid polymer was recovered and dried in vacuum oven at 40° C. for 1 day. The molecular weight of St$_{16}$ is 1650 g/mol and PDI=1.17. Yield: 500 grams of polymer was obtained after purification.

Steps 2-4: Synthesis of MMA$_{15}$-b-tBA$_{617}$/St$_{16}$-b-tBA$_{617}$/tBA$_{86}$ Arms, Crosslinking and Deprotection to Produce (MMA$_{15}$-b-AA$_{617}$/St$_{16}$-b-AA$_{617}$/AA$_{86}$) Star Copolymer in "One Pot" (#12-027-37).

The synthesis includes 3 steps: the synthesis of arms, the cross-linking of arms and the deprotection of star polymers. For the synthesis of arms, the molar ratio of reagents is: tBA/MMA$_{15}$ (from Example 3, Step 1)/St$_{16}$ (from Example 5, Step 1)/EBiB/CuBr$_2$/Me6TREN/V-70=160/0.14/0.06/0.8/0.01/0.05/0.025. Anisole (33%, v/v) was used as solvent. The synthesis of arms was conducted as follows. A 250 mL round bottom flask was charged with 0.37 g of MMA$_{15}$, 0.16 g of St$_{16}$, 40 mL of tBA and 12 mL of anisole. 1.32 mL of CuBr$_2$/Me$_6$TREN in DMF solution was added to the flask. The polymer solution was stirred for 10 min in order to dissolve macroinitiators. The flask was sealed with a rubber septum and the solution was purged with nitrogen for 40 minutes. In a 22 mL vial 13.2 mg of V-70 was dissolved in 1 mL of acetone and purged with N$_2$. The solution of V-70 in acetone was transferred into 1 mL syringe under N$_2$. The flask was heated up to 65° C. 0.1 mL of V-70 in acetone was injected every 20 minutes. Sample was taken for analysis and as the conversion of monomer reached 60%, 0.2 mL of EBiB was injected. Then 0.1 mL of V-70 in acetone was injected every 30 minutes. As the monomer conversion reached 84%, the flask was opened to air. The cross-linking of arms was continued in the same flask with the molar ratio of reagents as: [MMA$_{15}$-b-tBA$_{617}$/St$_{16}$-b-tBA$_{617}$/tBA$_{86}$]/DVB/CuBr$_2$/TPMA/Sn(EH$_2$)=1/25/0.02/0.2/0.2 in anisole. In a 22 mL vial 3.74 mg CuBr$_2$ was dissolved in 2.0 mL DMF with 30.0 mg TPMA. Then the DMF solution of CuBr$_2$/TPMA, 4.28 mL DVB and 28 mL anisole were added to the flask. The polymer solution was purged with N$_2$ for 1 hour. The flask was heated up to 95° C. 0.08 mL Sn(EH)$_2$ was injected, the reaction started. 18 hours later, the conversion of DVB reached 73%, the heating was stopped and the flask was opened to air. Molecular weight of (MMA$_{15}$-b-tBA$_{617}$/St$_{16}$-b-tBA$_{617}$/tBA$_{86}$) star molecule was determined by GPC. Mn=95274 g/mol, PDI=2.59. The deprotection was conducted by adding 15 mL of formic acid and 0.05 mL sulfuric acid to the flask. The reaction mixture was heated to 75° C. and stirred for 6 hours. Then the liquid was decanted and the solid polymer was washed with acetonitrile and acetone for 3 times in the flask. The polymer was recovered and dried in vacuum oven at 40° C. for 1 day. Yield: the mass of (MMA$_{15}$-b-AA$_{617}$/St$_{16}$-b-AA$_{617}$/AA$_{86}$) star was 17 grams.

Example 6: Synthesis of (MMA$_{15}$-b-AA$_{676}$/St$_{16}$-b-AA$_{676}$/AA$_{58}$) Star (Molar Ratio of Arms: 0.9/0.1/4) (Referenced Herein as (MMA$_{15}$-b-AA$_{676}$/St$_{16}$-b-AA$_{676}$/AA$_{58}$) (9/1) Star)

The simple "one-pot" procedure was used for the preparation of a poly(acrylic acid) based miktoarm star macromolecule similar to that described in Scheme 2. The miktoarm star macromolecule with MMA$_{15}$-b-AA$_{676}$, St$_{16}$-b-AA$_{676}$ and AA$_{58}$ arms (molar ratio of arms: 0.9/0.1/4) was prepared as follows.

Step 1: Synthesis of a Polystyrene Macroinitiator (St$_{16}$) Having 16 DP and Poly(Methyl Methacrylate) Macroinitiator (MMA$_{15}$) Having 15 DP St$_{16}$ and MMA$_{22}$ macroinitiators were synthesized as described in Example 3, Step 1 and Example 5, Step 1 respectively.

Steps 2-4: Synthesis of MMA$_{15}$-b-tBA$_{676}$/St$_{16}$-b-tBA$_{676}$/tBA$_{58}$ Arms, Crosslinking and Deprotection to Produce (MMA$_{15}$-b-AA$_{676}$/St$_{16}$-b-AA$_{676}$/AA$_{58}$) Star Copolymer in "One Pot" (#12-022-112).

The synthesis includes 3 steps: the synthesis of arms, the cross-linking of arms and the deprotection of star polymers. For the synthesis of arms, the molar ratio of reagents is: tBA/MMA$_{15}$ (from Example 3, Step 1)/St$_{16}$ (from Example 5, Step 1)/EBiB/CuBr$_2$/Me6TREN/V-70=160/0.18/0.02/0.8/0.01/0.05/0.025. Anisole (33%, v/v) was used as solvent. The synthesis of arms was conducted as follows. In a 22 mL vial 19.05 mg CuBr$_2$ was dissolved in 6.6 mL DMF with 0.1 mL Me$_6$TREN to make a stock solution. A 250 mL round bottom flask was charged with 0.477 g of MMA$_{15}$, 0.053 g of $St_{16}$, 40 mL of $_tBA$ and 20 mL of anisole. 1.32 mL of $CuBr_2/Me_6TREN$ in DMF solution was added to the flask. The polymer solution was stirred for 10 min in order to dissolve macroinitiators. The flask was sealed with a rubber septum and the solution was purged with nitrogen for 40 minutes. In a 22 mL vial 13.2 mg of V-70 was dissolved in 1 mL of acetone and purged with $N_2$. The solution of V-70 in acetone was transferred into 1 mL syringe under $N_2$. The flask was heated up to 65° C. 0.1 mL of V-70 in acetone was injected every 20 minutes. Sample was taken for analysis and as the conversion of monomer reached 51%, 0.2 mL of EBiB was injected. Then 0.1 mL of V-70 in acetone was injected every 30 minutes. As the monomer conversion reached 87%, the flask was open to air. The cross-linking of arms was continued in the same flask with the molar ratio of reagents as: $[MMA_{15}\text{-b-}tBA_{676}/St_{16}\text{-b-}tBA_{676}/tBA_{58}]/DVB/CuBr_2/TPMA/Sn(EH_2)=1:25/0.02/0.2/0.2$ in anisole. In a 22 mL vial 3.74 mg $CuBr_2$ was dissolved in 2.0 mL DMF with 30.0 mg TPMA. $CuBr_2/TPMA$ in DMF, 4.28 mL DVB and 28 mL anisole were added to the flask. The polymer solution was purged with $N_2$ for 1 hour and then heated up to 95° C. 0.08 mL $Sn(EH)_2$ was injected, the reaction started. After 17 hours, the conversion of DVB reached 64%, the heating was stopped and the flask was opened to air. Molecular weight of $(PMMA_{15}\text{-b-}PtBA/PSt_{16}\text{-b-}PtBA/PtBA)$ star molecule was determined by GPC. Mn=87575 g/mol, PDI=2.36. The deprotection was conducted by adding 15 mL of formic acid and 0.05 mL sulfuric acid to the flask. The reaction mixture was heated up to 75° C. After 6 hours, the reaction finished. The liquid was decanted and the solid polymer was washed with acetonitrile and acetone for 3 times in the flask. The solid polymer was recovered and was dried in vacuum oven at 40° C. for 1 day. Yield: the mass of $(MMA_{15}\text{-b-}AA_{676}/St_{16}\text{-b-}AA_{676}/AA_{58})$ star was 16 grams.

Properties of Star Copolymers (Examples 7-12)

Example 7: Shear Thinning Properties of Star Macromolecules as Thickening Agents The thickening properties of the aqueous solutions of star macromolecules synthesized in Examples 1-6 as well as Carbopol were investigated. Overall, gels were prepared with different concentrations in order to match the same initial viscosities for all the measured samples. Gels were formed following the procedure: 400 mL of deionized (DI) water was transferred to 600 mL beaker and beaker was assembled below overhead stirrer IKA with mount stirring shaft with 3-blade marine impeller. Water was stirred at 600 rpm to generate vortex and a solid polymer (e.g., 1.2 g) was slowly sprinkled. Water solution was heated to 30° C. and next solid NaOH (e.g. 0.32 g) was added. Stirring rate was increased to 800 rpm and next to 1600 rpm. Water solution was stirred for 15-20 min until temperature reached 80-90° C. The beaker with a gel was then assembled below Silverson homogenizer with mount Square Hole workhead and Axial Flow workhead. The stirring speed was gradually increased to 4800±200 rpm and mixed for 35 min until thick homogeneous gel was obtained. A pH of the resulting gel was analyzed with pH meter and adjusted to pH=7.2±0.3.

Figure 4:
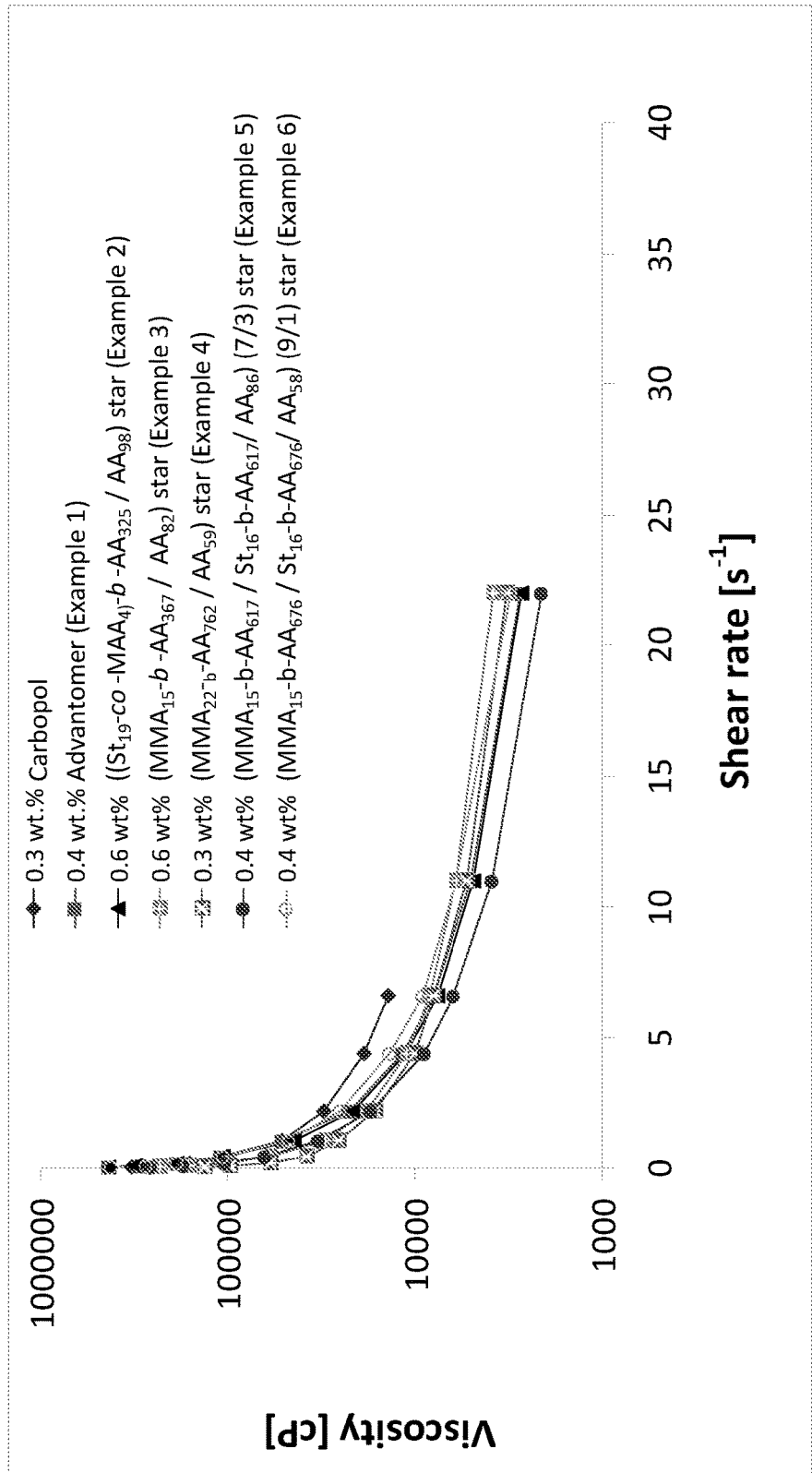
FIG. 4. Comparison of viscosity vs. shear rate of aqueous solution of seven different polymers: Carbopol, Advantomer (from Example 1), $((St_{19}$-co-$MAA_4)$-b-$AA_{325}$/$AA_{98})$ star (from Example 2), $(MMA_{15}$-b-$AA_{367}$/$AA_{82})$ star (from Example 3), $(MMA_{22}$-b-$AA_{762}$/$AA_{59})$ star (from Example 4), $(MMA_{15}$-b-$AA_{617}$/$St_{16}$-b-$AA_{617}$/$AA_{86})$ (7/3) star (from Example 5) and $(MMA_{15}$-b-$AA_{676}$/$St_{16}$-b-$AA_{676}$/$AA_{58})$ (9/1) star (from Example 6).

The rheological properties of the multi-arm stars and Carbopol were then investigated and compared. The viscosity of aqueous solutions of the star macromolecules vs. shear rate was measured using a Brookfield LVDV-E, Spindle #25 at T=25° C., and the results are presented in FIG. 4 and Table 2. It is clear that even very low concentrations of the star macromolecules in water (0.3-0.6 wt. %) results in the very high apparent viscosity of the solution (in the range of 230,000 to 430,000 centipoise (cP)) and all the samples have very strong shear thinning properties.

TABLE 2

| | Viscosity [cP] | | | | | | |
|---|---|---|---|---|---|---|---|
| | Car- | Product of Example | | | | | |
| Shear Rate [s−1] | bopol 0.3 wt. % | 1 0.4 wt. % | 2 0.6 wt. % | 3 0.6 wt. % | 4 0.3 wt. % | 5 0.4 wt. % | 6 0.4 wt. % |
| 0.066 | 326000 | 430000 | 435000 | 230000 | 133000 | 258000 | 418000 |
| 0.11 | 241900 | 303400 | 309000 | 162200 | 96000 | 170900 | 271700 |
| 0.22 | 159400 | 186200 | 187700 | 98400 | 59500 | 103700 | 187700 |
| 0.44 | 100200 | 108700 | 105800 | 59000 | 38200 | 63400 | 104900 |
| 1.1 | 50980 | 50780 | 43580 | 29950 | 25680 | 32830 | 46940 |
| 2.2 | 30580 | 22560 | 21360 | 18000 | 16370 | 17180 | 25100 |
| 4.4 | 18550 | 11660 | 11230 | 11110 | 10030 | 8950 | 13700 |
| 6.6 | 13900 | 7980 | 7550 | 8380 | 7970 | 6190 | 8990 |
| 11 | NA | 4973 | 4886 | 5971 | 5299 | 3878 | 5990 |
| 22 | NA | 2717 | 2688 | 3787 | 3235 | 2083 | 3058 |

Figure 5:
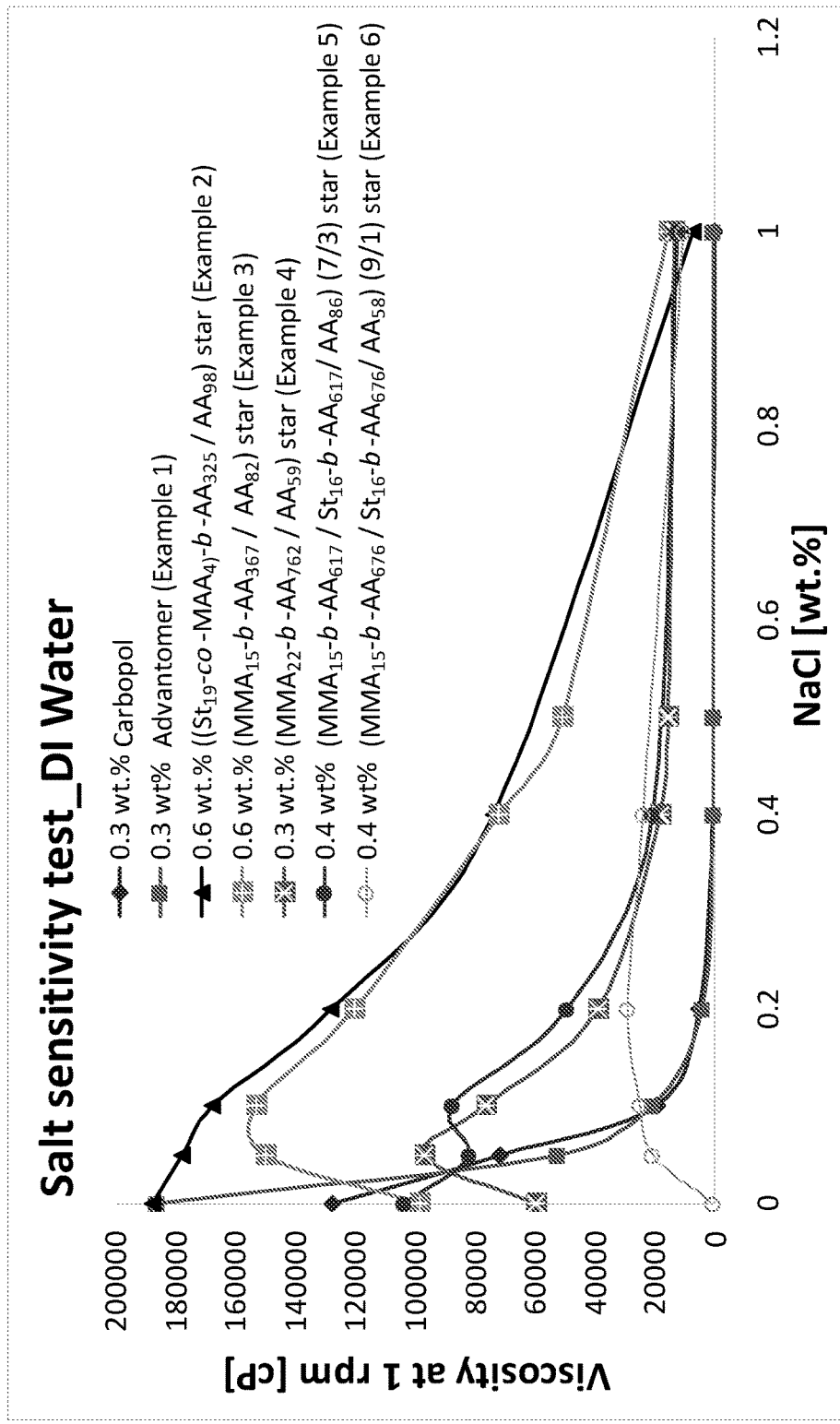
FIG. 5. Dependence of the viscosity on the salt concentration for aqueous solutions of six different polymers: Carbopol, Advantomer (from Example 1), $((St_{19}$-co-$MAA_4)$-b-$AA_{325}$/$AA_{98})$ star (from Example 2), $(MMA_{15}$-b-$AA_{367}$/$AA_{82})$ star (from Example 3), $(MMA_{22}$-b-$AA_{762}$/$AA_{59})$ star (from Example 4), and $(MMA_{15}$-b-$AA_{617}$/$St_{16}$-b-$AA_{617}$/$AA_{86})$ (7/3) star (from Example 5).

Example 8: Salt-Tolerance Test—Salt Tolerance of Star Macromolecules as Thickening Agents Six gels were formed following the procedure described in the Example 7. Gels were formed using star macromolecules from Examples 1-5 and Carbopol. Overall, gels were prepared with different concentrations in order to match the initial viscosities for the measured samples (e.g. Advantomer has similar initial viscosity as star from Example 2, and Carbopol has similar initial viscosity as stars from Examples 3-5). The following procedure was applied to investigate the viscosity of the aqueous gels in the presence of salt (sodium chloride, NaCl). A saturated NaCl water solution was prepared by dissolving NaCl in deionized water at 25° C. The concentration was 357 mg/mL (0.264 g NaCl/g solution). A series of salt containing gels were prepared by adding a certain amount of saturated NaCl solution to 20 g of gel in the vial (analytical balance with 0.1 mg accuracy was used during addition). The NaCl solution and the gel were mixed by shaking the vial vigorously for 5 minutes. The viscosity of the gels in different amounts of salt are presented in FIG. 5 (and Table 3). The viscosity of aqueous solutions was measured using a Brookfield LVDV-E, Spindle #25 (or #34) at 1 rpm and at T=25° C. Both Carbopol and Advantomer (Example 1) were much less tolerant to salt than the star macromolecules synthesized in Examples 2-5 which comprise MAA units in the hydrophobic segment (Example 2) or MMA units as hydrophobic segment (Examples 3-5).

TABLE 3

Viscosity at 1 rpm [cP]

Product of Example

| NaCl [wt. %] | Carbopol 0.3 wt. % | 1 0.3 wt. % | 2 0.6 wt. % | 3 0.6 wt. % | 4 0.3 wt. % | 5 0.4 wt. % | 6 0.3 wt. % |
|---|---|---|---|---|---|---|---|
| 0 | 127700 | 185800 | 187700 | 98400 | 59500 | 103700 | 420 |
| 0.05 | 71500 | 52300 | 177600 | 149800 | 97000 | 82100 | 20600 |
| 0.1 | 19200 | 20600 | 167500 | 153100 | 76300 | 87800 | 25000 |
| 0.2 | 5300 | 4300 | 128200 | 120000 | 38900 | 49000 | 28800 |
| 0.4 | 420 | 480 | 73400 | 72000 | 18200 | 20600 | 24000 |
| 0.5 | 320 | 360 |  | 50900 | 15400 |  |  |
| 1 | 240 | 280 | 7200 | 15400 | 13400 | 12500 | 10600 |

Next, seven gels were formed following the procedure described in the Example 7. Gels were formed using star macromolecules from Examples 1-6 and Carbopol. Overall, gels were prepared with exactly the same concentration of 0.4 wt. %. Next, following the procedure in Example 8, a saturated NaCl water solution was added to all gels. In each case the same amount was added and the resulting concentration of NaCl in each sample was 0.4 wt. %. The viscosity of aqueous solutions was measured as described in the Example 8. The results are presented in Table 4. Both Carbopol and Advantomer (from Example 1) were much less tolerant to salt than the star macromolecules synthesized in Examples 2-6 which comprise MAA units in the hydrophobic segment (Example 2) or MMA units as hydrophobic segment (Examples 3-6).

TABLE 4

| Product of Example | Name | Viscosity [cP] |
|---|---|---|
| — | Carbopol | 12000 |
| 1 | Advantomer | 15400 |
| 2 | ((St$_{19}$-co-MAA$_4$)-b-AA$_{325}$/AA$_{98}$) star | 13400 |
| 3 | (MMA$_{15}$-b-AA$_{367}$/AA$_{82}$) star | 51800 |
| 4 | (MMA$_{22}$-b-AA$_{762}$/AA$_{59}$) star | 45100 |
| 5 | (MMA$_{15}$-b-AA$_{617}$/St$_{16}$-b-AA$_{617}$/AA$_{86}$) (7/3) star | 20600 |
| 6 | (MMA$_{15}$-b-AA$_{676}$/St$_{16}$-b-AA$_{676}$/AA$_{58}$) (9/1) star | 53800 |

Figure 6:
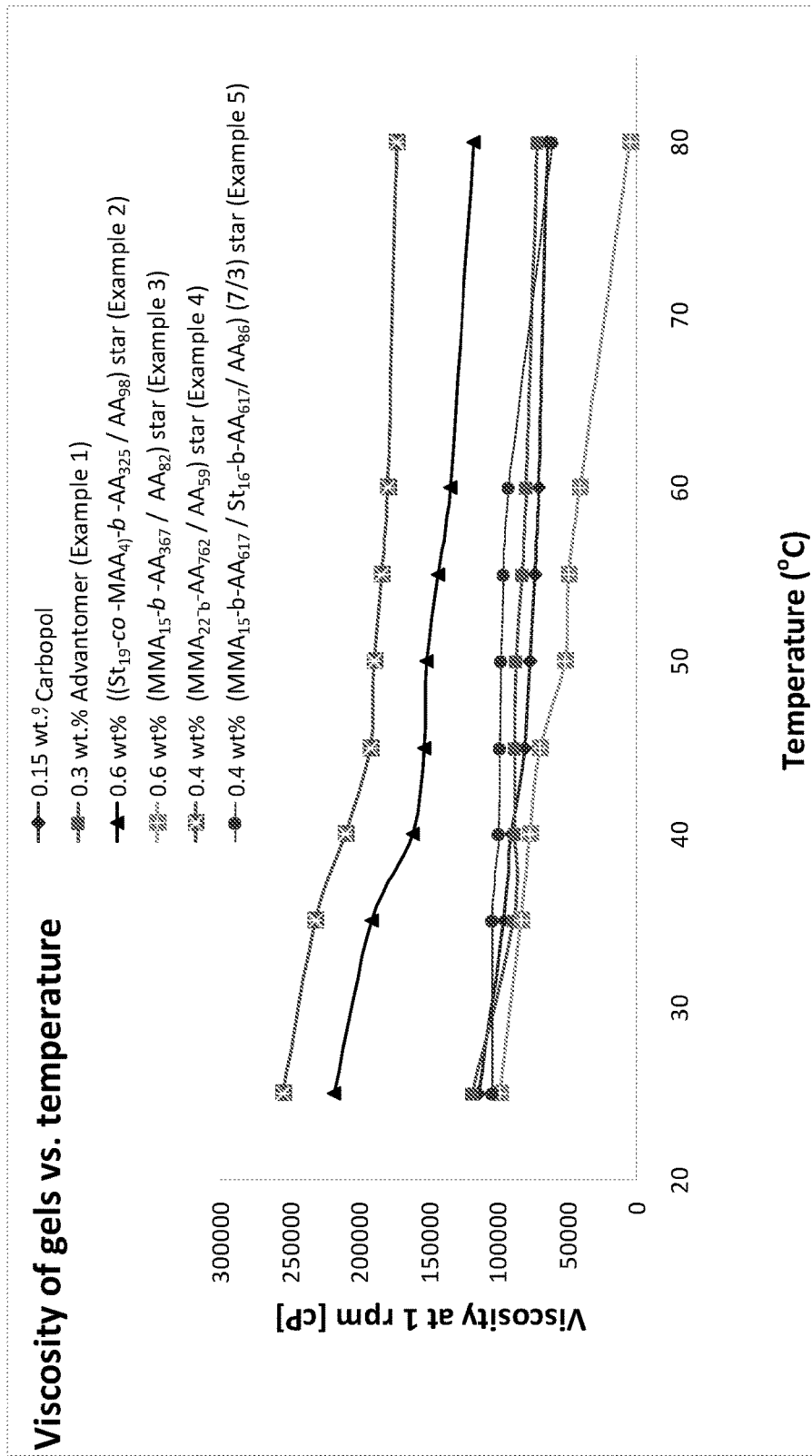
FIG. 6. Dependence of the viscosity on the temperature for aqueous solutions of six different polymers: Carbopol, Advantomer (from Example 1), $((St_{19}$-co-$MAA_4)$-b-$AA_{325}$/$AA_{98})$ star (from Example 2), $(MMA_{15}$-b-$AA_{367}$/$AA_{82})$ star (from Example 3), $(MMA_{22}$-b-$AA_{762}$/$AA_{59})$ star (from Example 4), and $(MMA_{15}$-b-$AA_{617}$/$St_{16}$-b-$AA_{617}$/$AA_{86})$ (7/3) star (from Example 5).

Example 9: Temperature Stability Test—Temperature Stability of Star Macromolecules as Thickening Agents Six gels were formed following the procedure described in the Example 7. Gels were formed using star macromolecules from Example 1-5 and Carbopol. Overall, gels were prepared with different concentrations in order to match the initial viscosities for the measured samples (e.g. Carbopol and Advantomer has similar initial viscosity as stars from Example 3 and 5, and star from Example 2 has similar initial viscosity as star from Examples 4). The viscosity of aqueous solutions was measured using a Brookfield LVDV-E, Spindle #25 (or #34) at 1 rpm and at different temperatures (the measurements were taken after the temperature of water bath and polymer solution was equilibrated for at least 15 min). The results are presented in FIG. 6 and Table 5.

TABLE 5

Viscosity at 1 rpm [cP]

Product of Example

| Temp. ° C. | Carbopol 0.3 wt. % | 1 0.3 wt. % | 2 0.6 wt. % | 3 0.6 wt. % | 4 0.3 wt. % | 5 0.4 wt. % |
|---|---|---|---|---|---|---|
| 25 | 113800 | 117600 | 217900 | 98400 | 255400 | 103700 |
| 35 | 95500 | 88600 | 190600 | 83000 | 231300 | 103200 |
| 40 | 89800 | 87800 | 161300 | 76800 | 210200 | 98900 |
| 45 | 80600 | 87800 | 153100 | 69600 | 192100 | 98400 |
| 50 | 76300 | 86400 | 151200 | 51400 | 189100 | 97400 |
| 55 | 73000 | 81600 | 143000 | 48500 | 183400 | 95200 |
| 60 | 70600 | 79700 | 133900 | 40800 | 179100 | 91500 |
| 80 | 63800 | 71500 | 117100 | 4800 | 172900 | 60000 |

Next, seven gels were formed following the procedure described in the Example 7. Gels were formed using star macromolecules from Examples 1-6 and Carbopol. Overall, gels were prepared with exactly the same concentration of 0.4 wt. %. Next, following the procedure in Example 8, a saturated NaCl water solution was added to all gels. In each case the same amount was added and the resulting concentration of NaCl in each sample was 0.4 wt. %. The viscosity of aqueous solutions was measured using a Brookfield LVDV-E, Spindle #25 (or #34) at 1 rpm and at three different temperatures: 25, 40 and 55° C. (the measurements were taken after the temperature of water bath and polymer solution was equilibrated for at least 15 min). The results are presented in Table 6, along with the calculated Temperature Stability Values according to the following equation:

$$[1-(\text{Dynamic Viscosity (at 55° C.)}-\text{Dynamic Viscosity (at 25° C.)})/\text{Dynamic Viscosity (at 25° C.)}] \times 100\%.$$

TABLE 6

| Product of Example | Viscosity at 25° C. [cP] | Viscosity at 40° C. [cP] | Viscosity at 55° C. [cP] | Temperature Stability Value |
|---|---|---|---|---|
| — | 12000 | 10100 | 8200 | 68.3% |
| 1 | 15400 | 10100 | 8600 | 55.8% |
| 2 | 13400 | 12000 | 10600 | 79.1% |
| 3 | 51800 | 44600 | 39800 | 76.8% |
| 4 | 45100 | 32200 | 29800 | 66.1% |
| 5 | 20600 | 20200 | 16300 | 79.1% |
| 6 | 53800 | 51600 | 42700 | 79.4% |

Example 10: Star Macromolecules as Thickening and Emulsifying Agents

Figure 7:
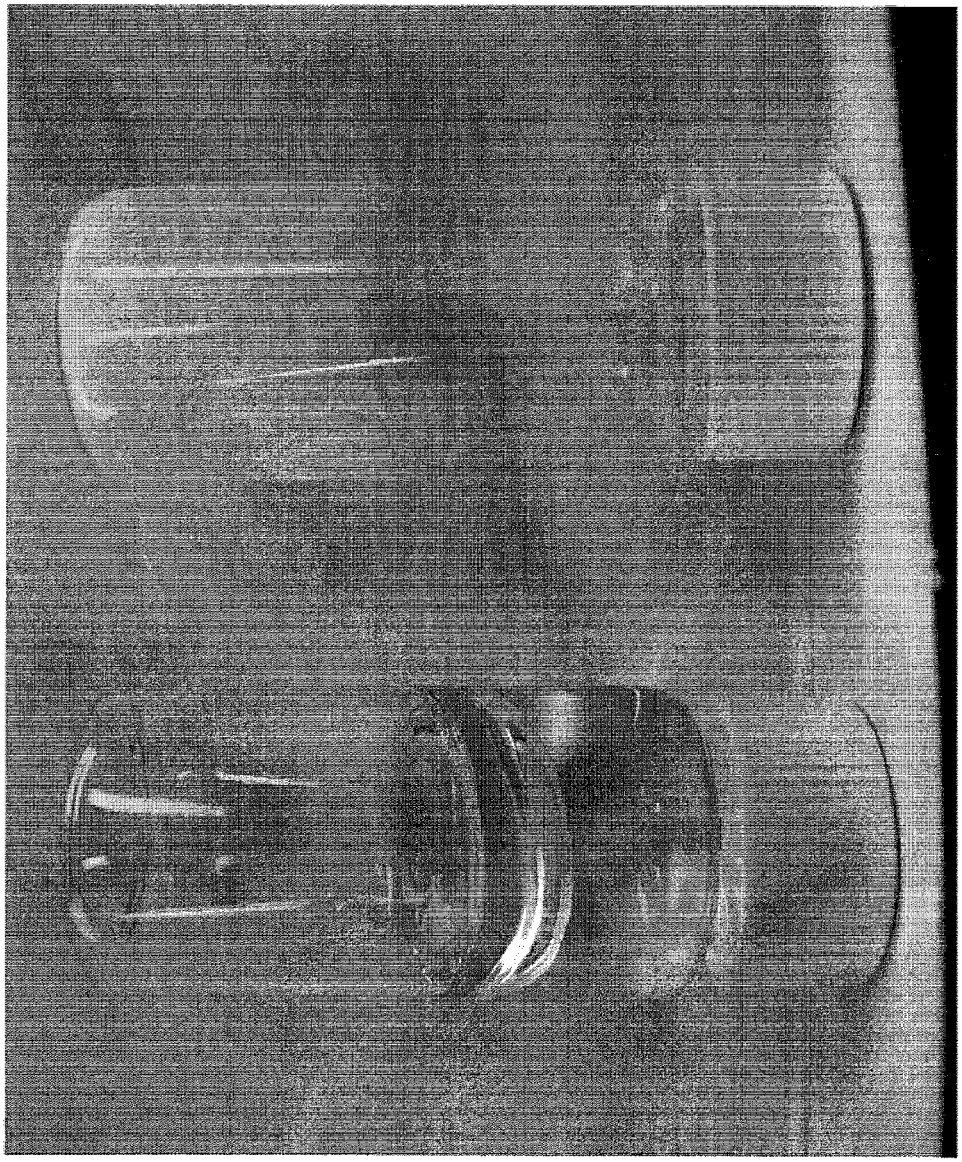
FIG. 7. An images demonstrating phase separated water and sunflower oil (left) and the emulsifying properties of $(MMA_{22}$-b-$AA_{762}$/$AA_{59})$ star (from Example 4) (right).

Due to its very well-defined structure, the star macromolecules from Example 1-6 may act not only as thickening agents but also as efficient emulsifying agents. FIG. 7 presents an image demonstrating the emulsifying properties of the star copolymer from Example 4. The photograph presents water with 30 vol. % of sunflower oil (left vial) and water with 30 vol. % of sunflower oil and 0.3 wt. % of thickening agent (right vial). After vigorous mixing (as described in the Emulsion Test Procedure), phase separation occurred in the left vial while it did not occur in the right vial. At the same time the thickening properties did not decrease. The photograph was taken 2 days after the emulsion was prepared.

Figure 8:
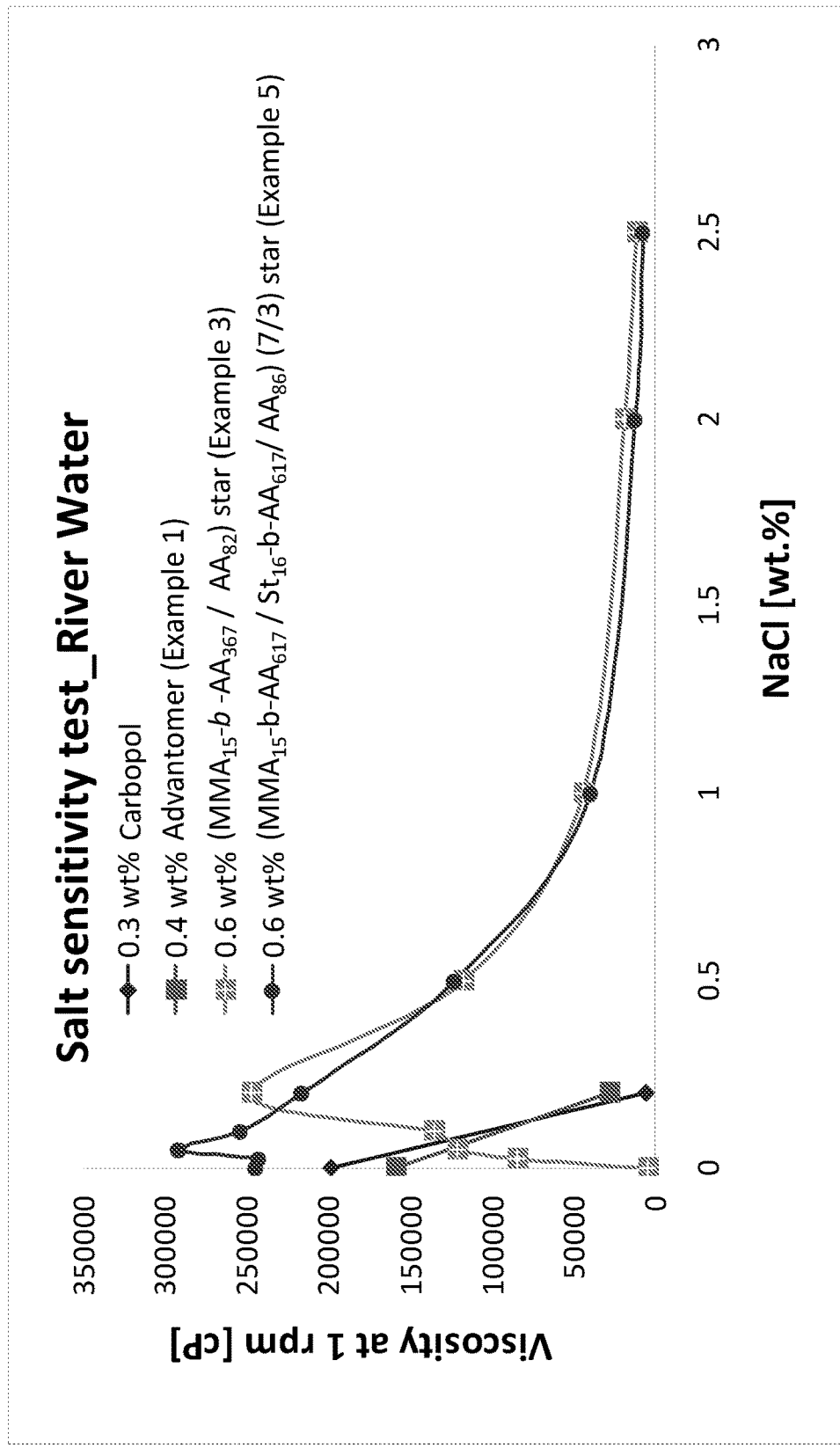
FIG. 8. Dependence of the viscosity on the salt concentration for aqueous solutions of four different polymers in river water: Carbopol, Advantomer (from Example 1), $(MMA_{15}$-b-$AA_{367}$/$AA_{82})$ star (from Example 3) and $(MMA_{15}$-b-$AA_{617}$/$St_{16}$-b-$AA_{617}$/$AA_{86})$ (7/3) star (from Example 5).

Example 11: Salt Tolerance of Star Macromolecules as Thickening Agents in River Water Four gels were formed following the procedure described in Example 7, but instead of deionized (DI) water, river water was used (water was taken from the Allegheny River near Pittsburgh). Gels were formed using star macromolecules from Examples 1, 3, 5, and Carbopol. Overall, gels were prepared with different concentrations in order to match the initial viscosities for the measured samples. Next, gels were mixed with different amounts of NaCl as described in the Example 8. FIG. 8 and Table 7 present the viscosity of gels with river water in the presents of different amounts of NaCl. The viscosity of aqueous solutions was measured using a Brookfield LVDV-E, Spindle #25 (or #34) at 1 rpm and at T=25° C.

TABLE 7

| | Viscosity at 1 rpm [cP] | | | |
|---|---|---|---|---|
| | | Product of Example | | |
| NaCl [wt. %] | Carbopol 0.3 wt. % | 1 0.4 wt. % | 3 0.6 wt. % | 5 0.4 wt. % |
| 0 | 198700 | 158900 | 4800 | 244800 |
| 0.025 | | | 84500 | 242900 |
| 0.05 | | | 121000 | 291800 |
| 0.1 | | | 135400 | 253900 |
| 0.2 | 5300 | 27800 | 247200 | 216400 |
| 0.4 | | | | 123400 |
| 0.5 | | | 117600 | |
| 1 | | | 44600 | 39400 |
| 2 | | | 18700 | 12500 |
| 2.5 | | | 11500 | 7500 |

Figure 9:
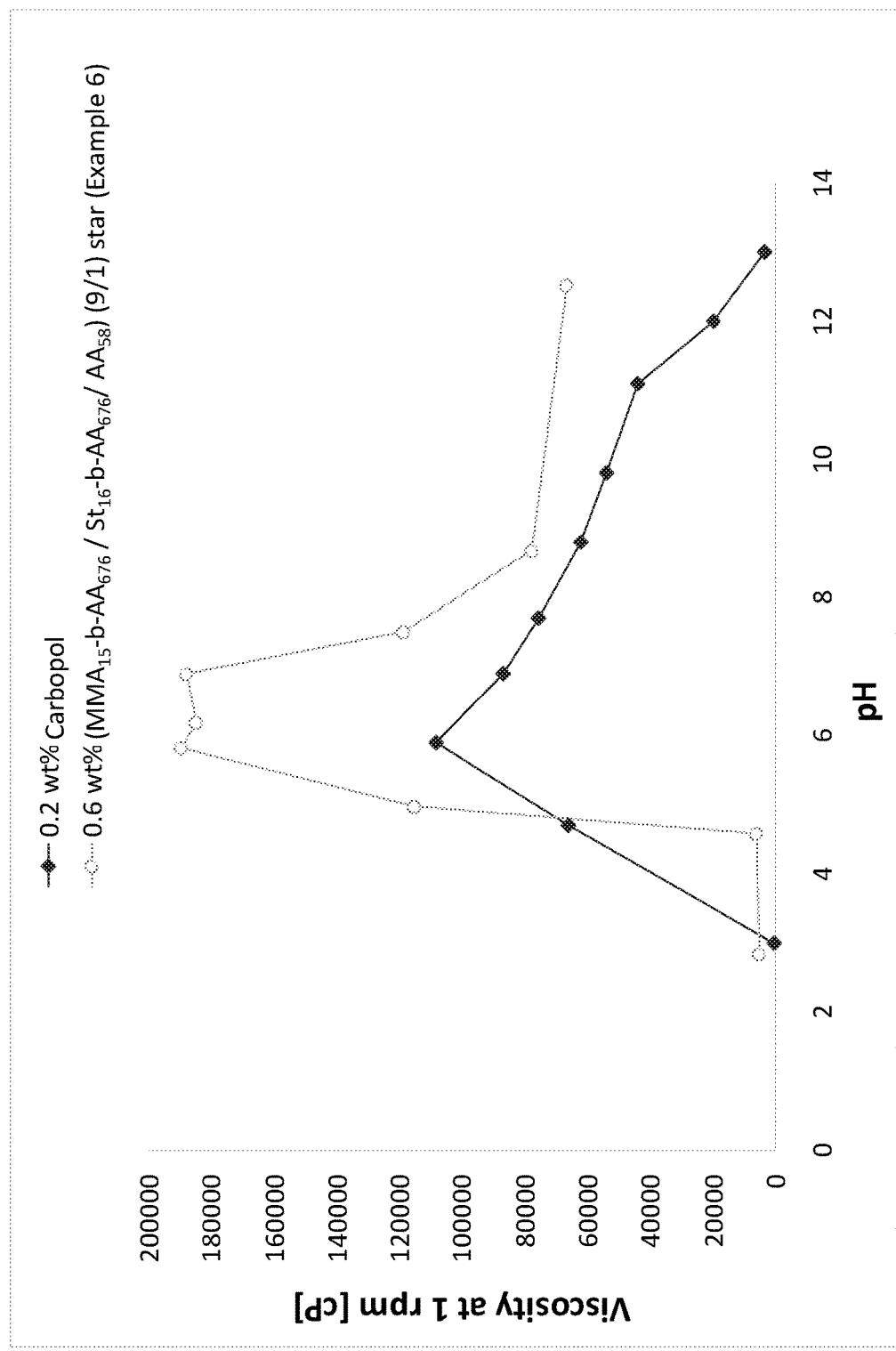
FIG. 9. Dependence of the viscosity on pH for aqueous solutions of two polymers: Carbopol and $(MMA_{15}$-b-$AA_{676}$/$St_{16}$-b-$AA_{676}$/$AA_{58})$ (9/1) star (from Example 6).

Example 12: pH Efficiency Range Test—Star Macromolecules as Thickening Agents at Different pH An aqueous gel composition at 0.6 wt. % was prepared (similarly to that described in the Sample Preparation Procedure) for the star macromolecule of Example 6, at a starting pH of around 5. A separate aqueous gel composition at 0.2 wt. % aqueous gel composition of Carbopol was prepared at a starting pH of around 3. Then, the viscosity of the samples was measured in accordance to the Dynamic Viscosity Test Procedure and the dynamic viscosity at 1 rpm was recorded. This procedure was repeated for differing pH values, adjusted by addition of sodium hydroxide (or hydrochloric acid). The results are presented in FIG. 9 and Table 8. The prepared star macromolecules efficiently thickened water at broader pH ranges than Carbopol (between pH 3 and 13).

TABLE 8

| pH | Viscosity [cP] Carbopol (0.2 wt. %) | pH | Viscosity [cP] Example 6 (0.6 wt. %) |
|---|---|---|---|
| 3 | 450 | 2.85 | 5300 |
| 4.7 | 66200 | 4.59 | 5900 |
| 5.9 | 108500 | 4.98 | 115200 |
| 6.9 | 86900 | 5.83 | 189600 |
| 7.7 | 75800 | 6.2 | 185000 |
| 8.8 | 62300 | 6.9 | 187700 |
| 9.8 | 53800 | 7.5 | 119000 |
| 11.1 | 44100 | 8.69 | 77800 |
| 12 | 19920 | 12.53 | 66700 |
| 13 | 3480 | — | — |

Test Procedures:

Sample Preparation Procedure

Aqueous gel compositions were prepared at various concentrations of a polymer (e.g., 0.3 wt. %, 0.4 wt %, and 0.6 wt. %) by heating and stirring. Gels were formed following the procedure. 400 ml of deionized (DI) water was transferred to 600 ml beaker and beaker was assembled below overhead stirrer IKA with mount stirring shaft with 3-blade marine impeller. Water was stirred at 600 rpm to generate vortex and a polymer (e.g. 1.2 g for a given wt. % gel) was slowly added. Water solution was heated to 30° C. and next solid NaOH (e.g. 0.32 g) was added. Water solution was stirred for 20 min until temperature reached 90° C. The beaker with a gel was then assembled below Silverson homogenizer with mount Square Hole workhead and Axial Flow workhead. The stirring speed was gradually increased to 4800±200 rpm and mixed for 35 min until thick homogeneous gel was obtained. A pH of the resulting gel was analyzed with pH meter and adjusted to about pH=7.2±0.3.

Dynamic Viscosity Test Procedure

To the removable chamber of the Brookfield LVDV-E Digital Viscometer was transferred 16.1 ml of the gel prepared according to the Sample Preparation Procedure. Then the spindle #25 was attached to the pivot Cup on Brookfield viscometer. The viscosity was measured at 25° C. and at standard pressure over a wide range of rates (e.g, 0.3-100 rpm) and the shear rate and viscosity was recorded. The viscosity measurements were taken in the following sequence, stopping the instrument after each measurement for 5 minutes, 0.3, 0.5, 1, 2, 5, 10, 20, 30, 50, and 100 rpm. Dynamic viscosity was determined as the viscosity in centipoise (cP) at 1 rpm.

Shear-Thinning Value

A shear-thinning value was determined by dividing the viscosity value at 0.3 rpm by the viscosity value at 20 rpm as measured during the Dynamic Viscosity Test Procedure.

Salt Tolerance Test

The following procedure was applied to measure the viscosity of the aqueous gels in the presence of salt (sodium chloride, NaCl). A saturated NaCl water solution was prepared by dissolving NaCl in deionized water at 25° C. The concentration was 357 mg/ml (0.264 g NaCl/g solution). A salt containing gel (0.4 wt % of NaCl) was prepared by adding 301.9 mg of saturated NaCl solution to a vial with 20 g of a 0.4 wt % gel which was prepared as described in the Sample Preparation Procedure (analytical balance with 0.1 mg accuracy was used during the addition). The NaCl solution and the gel were mixed by shaking the vial vigorously for 5 minutes. A portion of the gel (16.1 ml) was transferred to the removable chamber of the Brookfield LVDV-E Digital Viscometer. Then spindle #25 was attached to the pivot Cup on the Brookfield viscometer. The Salt Tolerant Test value for the tested salt-tolerant macromolecule was measured and recorded as the viscosity (in centipoise, cP) at a given wt. % gel in a given wt. % NaCl concentration (for example a viscosity of 12,000 cP at 0.4 wt % gel in a 0.4 wt % NaCl concentration). Temperature Stability Value Test Procedure A 0.4 wt % gel with 0.4 wt % of NaCl was prepared as described in Salt Tolerance Test. Next, 16.1 ml of gel was transferred to the removable chamber of the Brookfield LVDV-E Digital Viscometer. Then the spindle #25 was attached to the pivot Cup on Brookfield viscometer. The viscosity was measured at 1 rpm and at standard pressure over a wide range of temperatures. Viscosity measurements were taken at the following temperatures, 25, 40, and 55° C., stopping the instrument after each measurement and equilibrating temperature for at least 15 min. The temperature Stability Value, in percent, is determined as the viscosity in centipoise (cP) at 1 rpm at 25 and 55° C. following the equation:

[1−(Dynamic Viscosity (at 55° C.)—Dynamic Viscosity (at 25° C.))/Dynamic Viscosity (at 25° C.)]×100%.

Emulsion Test Procedure and Emulsion Value 280 ml of deionized (DI) water was transferred to 600 ml beaker and beaker was assembled below overhead stirrer IKA with mount stirring shaft with 3-blade marine impeller. Water was stirred at 600 rpm to generate vortex and 1.2 g of a polymer was slowly added. Water solution was heated to 30° C. and next 0.32 g of solid NaOH was added (pH adjusted to pH=7). Stirring rate was increased to 800 rpm and next to 1600 rpm. 120 ml of sunflower oil was added while the stirring was continued for 20 min at 80° C. or until homogeneous solution was obtained. The mixture was allowed to cool to room temperature. Once the system cooled to room temperature a timer was started. The Emulsion Value is the time, in minutes, it takes for the system to form two visible layers (phase separation).

Hydrophilic-Lipophilic (HLB) Arm/Segment Calculation $$HLB = 20 * Mh/M$$

where Mh is the molecular mass of the hydrophilic portion of the polymeric arm or segment, and M is the molecular mass of the whole polymeric arm or segment.

Hydrophilic-Lipophilic Macromolecule Calculation $$HLM = \sum_{n=1}^{n=m} MW_n \times HLB_n / 20 \text{ divided by } 0.3 \; MW_{core} + \sum_{n=1}^{n=m} MW_n$$

where
$MW_n$ is the molecular weight for the respective arm,
$HLB_n$ is the HLB, as calculated from the HLB arm calculation, for the respective arm, and
$MW_{core}$ is the molecular weight for the core, and
M is the total number of arms.

pH Efficiency Range Test Procedure

An aqueous gel composition at 0.4 wt. % was prepared (similarly to that described in the Sample Preparation Procedure) for a star macromolecule of the present invention, at a starting pH of around 5 and a separate aqueous gel composition at 0.2 wt. % aqueous gel composition of Carbopol ETD 2020, at a starting pH of around 3, was prepared by mixing and heating, as necessary (e.g., vigorous mixing at a temperature of about 60° C.). Then, the viscosity of the sample was measured in accordance with the Dynamic Viscosity Test Procedure, above, and the dynamic viscosity at 1 rpm was recorded. This procedure was repeated for differing pH values, adjusted by addition of sodium hydroxide. The pH-induced break value, in percent, is determined by the following equation:

Dynamic Viscosity (at 1 rpm) at pH 7.5−Dynamic Viscosity (at 1 rpm) at pH 5/Dynamic Viscosity (at 1 rpm) at pH 7.5×100%.

Any and all publications and patent applications mentioned in this specification are herein incorporated by reference to the same extent as if each individual publication or patent application was specifically and individually indicated to be incorporated by reference.

While preferred embodiments of the present invention have been shown and described herein, it will be obvious to those skilled in the art that such embodiments are provided by way of example only. It is intended that the following claims define the scope of the invention and that methods and structures within the scope of these claims and their equivalents be covered thereby.

What is claimed is:

1. A salt-tolerant star macromolecule, comprising:
   i) a core;
   ii) a plurality of hydrophilic polymeric arms; and
   iii) at least one-salt-tolerant-enhancing copolymeric arm, comprising:
      a) a hydrophilic polymeric segment proximal to the core; and
      b) a salt-tolerant-enhancing polymeric segment distal to the core;
   wherein;
      1) the salt-tolerant star macromolecule, when dissolved in water at a concentration of at least 0.3 wt. % forms a homogeneous gel; and
      2) the formed homogeneous gel has a dynamic viscosity at 80° C. that is at least 50% relative to viscosity of the gel at 25° C., according to the Temperature Stability Test.

2. The salt-tolerant star macromolecule of claim 1, wherein the salt-tolerant star macromolecule has a dynamic viscosity in a NaCl-containing aqueous solution that is greater than the dynamic viscosity at 0.0 wt. % NaCl aqueous solution, according to the Salt Tolerance Test.

3. The salt-tolerant star macromolecule of claim 1, wherein the salt-tolerant star macromolecule has an increase in dynamic viscosity with an increase in NaCl concentration, according to the Salt Tolerance Test.

4. The salt-tolerant star macromolecule of claim 1, wherein the dynamic viscosity of the salt-tolerant star macromolecule in a 0.2 wt % NaCl aqueous solution is at least 40% of the dynamic viscosity at 0.0 wt. % NaCl aqueous solution, according to the Salt Tolerance Test.

5. The salt-tolerant star macromolecule of claim 1, wherein the salt-tolerant-enhancing polymeric segment comprises:
   i) repeat units of monomeric residues of one or more polymerized salt-tolerant-enhancing monomers; and
   ii) optionally, repeat units of monomeric residues of one or more polymerized hydrophobic or hydrophilic monomers.

6. The salt-tolerant star macromolecule of claim 1, wherein the salt-tolerant star macromolecule is represented by Formula Z:

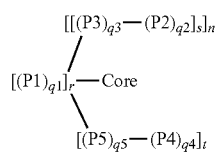

Formula Z wherein:
Core represents a crosslinked polymeric segment;
P1 represents a hydrophilic polymeric segment comprised of repeat units of monomeric residues of one or more polymerized hydrophilic monomers;
P2 independently represents a salt-tolerant-enhancing polymeric segment comprising repeat units of:
  a) monomeric residues of one or more polymerized salt-tolerant-enhancing monomers; and
  b) optionally, monomeric residues of one or more polymerized hydrophobic or hydrophilic monomers;
P3 independently represents a hydrophilic polymeric segment comprised of repeat units of monomeric residues of one or more polymerized hydrophilic monomers;
P4 represents a hydrophobic polymeric segment comprised of repeat units of monomeric residues of one or more polymerized hydrophobic monomers;
P5 represents a hydrophilic polymeric segment comprised of repeat units of monomeric residues of one or more polymerized hydrophilic monomers;
q1 represents the number of repeat units in P1 and has a value between 10 and 2000;
q2 independently represents the number of repeat units in P2 and has a value between 10 and 500;
q3 independently represents the number of repeat units in P3 and has a value between 10 and 2000;
q4 represents the number of repeat units in P4 and has a value between 10 and 500;
q5 represents the number of repeat units in P5 and has a value between 10 and 2000;
r represents the number of polymeric arms covalently attached to the Core and has a value in the range of from 0 to 1000;
s independently represents the number of salt-tolerant-enhancing copolymeric arms covalently attached to the Core and has a value in the range of from 1 to 1000;
t represents the number of copolymeric arms covalently attached to the Core and has a value in the range of from 0 to 1000; and
n represents the number of salt-tolerant-enhancing arm types covalently attached to the Core and has a value of at least 1;

wherein:
  i) the molar ratio of:
    a) r to s is in the range of between 40:1 and 1:40;
    b) the molar ratio of r to t is in the range of between 40:1 and 1:40;
    c) the molar ratio of t to s is in the range of between 40:1 and 1:40;
    d) the molar ratio of r to (s+t) is in the range of between 40:1 and 1:40; or
    e) combinations thereof; and
  ii) r and t cannot both equal zero unless n represents a value of at least 2.

7. The salt-tolerant star macromolecule of claim 1, wherein the salt-tolerant star macromolecule has a molecular weight (Mn) in the range of from 5,000 g/mol to 10,000,000 g/mol.

8. The salt-tolerant star macromolecule of claim 1, wherein the arms of the salt-tolerant star macromolecule independently have a molecular weight (Mn) in the range of from 1,000 g/mol to 250,000 g/mol.

9. The salt-tolerant star macromolecule of claim 1, wherein the dynamic viscosity of the salt-tolerant star macromolecule at 60° C. is at least 60% relative to viscosity of the gel at 25° C., according to the Temperature Stability Test.

10. A salt-tolerant thickening agent, comprising the salt-tolerant star macromolecule of claim 1.

11. A method of making an aqueous composition salt-tolerant, comprising:
  adding at least 0.3 wt. % of the salt-tolerant star macromolecule of claim 1 to the aqueous composition; and
  wherein the salt-tolerant star macromolecule when dissolved in water at a concentration of at least 0.3 wt. % forms a homogeneous gel and has a dynamic viscosity of at least 10,000 cP in a 0.4 wt. % NaCl aqueous solution, according to the Salt Tolerance Test.

12. The salt-tolerant star macromolecule of claim 1, wherein the salt-tolerant star macromolecule, when dissolved in water a concentration of 0.4% wt. %, forms a homogenous gel; and has a dynamic viscosity of at least 20,000 cP at a pH between 5.5-11.

13. The salt-tolerant star macromolecule of claim 5, wherein the monomeric residues of one or more polymerized salt-tolerant-enhancing monomers present within the salt-tolerant-enhancing polymeric segment comprise methyl acrylate or methyl methacrylate.

14. The salt-tolerant star macromolecule of claim 13, wherein the monomeric residues of one or more polymerized hydrophobic monomers present within the salt-tolerant-enhancing polymeric segment comprise styrene.

15. A composition, comprising the salt-tolerant star macromolecule of claim 1.

16. The composition of claim 15, wherein the composition is an aqueous composition.

17. The composition of claim 16, wherein the composition is a fracturing fluid composition.

* * * * *

UNITED STATES PATENT AND TRADEMARK OFFICE
CERTIFICATE OF CORRECTION

PATENT NO. : 10,259,901 B2
APPLICATION NO. : 15/415371
DATED : April 16, 2019
INVENTOR(S) : Liang Huang et al.

Page 1 of 1

It is certified that error appears in the above-identified patent and that said Letters Patent is hereby corrected as shown below:

In the Claims

Claim 6, Column 58, Line 6, change "oft to s" to --of t to s--.

Signed and Sealed this
Twenty-seventh Day of August, 2019

Andrei Iancu
*Director of the United States Patent and Trademark Office*